United States Patent
Jayaweera et al.

(10) Patent No.: US 12,352,844 B2
(45) Date of Patent: Jul. 8, 2025

(54) WIRELESS SENSING FOR IN-VEHICLE CHILD PRESENCE DETECTION

(71) Applicants: Sakila S. Jayaweera, College Park, MD (US); Beibei Wang, Clarksville, MD (US); Guozhen Zhu, Greenbelt, MD (US); Weihang Gao, Rockville, MD (US); Chenshu Wu, Hong Kong (CN); K. J. Ray Liu, Potomac, MD (US); Oscar Chi-Lim Au, Rockville, MD (US)

(72) Inventors: Sakila S. Jayaweera, College Park, MD (US); Beibei Wang, Clarksville, MD (US); Guozhen Zhu, Greenbelt, MD (US); Weihang Gao, Rockville, MD (US); Chenshu Wu, Hong Kong (CN); K. J. Ray Liu, Potomac, MD (US); Oscar Chi-Lim Au, Rockville, MD (US)

(73) Assignee: ORIGIN RESEARCH WIRELESS, INC., Rockville, MD (US)

(*) Notice: Subject to any disclaimer, the term of this patent is extended or adjusted under 35 U.S.C. 154(b) by 0 days.

(21) Appl. No.: 19/004,293

(22) Filed: Dec. 28, 2024

(65) Prior Publication Data
US 2025/0138176 A1 May 1, 2025

Related U.S. Application Data

(63) Continuation-in-part of application No. 18/401,684, filed on Jan. 1, 2024, and a continuation-in-part of
(Continued)

(51) Int. Cl.
G01S 13/56 (2006.01)
G01S 7/41 (2006.01)

(52) U.S. Cl.
CPC ............ *G01S 13/56* (2013.01); *G01S 7/415* (2013.01)

(58) Field of Classification Search
CPC .......... G01S 13/56; G01S 7/415; G01S 13/42; G01S 13/68; G01S 13/75; G01S 13/931; B60N 2/02246; B60N 2/2863; A61B 5/11
See application file for complete search history.

(56) References Cited

U.S. PATENT DOCUMENTS

| | | | | |
|---|---|---|---|---|
| 5,653,462 A | * | 8/1997 | Breed | B60N 2/2863 180/272 |
| 6,753,780 B2 | * | 6/2004 | Li | G01S 13/931 340/573.1 |

(Continued)

OTHER PUBLICATIONS

"Brand Guide for Bluetooth Trademarks," no author given; published by the Bluetooth Special Interest Group; Kirkland, WA, USA; Jun. 2022; posted on the Internet at bluetooth.com. (Year: 2022).*

(Continued)

*Primary Examiner* — Bernarr E Gregory

(57) ABSTRACT

Wireless sensing for in-vehicle child presence detection is described. In one example, a described method comprises: obtaining a time series of channel information (TSCI) of a wireless channel in a vehicle; computing a motion statistics (MS) based on channel information (CI) of the TSCI in a time period; detecting a motion of a user in the time period by comparing the motion statistics with a first threshold, wherein the motion of the user is detected when the motion statistics exceed the first threshold; constructing a 2-dimensional (2D) transform matrix based on 1-dimensional (1D) transforms of CI of TSCI in sliding time windows in the time period; detecting a number of horizontal streaks of the 2D transform matrix; detecting a breathing motion of the user in
(Continued)

the time period based on the number of detected horizontal streaks of the 2D transform matrix and an associated criterion.

30 Claims, 23 Drawing Sheets

Related U.S. Application Data application No. 18/401,681, filed on Jan. 1, 2024, and a continuation-in-part of application No. 18/395,543, filed on Dec. 23, 2023, and a continuation-in-part of application No. 18/395,533, filed on Dec. 23, 2023, and a continuation-in-part of application No. 18/395,539, filed on Dec. 23, 2023, and a continuation-in-part of application No. 18/395,544, filed on Dec. 23, 2023, and a continuation-in-part of application No. 18/395,537, filed on Dec. 23, 2023, and a continuation-in-part of application No. 18/391,529, filed on Dec. 20, 2023, and a continuation-in-part of application No. 18/379,622, filed on Oct. 12, 2023, and a continuation-in-part of application No. 18/199,963, filed on May 21, 2023, and a continuation-in-part of application No. 18/108,563, filed on Feb. 10, 2023, and a continuation-in-part of application No. 17/959,487, filed on Oct. 4, 2022, and a continuation-in-part of application No. 17/960,080, filed on Oct. 4, 2022, and a continuation-in-part of application No. PCT/US2022/045708, filed on Oct. 4, 2022, and a continuation-in-part of application No. 17/838,244, filed on Jun. 12, 2022, now Pat. No. 12,216,190, and a continuation-in-part of application No. 17/838,228, filed on Jun. 12, 2022, and a continuation-in-part of application No. 17/838,231, filed on Jun. 12, 2022, and a continuation-in-part of application No. 17/827,902, filed on May 30, 2022, and a continuation-in-part of application No. 17/537,432, filed on Nov. 29, 2021, and a continuation-in-part of application No. 17/149,625, filed on Jan. 14, 2021.

(60) Provisional application No. 63/721,406, filed on Nov. 15, 2024, provisional application No. 63/651,921, filed on May 24, 2024.

(56) References Cited

U.S. PATENT DOCUMENTS

| | | | | |
|---|---|---|---|---|
| 8,725,311 | B1* | 5/2014 | Breed | A61B 5/11 |
| | | | | 701/1 |
| 9,671,492 | B2* | 6/2017 | Diewald | G01S 13/931 |
| 11,543,511 | B2* | 1/2023 | Murata | G01S 13/68 |
| 11,760,291 | B2* | 9/2023 | Elad | G01S 13/931 |
| | | | | 701/45 |
| 12,168,412 | B2* | 12/2024 | Elad | G01S 13/931 |
| 2002/0029103 | A1* | 3/2002 | Breed | B60N 2/02246 |
| | | | | 701/45 |
| 2004/0245035 | A1* | 12/2004 | Hofbeck | G01S 13/75 |
| | | | | 180/271 |
| 2005/0285736 | A1* | 12/2005 | Hofbeck | G01S 13/75 |
| | | | | 340/552 |
| 2006/0061470 | A1* | 3/2006 | Hofbeck | G01S 13/931 |
| | | | | 340/553 |
| 2006/0152347 | A1* | 7/2006 | Hofbeck | G01S 13/931 |
| | | | | 340/552 |
| 2006/0180377 | A1* | 8/2006 | Hofbeck | G01S 13/931 |
| | | | | 180/271 |
| 2017/0282828 | A1* | 10/2017 | Carenza | G01S 13/931 |
| 2019/0293777 | A1* | 9/2019 | Takemoto | G01S 13/42 |
| 2019/0366965 | A1* | 12/2019 | Ben Khadhra | G01S 13/931 |
| 2022/0234534 | A1* | 7/2022 | Elad | G01S 13/931 |
| 2023/0382340 | A1* | 11/2023 | Elad | G01S 13/931 |

OTHER PUBLICATIONS

"Who We Are: Our Brands," no author given; published by the Wi-Fi Alliance; Austin, TX, USA; copyright in the year 2024; posted on the Internet at wi-fi.org. (Year: 2024).*

"Guidance for use of the LTE logo," no author given; published by the 3GPP Partners; Sophia Antipolis, France; no date; retrieved during the year 2024; posted on the Internet at www.3gpp.org. (Year: 2024).*

"WiMAX Forum Trademark Policy and Trademark Usage Guidelines," no author given; published by the WiMAX Forum; Clackamas, OR, USA; published Sep. 6, 2007; posted on the Internet at wimaxforum.org. (Year: 2007).*

\* cited by examiner

WIRELESS SENSING FOR IN-VEHICLE CHILD PRESENCE DETECTION

CROSS-REFERENCE TO RELATED APPLICATIONS

The present application hereby incorporates by reference the entirety of the disclosures of, and claims priority to, each of the following cases:
(a) U.S. Provisional Patent application 63/721,406, entitled "METHOD, APPARATUS, AND SYSTEM FOR WIRELESS SENSING", filed on Nov. 15, 2024,
(b) U.S. Provisional Patent application 63/651,921, entitled "METHOD, APPARATUS, AND SYSTEM FOR WIRELESS SENSING IN NETWORK OF NETWORKS WITH INTER-NETWORK SOUNDING", filed on May 24, 2024,
(c) U.S. patent application Ser. No. 17/149,625, entitled "METHOD, APPARATUS, AND SYSTEM FOR WIRELESS MONITORING WITH MOTION LOCALIZATION", filed on Jan. 14, 2021,
(d) U.S. patent application Ser. No. 17/537,432, entitled "METHOD, APPARATUS, AND SYSTEM FOR AUTOMATIC AND ADAPTIVE WIRELESS MONITORING AND TRACKING", filed on Nov. 29, 2021,
(e) U.S. patent application Ser. No. 17/827,902, entitled "METHOD, APPARATUS, AND SYSTEM FOR SPEECH ENHANCEMENT AND SEPARATION BASED ON AUDIO AND RADIO SIGNALS", filed on May 30, 2022,
(f) U.S. patent application Ser. No. 17/838,228, entitled "METHOD, APPARATUS, AND SYSTEM FOR WIRELESS SENSING BASED ON CHANNEL INFORMATION", filed on Jun. 12, 2022,
(g) U.S. patent application Ser. No. 17/838,231, entitled "METHOD, APPARATUS, AND SYSTEM FOR IDENTIFYING AND QUALIFYING DEVICES FOR WIRELESS SENSING", filed on Jun. 12, 2022,
(h) U.S. patent application Ser. No. 17/838,244, entitled "METHOD, APPARATUS, AND SYSTEM FOR WIRELESS SENSING BASED ON LINKWISE MOTION STATISTICS", filed on Jun. 12, 2022,
(i) U.S. patent application Ser. No. 17/959,487, entitled "METHOD, APPARATUS, AND SYSTEM FOR VOICE ACTIVITY DETECTION BASED ON RADIO SIGNALS", filed on Oct. 4, 2022,
(j) U.S. patent application Ser. No. 17/960,080, entitled "METHOD, APPARATUS, AND SYSTEM FOR ENHANCED WIRELESS MONITORING OF VITAL SIGNS", filed on Oct. 4, 2022,
(k) PCT Patent application PCT/US22/45708, entitled "METHOD, APPARATUS, AND SYSTEM FOR WIRELESS SENSING MEASUREMENT AND REPORTING", filed on Oct. 4, 2022,
(l) U.S. patent application Ser. No. 18/108,563, entitled "METHOD, APPARATUS, AND SYSTEM FOR WIRELESS SENSING BASED ON MULTIPLE GROUPS OF WIRELESS DEVICES", filed on Feb. 10, 2023,
(m) U.S. patent application Ser. No. 18/199,963, entitled "METHOD, APPARATUS, AND SYSTEM FOR WIRELESS SENSING MEASUREMENT AND REPORTING", filed on May 21, 2023,
(n) U.S. patent application Ser. No. 18/379,622, entitled "METHOD, APPARATUS, AND SYSTEM FOR WIRELESS PROXIMITY DETECTION", filed on Oct. 12, 2023, now U.S. Pat. No. 12,256,360,
(o) U.S. patent application Ser. No. 18/391,529, entitled "METHOD, APPARATUS, AND SYSTEM FOR WIRELESS HUMAN AND NON-HUMAN MOTION DETECTION", filed on Dec. 20, 2023.
(p) U.S. patent application Ser. No. 18/395,533, entitled "METHOD, APPARATUS, AND SYSTEM FOR WIRELESS SENSING MEASUREMENT AND REPORTING", filed on Dec. 23, 2023.
(q) U.S. patent application Ser. No. 18/395,539, entitled "METHOD, APPARATUS, AND SYSTEM FOR WIRELESS SENSING MEASUREMENT AND REPORTING", filed on Dec. 23, 2023.
(r) U.S. patent application Ser. No. 18/395,543, entitled "METHOD, APPARATUS, AND SYSTEM FOR WIRELESS SENSING MEASUREMENT AND REPORTING", filed on Dec. 23, 2023.
(s) U.S. patent application Ser. No. 18/395,537, entitled "METHOD, APPARATUS, AND SYSTEM FOR WIRELESS SENSING MEASUREMENT AND REPORTING", filed on Dec. 23, 2023.
(t) U.S. patent application Ser. No. 18/395,544, entitled "METHOD, APPARATUS, AND SYSTEM FOR WIRELESS SENSING MEASUREMENT AND REPORTING", filed on Dec. 23, 2023.
(u) U.S. patent application Ser. No. 18/401,684, entitled "METHOD, APPARATUS, AND SYSTEM FOR WIRELESS SENSING MEASUREMENT AND REPORTING", filed on Jan. 1, 2024.
(v) U.S. patent application Ser. No. 18/401,681, entitled "METHOD, APPARATUS, AND SYSTEM FOR WIRELESS SENSING BASED ON DEEP LEARNING", filed on Jan. 1, 2024.

TECHNICAL FIELD

The present teaching generally relates to wireless sensing. More specifically, the present teaching relates to wireless sensing for in-vehicle child presence detection.

BACKGROUND

With the proliferation of Internet of Things (IoT) applications, billions of household appliances, phones, smart devices, security systems, environment sensors, vehicles and buildings, and other radio-connected devices will transmit data and communicate with each other or people, and everything will be able to be measured and tracked all the time. Among the various approaches to measure what is happening in the surrounding environment, wireless sensing has received an increasing attention in recent years because of the ubiquitous deployment of wireless radio devices. In addition, human activities affect wireless signal propagations, therefore understanding and analyzing the way how wireless signals react to human activities can reveal rich information about the activities. As more bandwidth becomes available in the new generation of wireless systems, wireless sensing will make many smart IoT applications only imagined today possible in the near future. That is because when the bandwidth increases, one can see many more multipaths, in a rich-scattering environment such as in indoors or metropolitan area, which can be treated as hundreds of virtual antennas/sensors. Because there may be many IoT devices available for wireless sensing, an efficient and effective method for making use multiple devices for wireless sensing is desirable.

SUMMARY

The present teaching generally relates to wireless sensing. More specifically, the present teaching relates to wireless sensing for in-vehicle child presence detection.

In one embodiment, a method for in-vehicle child presence detection is described. The method comprises: transmitting a wireless signal by a transmitting device through a wireless channel in a vehicle; receiving the wireless signal by a receiving device in the vehicle, wherein the received wireless signal differs from the transmitted wireless signal due to the wireless channel and a motion of a user in the vehicle; obtaining a time series of channel information (TSCI) of the wireless channel based on the received wireless signal; computing a motion statistics (MS) based on N5 channel information (CI) of the TSCI in a time period; detecting the motion of the user in the time period by comparing the motion statistics with a first threshold, wherein the motion of the user is detected when the motion statistics exceed the first threshold; for each of N9 sliding time windows in the time period, computing a respective 1-dimensional (1D) transform of CI of the TSCI in the sliding time window associated with a respective time stamp; constructing a 2-dimensional (2D) transform matrix by assembling and concatenating the N9 1D transforms as columns of the 2D transform matrix in an increasing order of the associated time stamps; detecting a number of horizontal streaks of the 2D transform matrix; detecting a breathing motion of the user in the time period based on the number of detected horizontal streaks of the 2D transform matrix and an associated criterion; computing an oscillation confidence score (CS) by: computing an oscillation rate (OR) in a transform domain by counting zero-crossings of the 2D transform matrix, and using a first mapping function to map the OR to the oscillation CS; computing a dynamic time warping (DTW) CS by: computing a DTW cost by applying DTW to the 2D transform matrix, and using a second mapping function to map the DTW cost to the DTW CS; computing a peak CS by: computing a streak count of the number of detected horizontal streaks of the 2D transform matrix, and using a third mapping function to map the streak count to the peak CS; computing a combined CS (CCS) as a first aggregate of the oscillation CS, the DTW CS and the peak CS; computing a final confidence score (FCS) as a moving second aggregate of the CCS and a number of temporally adjacent CCS associated with adjacent time periods of the time period; rejecting any detection of the breathing motion in the time period when the FCS is less than a second threshold; detecting a presence of the user in the time period when: (a) the motion of the user is detected or (b) the breathing motion of the user is detected and not rejected; and when the presence of the user is detected, determining whether the user is a child or an adult based on the TSCI and a classifier, wherein the classifier comprises: a convolutional neural network (CNN) followed by a fully-connected network (FCN) with input data including (1) a first plurality of 2D input matrices constructed from magnitudes of the TSCI alone without phases and (2) a second plurality of 2D input matrices constructed from phases of the TSCI alone without magnitudes.

In another embodiment, a device for in-vehicle child presence detection is described. The device comprises: a receiver configured to receive a wireless signal transmitted by a transmitter through a wireless channel in a vehicle, wherein the received wireless signal differs from the transmitted wireless signal due to the wireless channel and a motion of a user in the vehicle; and a processor. The processor is configured to: obtain a time series of channel information (TSCI) of the wireless channel based on the received wireless signal; compute a motion statistics (MS) based on N5 channel information (CI) of the TSCI in a time period; detect the motion of the user in the time period by comparing the motion statistics with a first threshold, wherein the motion of the user is detected when the motion statistics exceed the first threshold; for each of N9 sliding time windows in the time period, compute a respective 1-dimensional (1D) transform of CI of the TSCI in the sliding time window associated with a respective time stamp; construct a 2-dimensional (2D) transform matrix by assembling and concatenating the N9 1D transforms as columns of the 2D transform matrix in an increasing order of the associated time stamps; detect a number of horizontal streaks of the 2D transform matrix; detect a breathing motion of the user in the time period based on the number of detected horizontal streaks of the 2D transform matrix and an associated criterion; compute an oscillation confidence score (CS) by: computing an oscillation rate (OR) in a transform domain by counting zero-crossings of the 2D transform matrix, and using a first mapping function to map the OR to the oscillation CS; computing a dynamic time warping (DTW) CS by: computing a DTW cost by applying DTW to the 2D transform matrix, and using a second mapping function to map the DTW cost to the DTW CS; computing a peak CS by: computing a streak count of the number of detected horizontal streaks of the 2D transform matrix, and using a third mapping function to map the streak count to the peak CS; compute a combined CS (CCS) as a first aggregate of the oscillation CS, the DTW CS and the peak CS; compute a final confidence score (FCS) as a moving second aggregate of the CCS and a number of temporally adjacent CCS associated with adjacent time periods of the time period; reject any detection of the breathing motion in the time period when the FCS is less than a second threshold; detect a presence of the user in the time period when: (a) the motion of the user is detected or (b) the breathing motion of the user is detected and not rejected; and when the presence of the user is detected, determine whether the user is a child or an adult based on the TSCI and a classifier, wherein the classifier comprises: a convolutional neural network (CNN) followed by a fully-connected network (FCN) with input data including (1) a first plurality of 2D input matrices constructed from magnitudes of the TSCI alone without phases and (2) a second plurality of 2D input matrices constructed from phases of the TSCI alone without magnitudes.

In yet another embodiment, a system for in-vehicle child presence detection is described. The system comprises: a transmitting device configured to transmit a wireless signal through a wireless channel in a vehicle; a receiving device configured to receive the wireless signal, wherein the received wireless signal differs from the transmitted wireless signal due to the wireless channel and a motion of a user in the vehicle; and a processor. The processor is configured to: obtain a time series of channel information (TSCI) of the wireless channel based on the received wireless signal; compute a motion statistics (MS) based on N5 channel information (CI) of the TSCI in a time period; detect the motion of the user in the time period by comparing the motion statistics with a first threshold, wherein the motion of the user is detected when the motion statistics exceed the first threshold; for each of N9 sliding time windows in the time period, compute a respective 1-dimensional (1D) transform of CI of the TSCI in the sliding time window associated with a respective time stamp; construct a 2-dimensional (2D) transform matrix by assembling and concatenating the N9 1D transforms as columns of the 2D transform matrix in an increasing order of the associated time stamps; detect a number of horizontal streaks of the 2D transform matrix; detect a breathing motion of the user in the time period based on the number of detected horizontal streaks of the 2D transform matrix and an associated criterion; compute an oscillation confidence score (CS) by: computing an oscillation rate (OR) in a transform domain by counting zero-crossings of the 2D transform matrix, and using a first mapping function to map the OR to the oscillation CS; computing a dynamic time warping (DTW) CS by: computing a DTW cost by applying DTW to the 2D transform matrix, and using a second mapping function to map the DTW cost to the DTW CS; computing a peak CS by: computing a streak count of the number of detected horizontal streaks of the 2D transform matrix, and using a third mapping function to map the streak count to the peak CS; compute a combined CS (CCS) as a first aggregate of the oscillation CS, the DTW CS and the peak CS; compute a final confidence score (FCS) as a moving second aggregate of the CCS and a number of temporally adjacent CCS associated with adjacent time periods of the time period; reject any detection of the breathing motion in the time period when the FCS is less than a second threshold; detect a presence of the user in the time period when: (a) the motion of the user is detected or (b) the breathing motion of the user is detected and not rejected; and when the presence of the user is detected, determine whether the user is a child or an adult based on the TSCI and a classifier, wherein the classifier comprises: a convolutional neural network (CNN) followed by a fully-connected network (FCN) with input data including (1) a first plurality of 2D input matrices constructed from magnitudes of the TSCI alone without phases and (2) a second plurality of 2D input matrices constructed from phases of the TSCI alone without magnitudes.

In still another embodiment, a vehicle is described. The vehicle comprises: a transmitting device configured to transmit a wireless signal through a wireless channel in the vehicle; a receiving device configured to receive the wireless signal, wherein the received wireless signal differs from the transmitted wireless signal due to the wireless channel and a motion of a user in the vehicle; and a processor. The processor is configured to: obtain a time series of channel information (TSCI) of the wireless channel based on the received wireless signal; compute a motion statistics (MS) based on N5 channel information (CI) of the TSCI in a time period; detect the motion of the user in the time period by comparing the motion statistics with a first threshold, wherein the motion of the user is detected when the motion statistics exceed the first threshold; for each of N9 sliding time windows in the time period, compute a respective 1-dimensional (1D) transform of CI of the TSCI in the sliding time window associated with a respective time stamp; construct a 2-dimensional (2D) transform matrix by assembling and concatenating the N9 1D transforms as columns of the 2D transform matrix in an increasing order of the associated time stamps; detect a number of horizontal streaks of the 2D transform matrix; detect a breathing motion of the user in the time period based on the number of detected horizontal streaks of the 2D transform matrix and an associated criterion; compute an oscillation confidence score (CS) by: computing an oscillation rate (OR) in a transform domain by counting zero-crossings of the 2D transform matrix, and using a first mapping function to map the OR to the oscillation CS; computing a dynamic time warping (DTW) CS by: computing a DTW cost by applying DTW to the 2D transform matrix, and using a second mapping function to map the DTW cost to the DTW CS; computing a peak CS by: computing a streak count of the number of detected horizontal streaks of the 2D transform matrix, and using a third mapping function to map the streak count to the peak CS; compute a combined CS (CCS) as a first aggregate of the oscillation CS, the DTW CS and the peak CS; compute a final confidence score (FCS) as a moving second aggregate of the CCS and a number of temporally adjacent CCS associated with adjacent time periods of the time period; reject any detection of the breathing motion in the time period when the FCS is less than a second threshold; detect a presence of the user in the time period when: (a) the motion of the user is detected or (b) the breathing motion of the user is detected and not rejected; and when the presence of the user is detected, determine whether the user is a child or an adult based on the TSCI and a classifier, wherein the classifier comprises: a convolutional neural network (CNN) followed by a fully-connected network (FCN) with input data including (1) a first plurality of 2D input matrices constructed from magnitudes of the TSCI alone without phases and (2) a second plurality of 2D input matrices constructed from phases of the TSCI alone without magnitudes Other concepts relate to software for implementing the present teaching on wireless sensing for in-vehicle child presence detection. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or devices described herein are further described in terms of example embodiments. These example embodiments are described in detail with reference to the drawings. These embodiments are non-limiting example embodiments, in which like reference numerals represent similar structures throughout the several views of the drawings.

DETAILED DESCRIPTION

Figure 1:
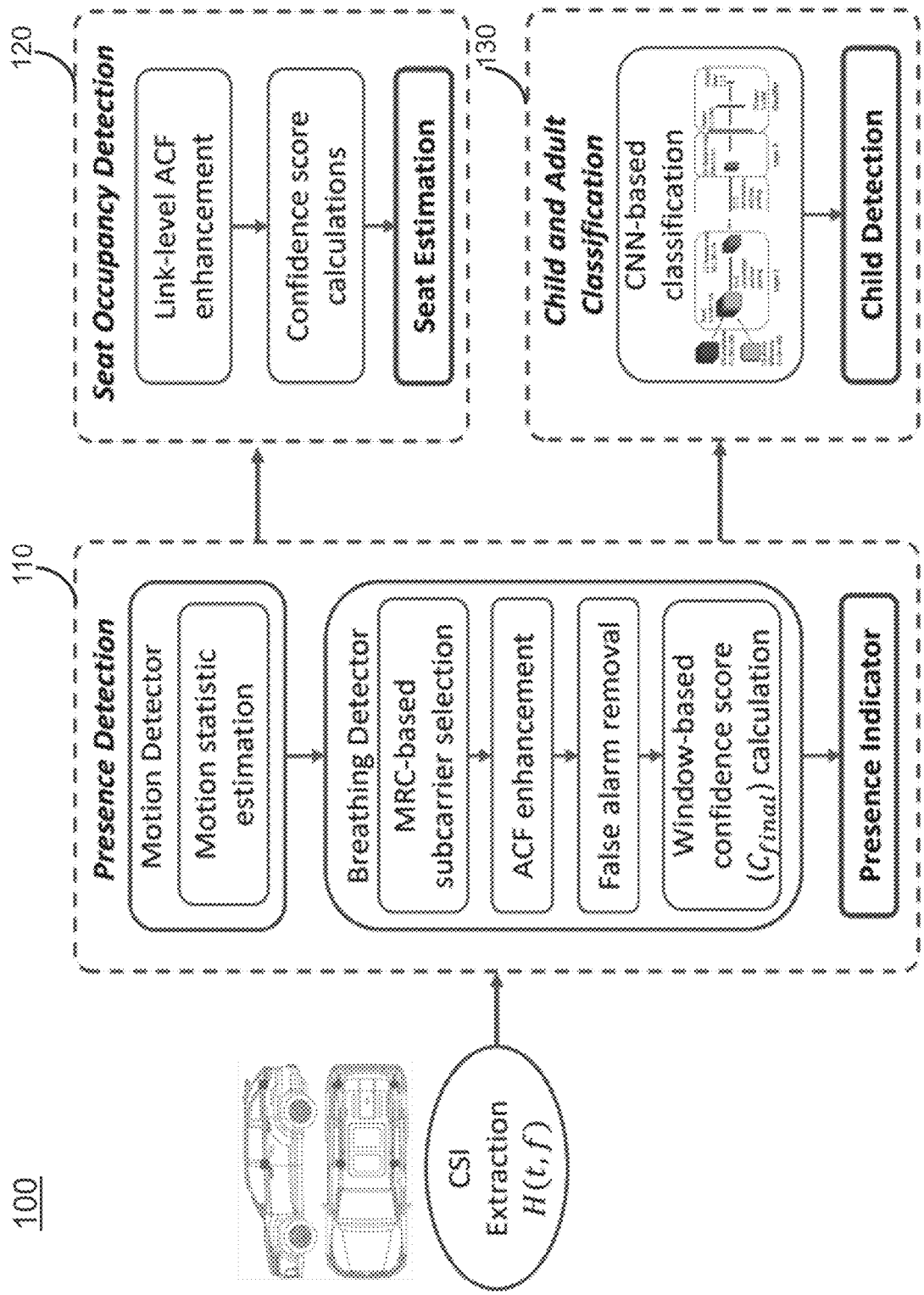
FIG. 1 illustrates an example framework of a wireless sensing system for in-vehicle child presence detection, according to some embodiments of the present disclosure.

The symbol "/" disclosed herein means "and/or". For example, "A/B" means "A and/or B." In some embodiments, a method/device/system/software of a wireless monitoring system is disclosed. A time series of channel information (CI) of a wireless multipath channel is obtained using a processor, a memory communicatively coupled with processor and a set of instructions stored in memory. The time series of CI (TSCI) may be extracted from a wireless signal transmitted from a Type1 heterogeneous wireless device (e.g. wireless transmitter (TX), "Bot" device) to a Type2 heterogeneous wireless device (e.g. wireless receiver (RX), "Origin" device) in a venue through the channel. The channel is impacted by an expression/motion of an object in venue. A characteristics/spatial-temporal information (STI)/motion information (MI) of object/expression/motion may be computed/monitored based on the TSCI. A task may be performed based on the characteristics/STI/MI. A task-related presentation may be generated in a user-interface (UI) on a device of a user.

Expression may comprise placement, placement of moveable parts, location/speed/acceleration/position/orientation/direction/identifiable place/region/presence/spatial coordinate, static expression/presentation/state/size/length/width/height/angle/scale/curve/surface/area/volume/pose/posture/manifestation/body language, dynamic expression/motion/sequence/movement/activity/behavior/gesture/gait/extension/contraction/distortion/deformation, body expression (e.g. head/face/eye/mouth/tongue/hair/voice/neck/limbs/arm/hand/leg/foot/muscle/moveable parts), surface expression/shape/texture/material/color/electromagnetic (EM) characteristics/visual pattern/wetness/reflectance/translucency/flexibility, material property (e.g. living tissue/hair/fabric/metal/wood/leather/plastic/artificial material/solid/liquid/gas/temperature), expression change, and/or some combination.

Wireless multipath channel may comprise: communication channel, analog frequency channel (e.g. with carrier frequency near 700/800/900 MHz, or 1.8/1.9/2.4/3/5/6/27/60/70+ GHz), coded channel (e.g. in CDMA), and/or channel of wireless/cellular network/system (e.g. WLAN, WiFi, mesh, 4G/LTE/5G/6G/7G/8G, Bluetooth, Zigbee, UWB, RFID, microwave). It may comprise multiple channels, which may be consecutive (e.g. adjacent/overlapping bands) or non-consecutive (e.g. non-overlapping bands, 2.4 GHz/5 GHz). While channel is used to transmit wireless signal and perform sensing measurements, data (e.g. TSCI/feature/component/characteristics/STI/MI/analytics/task outputs, auxiliary/non-sensing data/network traffic) may be communicated/transmitted in channel.

Wireless signal may comprise a series of probe signals. It may be any of: EM radiation, radio frequency (RF)/light/bandlimited/baseband signal, signal in licensed/unlicensed/ISM band, wireless/mobile/cellular/optical communication/network/mesh/downlink/uplink/unicast/multicast/broadcast signal. It may be compliant to standard/protocol (e.g. WLAN, WWAN, WPAN, WBAN, international/national/industry/defacto, IEEE/802/802.11/15/16, WiFi, 802.11n/ac/ax/be/bf, 3G/4G/LTE/5G/6G/7G/8G, 3GPP/Bluetooth/BLE/Zigbee/NFC/RFID/UWB/WiMax). A probe signal may comprise any of: protocol/standard/beacon/pilot/sounding/excitation/illumination/handshake/synchronization/reference/source/motion probe/detection/sensing/management/control/data/null-data/beacon/pilot/request/response/association/reassociation/disassociation/authentication/action/report/poll/announcement/extension/enquiry/acknowledgement frame/packet/signal, and/or null-data-frame (NDP)/RTS/CTS/QoS/CF-Poll/CF-Ack/block acknowledgement/reference/training/synchronization. It may comprise line-of-sight (LOS)/non-LOS components (or paths/links). It may have data embedded. Probe signal may be replaced by (or embedded in) data signal. Each frame/packet/signal may comprise: preamble/header/payload. It may comprise: training sequence, short (STF)/long (LTF) training field, L-STF/L-LTF/L-SIG/HE-STF/HE-LTF/HE-SIG-A/HE-SIG-B, channel estimation field (CEF). It may be used to transfer power wirelessly from Type1 device to Type2 device. Sounding rate of signal may be adjusted to control amount of transferred power. Probe signals may be sent in burst.

TSCI may be extracted/obtained (e.g. by IC/chip) from wireless signal at a layer of Type2 device (e.g. layer of OSI reference model, PHY/MAC/data link/logical link control/network/transport/session/presentation/application layer, TCP/IP/internet/link layer). It may be extracted from received wireless/derived signal. It may comprise wireless sensing measurements obtained in communication protocol (e.g. wireless/cellular communication standard/network, 4G/LTE/5G/6G/7G/8G, WiFi, IEEE 802.11/11bf/15/16). Each CI may be extracted from a probe/sounding signal, and may be associated with time stamp. TSCI may be associated with starting/stopping time/duration/amount of CI/sampling/sounding frequency/period. A motion detection/sensing signal may be recognized/identified base on probe signal. TSCI may be stored/retrieved/accessed/preprocessed/processed/postprocessed/conditioned/analyzed/monitored. TSCI/features/components/characteristics/STI/MI/analytics/task outcome may be communicated to edge/cloud server/Type1/Type2/hub/data aggregator/another device/system/network.

Type1/Type2 device may comprise components (hardware/software) such as electronics/chip/integrated circuit (IC)/RF circuitry/antenna/modem/TX/RX/transceiver/RF interface (e.g. 2.4/5/6/27/60/70+ GHz radio/front/back haul radio)/network/interface/processor/memory/module/circuit/board/software/firmware/connectors/structure/enclosure/housing/structure. It may comprise access point (AP)/base-station/mesh/router/repeater/hub/wireless station/client/terminal/"Origin Satellite"/"Tracker Bot", and/or internet-of-things (IoT)/appliance/wearable/accessory/peripheral/furniture/amenity/gadget/vehicle/module/wireless- enabled/unicast/multicast/broadcasting/node/hub/target/sensor/portable/mobile/cellular/communication/motion-detection/source/destination/standard-compliant device. It may comprise additional attributes such as auxiliary functionality/network connectivity/purpose/brand/model/appearance/form/shape/color/material/specification. It may be heterogeneous because the above (e.g. components/device types/additional attributes) may be different for different Type1 (or Type2) devices.

Type1/Type2 devices may/may not be authenticated/associated/collocated. They may be same device. Type1/Type2/portable/nearby/another device, sensing/measurement session/link between them, and/or object/expression/motion/characteristics/STI/MI/task may be associated with an identity/identification/identifier (ID) such as UUID, associated/unassociated STA ID (ASID/USID/AID/UID). Type2 device may passively observe/monitor/receive wireless signal from Type1 device without establishing connection (e.g. association/authentication/handshake) with, or requesting service from, Type1 device. Type1/Type2 device may move with object/another object to be tracked.

Type1 (TX) device may function as Type2 (RX) device temporarily/sporadically/continuously/repeatedly/interchangeably/alternately/simultaneously/contemporaneously/concurrently; and vice versa. Type1 device may be Type2 device. A device may function as Type1/Type2 device temporarily/sporadically/continuously/repeatedly/simultaneously/concurrently/contemporaneously. There may be multiple wireless nodes each being Type1/Type2 device. TSCI may be obtained between two nodes when they exchange/communicate wireless signals. Characteristics/STI/MI of object may be monitored individually based on a TSCI, or jointly based on multiple TSCI.

Motion/expression of object may be monitored actively with Type1/Type2 device moving with object (e.g. wearable devices/automated guided vehicle/AGV), or passively with Type1/Type2 devices not moving with object (e.g. both fixed devices).

Task may be performed with/without reference to reference/trained/initial database/profile/baseline that is trained/collected/processed/computed/transmitted/stored in training phase. Database may be re-training/updated/reset.

Presentation may comprise UI/GUI/text/message/form/webpage/visual/image/video/graphics/animation/graphical/symbol/emoticon/sign/color/shade/sound/music/speech/audio/mechanical/gesture/vibration/haptics presentation. Time series of characteristic/STI/MI/task outcome/another quantity may be displayed/presented in presentation. Any computation may be performed/shared by processor (or logic unit/chip/IC)/Type1/Type2/user/nearby/another device/local/edge/cloud server/hub/data/signal analysis subsystem/sensing initiator/response/SBP initiator/responder/AP/non-AP. Presentation may comprise any of: monthly/weekly/daily/simplified/detailed/cross-sectional/small/large/form-factor/color-coded/comparative/summary/web view, animation/voice announcement/another presentation related to periodic/repetition characteristics of repeating motion/expression.

Multiple Type1 (or Type 2) devices may interact with a Type2 (or Type1) device. The multiple Type1 (or Type2) devices may be synchronized/asynchronous, and/or may use same/different channels/sensing parameters/settings (e.g. sounding frequency/bandwidth/antennas). Type2 device may receive another signal from Type1/another Type1 device. Type1 device may transmit another signal to Type2/another Type2 device. Wireless signals sent (or received) by them may be sporadic/temporary/continuous/repeated/synchronous/simultaneous/concurrent/contemporaneous. They may operate independently/collaboratively. Their data (e.g. TSCI/feature/characteristics/STI/MI/intermediate task outcomes) may be processed/monitored/analyzed independently or jointly/collaboratively.

Any devices may operate based on some state/internal state/system state. Devices may communicate directly, or via another/nearby/portable device/server/hub device/cloud server. Devices/system may be associated with one or more users, with associated settings. Settings may be chosen/selected/pre-programmed/changed/adjusted/modified/varied over time. The method may be performed/executed in shown order/another order. Steps may be performed in parallel/iterated/repeated. Users may comprise human/adult/older adult/man/woman/juvenile/child/baby/pet/animal/creature/machine/computer module/software. Step/operation/processing may be different for different devices (e.g. based on locations/orientation/direction/roles/user-related characteristics/settings/configurations/available resources/bandwidth/power/network connection/hardware/software/processor/co-processor/memory/battery life/antennas/directional antenna/power setting/device parameters/characteristics/conditions/status/state). Any/all device may be controlled/coordinated by a processor (e.g. associated with Type1/Type2/nearby/portable/another device/server/designated source). Some device may be physically in/of/attached to a common device.

Type1 (or Type2) device may be capable of wirelessly coupling with multiple Type2 (or Type 1) devices. Type1 (or Type2) device may be caused/controlled to switch/establish wireless coupling (e.g. association/authentication) from Type2 (or Type1) device to another Type2 (or another Type1) device. The switching may be controlled by server/hub device/processor/Type1 device/Type2 device. Radio channel may be different before/after switching. A second wireless signal may be transmitted between Type1 (or Type2) device and second Type2 (or second Type1) device through the second channel. A second TSCI of second channel may be extracted/obtained from second signal. The first/second signals, first/second channels, first/second Type1 device, and/or first/second Type2 device may be same/similar/co-located.

Type1 device may transmit/broadcast wireless signal to multiple Type2 devices, with/without establishing connection (association/authentication) with individual Type2 devices. It may transmit to a particular/common MAC address, which may be MAC address of some device (e.g. dummy receiver). Each Type2 device may adjust to particular MAC address to receive wireless signal. Particular MAC address may be associated with venue, which may be recorded in an association table of an Association Server (e.g. hub device). Venue may be identified by Type1 device/Type2 device based on wireless signal received at particular MAC address.

For example, Type2 device may be moved to a new venue. Type1 device may be newly set up in venue such that Type1 and Type2 devices are not aware of each other. During set up, Type1 device may be instructed/guided/caused/controlled (e.g. by dummy receiver, hardware pin setting/connection, stored setting, local setting, remote setting, downloaded setting, hub device, and/or server) to send wireless signal (e.g. series of probe signals) to particular MAC address. Upon power up, Type2 device may scan for probe signals according to a table of MAC addresses (e.g. stored in designated source, server, hub device, cloud server) that may be used for broadcasting at different locations (e.g. different MAC address used for different venue such as house/office/enclosure/floor/multi-storey building/store/airport/mall/stadium/hall/station/subway/lot/area/zone/region/district/city/country/continent). When Type2 device detects wireless signal sent to particular MAC address, it can use the table to identify venue.

Channel may be selected from a set of candidate/selectable/admissible channels. Candidate channels may be associated with different frequency bands/bandwidth/carrier frequency/modulation/wireless standards/coding/encryption/payload characteristics/network/ID/SSID/characteristics/settings/parameters. Particular MAC address/selected channel may be changed/adjusted/varied/modified over time (e.g. according to time table/rule/policy/mode/condition/situation/change). Selection/change may be based on availability/collision/traffic pattern/co-channel/inter-channel interference/effective bandwidth/random selection/pre-selected list/plan. It may be done by a server (e.g. hub device). They may be communicated (e.g. from/to Type1/Type2/hub/another device/local/edge/cloud server).

Wireless connection (e.g. association/authentication) between Type1 device and nearby/portable/another device may be established (e.g. using signal handshake). Type1 device may send first handshake signal (e.g. sounding frame/probe signal/request-to-send RTS) to the nearby/portable/another device. Nearby/portable/another device may reply to first signal by sending second handshake signal (e.g. command/clear-to-send/CTS) to Type1 device, triggering Type1 device to transmit/broadcast wireless signal to multiple Type2 devices without establishing connection with the Type2 devices. Second handshake signals may be response/acknowledge (e.g. ACK) to first handshake signal. Second handshake signal may contain information of venue/Type1 device. Nearby/portable/another device may be a dummy device with purpose (e.g. primary purpose, secondary purpose) to establish wireless connection with Type1 device, to receive first signal, or send second signal. Nearby/portable/another device may be physically attached to Type1 device.

In another example, nearby/portable/another device may send third handshake signal to Type1 device triggering Type1 device to broadcast signal to multiple Type2 devices without establishing connection with them. Type1 device may reply to third signal by transmitting fourth handshake signal to the another device.

Nearby/portable/another device may be used to trigger multiple Type1 devices to broadcast. It may have multiple RF circuitries to trigger multiple transmitters in parallel. Triggering may be sequential/partially sequential/partially/fully parallel. Parallel triggering may be achieved using additional device(s) to perform similar triggering in parallel to nearby/portable/another device. After establishing connection with Type1 device, nearby/portable/another device may suspend/stop communication with Type1 device. It may enter an inactive/hibernation/sleep/stand-by/low-power/OFF/power-down mode. Suspended communication may be resumed. Nearby/portable/another device may have the particular MAC address and Type1 device may send signal to particular MAC address.

The (first) wireless signal may be transmitted by a first antenna of Type1 device to some first Type2 device through a first channel in a first venue. A second wireless signal may be transmitted by a second antenna of Type1 device to some second Type2 device through a second channel in a second venue. First/second signals may be transmitted at first/second (sounding) rates respectively, perhaps to first/second MAC addresses respectively. Some first/second channels/signals/rates/MAC addresses/antennas/Type2 devices may be same/different/synchronous/asynchronous. First/second venues may have same/different sizes/shape/multipath characteristics. First/second venues/immediate areas around first/second antennas may overlap. First/second channels/signals may be WiFi+LTE (one being WiFi, one being LTE), or WiFi+WiFi, or WiFi (2.4 GHz)+WiFi (5 GHz), or WiFi (5 GHz, channel=a1, BW=a2)+WiFi (5 GHz/channel=b1, BW=b2). Some first/second items (e.g. channels/signals/rates/MAC addresses/antennas/Type1/Type2 devices) may be changed/adjusted/varied/modified over time (e.g. based on time table/rule/policy/mode/condition/situation/another change).

Each Type1 device may be signal source of multiple Type2 devices (i.e. it sends respective probe signal to respective Type2 device). Each respective Type2 device may choose asynchronously the Type1 device from among all Type1 devices as its signal source. TSCI may be obtained by each respective Type2 device from respective series of probe signals from Type1 device. Type2 device may choose Type1 device from among all Type1 devices as its signal source (e.g. initially) based on identity/identification/identifier of Type1/Type2 device, task, past signal sources, history, characteristics, signal strength/quality, threshold for switching signal source, and/or information of user/account/profile/access info/parameters/input/requirement/criteria.

Database of available/candidate Type1 (or Type2) devices may be initialized/maintained/updated by Type2 (or Type1) device. Type2 device may receive wireless signals from multiple candidate Type1 devices. It may choose its Type1 device (i.e. signal source) based on any of: signal quality/strength/regularity/channel/traffic/characteristics/properties/states/task requirements/training task outcome/MAC addresses/identity/identifier/past signal source/history/user instruction/another consideration.

An undesirable/bad/poor/problematic/unsatisfactory/unacceptable/intolerable/faulty/demanding/undesirable/inadequate/lacking/inferior/unsuitable condition may occur when (1) timing between adjacent probe signals in received wireless signal becomes irregular, deviating from agreed sounding rate (e.g. time perturbation beyond acceptable range), and/or (2) processed/signal strength of received signal is too weak (e.g. below third threshold, or below fourth threshold for significant percentage of time), wherein processing comprises any lowpass/bandpass/highpass/median/moving/weighted average/linear/nonlinear/smoothing filtering. Any thresholds/percentages/parameters may be time-varying. Such condition may occur when Type1/Type2 device become progressively far away, or when channel becomes congested.

Some settings (e.g. Type1-Type2 device pairing/signal source/network/association/probe signal/sounding rate/scheme/channel/bandwidth/system state/TSCI/TSMA/task/task parameters) may be changed/varied/adjusted/modified. Change may be according to time table/rule/policy/mode/condition (e.g. undesirable condition)/another change. For example, sounding rate may normally be 100 Hz, but changed to 1000 Hz in demanding situations, and to 1 Hz in low power/standby situation.

Settings may change based on task requirement (e.g. 100 Hz normally and 1000 Hz momentarily for 20 seconds). In task, instantaneous system may be associated adaptively/dynamically to classes/states/conditions (e.g. low/normal/high priority/emergency/critical/regular/privileged/non-subscription/subscription/paying/non-paying). Settings (e.g. sounding rate) may be adjusted accordingly. Change may be controlled by: server/hub/Type1/Type2 device. Scheduled changes may be made according to time table. Changes may be immediate when emergency is detected, or gradual when developing condition is detected.

Characteristics/STI/MI may be monitored/analyzed individually based on a TSCI associated with a particular Type1/Type2 device pair, or jointly based on multiple TSCI associated multiple Type1/Type2 pairs, or jointly based on any TSCI associated with the particular Type2 device and any Type1 devices, or jointly based on any TSCI associated with the particular Type1 device and any Type2 devices, or globally based on any TSCI associated with any Type1/Type2 devices.

A classifier/classification/recognition/detection/estimation/projection/feature extraction/processing/filtering may be applied (e.g. to CI/CI-feature/characteristics/STI/MI), and/or trained/re-trained/updated. In a training stage, training may be performed based on multiple training TSCI of some training wireless multipath channel, or characteristic/STI/MI computed from training TSCI, the training TSCI obtained from training wireless signals transmitted from training Type1 devices and received by training Type2 devices. Re-training/updating may be performed in an operating stage based on training TSCI/current TSCI. There may be multiple classes (e.g. groupings/categories/events/motions/expression/activities/objects/locations) associated with venue/regions/zones/location/environment/home/office/building/warehouse/facility object/expression/motion/movement/process/event/manufacturing/assembly-line/maintenance/repairing/navigation/object/emotional/mental/state/condition/stage/gesture/gait/action/motion/presence/movement/daily/activity/history/event.

Classifier may comprise linear/nonlinear/binary/multi-class/Bayes classifier/Fisher linear discriminant/logistic regression/Markov chain/Monte Carlo/deep/neural network/perceptron/self-organization maps/boosting/meta algorithm/decision tree/random forest/genetic programming/kernel learning/KNN/support vector machine (SVM).

Feature extraction/projection may comprise any of: subspace projection/principal component analysis (PCA)/independent component analysis (ICA)/vector quantization/singular value decomposition (SVD)/eigen-decomposition/eigenvalue/time/frequency/orthogonal/non-orthogonal decomposition, processing/preprocessing/postprocessing. Each CI may comprise multiple components (e.g. vector/combination of complex values). Each component may be preprocessed to give magnitude/phase or a function of such.

Feature may comprise: output of feature extraction/projection, amplitude/magnitude/phase/energy/power/strength/intensity, presence/absence/proximity/likelihood/histogram, time/period/duration/frequency/component/decomposition/projection/band, local/global/maximum (max)/minimum (min)/zero-crossing, repeating/periodic/typical/habitual/one-time/atypical/abrupt/mutually-exclusive/evolving/transient/changing/time-related/correlated feature/pattern/trend/profile/events/tendency/inclination/behavior, cause-and-effect/short-term/long-term/correlation/statistics/frequency/period/duration, motion/movement/location/map/coordinate/height/speed/acceleration/angle/rotation/size/volume, suspicious/dangerous/alarming event/warning/belief/proximity/collision, tracking/breathing/heartbeat/gait/action/event/statistical/hourly/daily/weekly/monthly/yearly parameters/statistics/analytics, well-being/health/disease/medical statistics/analytics, an early/instantaneous/contemporaneous/delayed indication/suggestion/sign/indicator/verifier/detection/symptom of a state/condition/situation/disease/biometric, baby/patient/machine/device/temperature/vehicle/parking lot/venue/lift/elevator/spatial/road/fluid flow/home/room/office/house/building/warehouse/storage/system/ventilation/fan/pipe/duct/people/human/car/boat/truck/airplane/drone/downtown/crowd/impulsive event/cyclo-stationary/environment/vibration/material/surface/3D/2D/local/global, and/or another measurable quantity/variable. Feature may comprise monotonic function of feature, or sliding aggregate of features in sliding window.

Training may comprise AI/machine/deep/supervised/unsupervised/discriminative training/auto-encoder/linear discriminant analysis/regression/clustering/tagging/labeling/Monte Carlo computation.

A current event/motion/expression/object in venue at current time may be classified by applying classifier to current TSCI/characteristics/STI/MI obtained from current wireless signal received by Type2 device in venue from Type1 devices in an operating stage. If there are multiple Type1/Type2 devices, some/all (or their locations/antenna locations) may be a permutation of corresponding training Type1/Type2 devices (or locations/antenna locations). Type1/Type2 device/signal/channel/venue/object/motion may be same/different from corresponding training entity. Classifier may be applied to sliding windows. Current TSCI/characteristics/STI/MI may be augmented by training TSCI/characteristics/STI/MI (or fragment/extract) to bootstrap classification/classifier.

A first section/segment (with first duration/starting/ending time) of a first TSCI (associated with first Type1-Type2 device pair) may be aligned (e.g. using dynamic time warping/DTW/matched filtering, perhaps based on some mismatch/distance/similarity score/cost, or correlation/auto-correlation/cross-correlation) with a second section/segment (with second duration/starting/ending time) of a second TSCI (associated with second Type1-Type2 device pair), with each CI in first section mapped to a CI in second section. First/second TSCI may be preprocessed. Some similarity score (component/item/link/segment-wise) may be computed. The similarity score may comprise any of: mismatch/distance/similarity score/cost. Component-wise similarity score may be computed between a component of first item (CI/feature/characteristics/STI/MI) of first section and corresponding component of corresponding mapped item (second item) of second section. Item-wise similarity score may be computed between first/second items (e.g. based on aggregate of corresponding component-wise similarity scores). An aggregate may comprise any of: sum/weighted sum, weighted average/robust/trimmed mean/arithmetic/geometric/harmonic mean, median/mode. Link-wise similarity score may be computed between first/second items associated with a link (TX-RX antenna pair) of first/second Type1-Type2 device pairs (e.g. based on aggregate of corresponding item-wise similarity scores). Segment-wise similarity score may be computed between first/second segments (e.g. based on aggregate of corresponding link-wise similarity scores). First/second segment may be sliding.

In DTW, a function of any of: first/second segment, first/second item, another first (or second) item of first (or second) segment, or corresponding timestamp/duration/difference/differential, may satisfy a constraint. Time difference between first/second items may be constrained (e.g. upper/lower bounded). First (or second) section may be entire first (or second) TSCI. First/second duration/starting/ending time may be same/different.

In one example, first/second Type1-Type2 device pairs may be same and first/second TSCI may be same/different. When different, first/second TSCI may comprise a pair of current/reference, current/current or reference/reference TSCI. For "current/reference", first TSCI may be current TSCI obtained in operating stage and second TSCI may be reference TSCI obtained in training stage. For "reference/reference", first/second TSCI may be two TSCI obtained during training stage (e.g. for two training events/states/classes). For "current/current", first/second TSCI may be two TSCI obtained during operating stage (e.g. associated with two different antennas, or two measurement setups). In another example, first/second Type1-Type2 device pairs may be different, but share a common device (Type1 or Type2).

Aligned first/second segments (or portion of each) may be represented as first/second vectors. Portion may comprise all items (for "segment-wise"), or all items associated with a TX-RX link (for "link-wise"), or an item (for "item-wise"), or a component of an item (for "component-wise"). Similarity score may comprise combination/aggregate/function of any of: inner product/correlation/autocorrelation/correlation indicator/covariance/discriminating score/distance/Euclidean/absolute/L_k/weighted distance (between first/second vectors). Similarity score may be normalized by vector length. A parameter derived from similarity score may be modeled with a statistical distribution. A scale/location/another parameter of the statistical distribution may be estimated.

Recall there may be multiple sliding segments. Classifier may be applied to a sliding first/second segment pair to obtain a tentative classification result. It may associate current event with a particular class based on one segment pair/tentative classification result, or multiple segment pairs/tentative classification results (e.g. associate if similarity scores prevail (e.g. being max/min/dominant/matchless/most significant/excel) or significant enough (e.g. higher/lower than some threshold) among all candidate classes for N consecutive times, or for a high/low enough percentage, or most/least often in a time period).

Channel information (CI) may comprise any of: signal strength/amplitude/phase/timestamp, spectral power measurement, modem parameters, dynamic beamforming information, transfer function components, radio state, measurable variables, sensing data/measurement, coarse/fine-grained layer information (e.g. PHY/MAC/datalink layer), digital gain/RF filter/frontend-switch/DC offset/correction/IQ-compensation settings, environment effect on wireless signal propagation, channel input-to-output transformation, stable behavior of environment, state profile, wireless channel measurements/received signal strength indicator (RSSI)/channel state information (CSI)/channel impulse response (CIR)/channel frequency response (CFR)/characteristics of frequency components (e.g. subcarriers)/channel characteristics/channel filter response, auxiliary information, data/meta/user/account/access/security/session/status/supervisory/device/network/household/neighborhood/environment/real-time/sensor/stored/encrypted/compressed/protected data, identity/identifier/identification.

Each CI may be associated with timestamp/arrival time/frequency band/signature/phase/amplitude/trend/characteristics, frequency-like characteristics, time/frequency/time-frequency domain element, orthogonal/non-orthogonal decomposition characteristics of signal through channel. Timestamps of TSCI may be irregular and may be corrected (e.g. by interpolation/resampling) to be regular, at least for a sliding time window.

TSCI may be/comprise a link-wise TSCI associated with an antenna of Type1 device and an antenna of Type2 device. For Type1 device with M antennas and Type2 device with N antennas, there may be MN link-wise TSCI.

CI/TSCI may be preprocessed/processed/postprocessed/stored/retrieved/transmitted/received. Some modem/radio state parameter may be held constant. Modem parameters may be applied to radio subsystem and may represent radio state. Motion detection signal (e.g. baseband signal, packet decoded/demodulated from it) may be obtained by processing (e.g. down-converting) wireless signal (e.g. RF/WiFi/LTE/5G/6G signal) by radio subsystem using radio state represented by stored modem parameters. Modem parameters/radio state may be updated (e.g. using previous modem parameters/radio state). Both previous/updated modem parameters/radio states may be applied in radio subsystem (e.g. to process signal/decode data). In the disclosed system, both may be obtained/compared/analyzed/processed/monitored.

Each CI may comprise N1 CI components (CIC) (e.g. time/frequency domain component, decomposition components), each with corresponding CIC index. Each CIC may comprise a real/imaginary/complex quantity, magnitude/phase/Boolean/flag, and/or some combination/subset. Each CI may comprise a vector/matrix/set/collection of CIC. CIC of TSCI associated with a particular CIC index may form a CIC time series. TSCI may be divided into N1 time series of CIC (TSCIC), each associated with respective CIC index. Characteristics/STI/MI may be monitored based on TSCIC. Some TSCIC may be selected based on some criteria/cost function/signal quality metric (e.g. SNR, interference level) for further processing.

Multi-component characteristics/STI/MI of multiple TSCIC (e.g. two components with indices 6 and 7, or three components indexed at 6, 7, 10) may be computed. In particular, k-component characteristics may be a function of k TSCIC with k corresponding CIC indices. With k=1, it is single-component characteristics which may constitute/form a one-dimensional (1D) function as CIC index spans all possible values. For k=2, two-component characteristics may constitute/form a 2D function. In special case, it may depend only on difference between the two indices. In such case, it may constitute 1D function. A total characteristics may be computed based on one or more multi-component characteristics (e.g. weighted average/aggregate). Characteristics/STI/MI of object/motion/expression may be monitored based on any multi-component characteristics/total characteristics.

Characteristics/STI/MI may comprise: instantaneous/short-/long- term/historical/repetitive/repeated/repeatable/recurring/periodic/pseudoperiodic/regular/habitual/incremental/average/initial/final/current/past/future/predicted/changing/deviational/change/time/frequency/orthogonal/non- orthogonal/transform/decomposition/deterministic/ stochastic/probabilistic/dominant/key/prominent/ representative/characteristic/significant/insignificant/ indicative/common/averaged/shared/typical/prototypical/ persistent/abnormal/a brupt/impulsive/sudden/unusual/ unrepresentative/atypical/suspicious/dangerous/alarming/ evolving/transient/one-time quantity/characteristics/ analytics/feature/information, cause-and-effect, correlation indicator/score, auto/cross correlation/covariance, autocorrelation function (ACF), spectrum/spectrogram/power spectral density, time/frequency function/transform/projection, initial/final/temporal/change/trend/pattern/tendency/inclination/behavior/activity/history/profile/event, location/position/localization/spatial coordinate/change on map/path/ navigation/tracking, linear/rotational/horizontal/vertical/ location/distance/displacement/height/speed/velocity/ acceleration/change/angular speed, direction/orientation, size/length/width/height/azimuth/area/volume/capacity, deformation/transformation, object/motion direction/angle/ shape/form/shrinking/expanding, behavior/activity/movement, occurrence, fall-down/accident/security/event, period/ frequency/rate/cycle/rhythm/count/quantity, timing/ duration/interval, starting/initiating/ending/current/past/next time/quantity/information, type/grouping/classification/ composition, presence/absence/proximity/approaching/receding/entrance/exit, identity/identifier, head/mouth/eye/ breathing/heart/hand/handwriting/arm/body/gesture/leg/ gait/organ characteristics, tidal volume/depth of breath/ airflow rate/inhale/exhale time/ratio, gait/walking/tool/ machine/complex motion, signal/motion characteristic/ information/feature/statistics/parameter/magnitude/phase/ degree/dynamics/anomaly/variability/detection/estimation/ recognition/identification/indication, slope/derivative/ higher order derivative of function/feature/mapping/ transformation of another characteristics, mismatch/ distance/similarity score/cost/metric, Euclidean/statistical/ weighted distance, L1/L2/Lk norm, inner/outer product, tag, test quantity, consumed/unconsumed quantity, state/physical/health/well-being/emotional/mental state, output responses, any composition/combination, and/or any related characteristics/information/combination.

Test quantities may be computed. Characteristics/STI/MI may be computed/monitored based on CI/TSCI/features/ similarity scores/test quantities. Static (or dynamic) segment/profile may be identified/computed/analyzed/monitored/extracted/obtained/marked/presented/indicated/ highlighted/stored/communicated by analyzing CI/TSCI/ features/functions of features/test quantities/characteristics/ STI/MI (e.g. target motion/movement presence/detection/ estimation/recognition/identification). Test quantities may be based on CI/TSCI/features/functions of features/characteristics/STI/MI. Test quantities may be processed/tested/ analyzed/compared.

Test quantity may comprise any/any function of: data/ vector/matrix/structure, characteristics/STI/MI, CI information (CII, e.g. CI/CIC/feature/magnitude/phase), directional information (DI, e.g. directional CII), dominant/representative/characteristic/indicative/key/archetypal/example/paradigmatic/prominent/common/shared/typical/prototypical/ averaged/regular/persistent/usual/normal/atypical/unusual/ abnormal/unrepresentative data/vector/matrix/structure, similarity/mismatch/distance score/cost/metric, auto/cross correlation/covariance, sum/mean/average/weighted/ trimmed/arithmetic/geometric/harmonic mean, variance/deviation/absolute/square deviation/averaged/median/total/ standard deviation/derivative/slope/variation/total/absolute/ square variation/spread/dispersion/variability, divergence/ skewness/kurtosis/range/interquartile range/coefficient of variation/dispersion/L-moment/quartile coefficient of dispersion/mean absolute/square difference/Gini coefficient/ relative mean difference/entropy/maximum (max)/minimum (min)/median/percentile/quartile, variance-to-mean ratio, max-to-min ratio, variation/regularity/similarity measure, transient event/behavior, statistics/mode/likelihood/histogram/probability distribution function (pdf)/moment generating function/expected function/value, behavior, repeatedness/periodicity/pseudo-periodicity, impulsiveness/ suddenness/occurrence/recurrence, temporal profile/ characteristics, time/timing/duration/period/frequency/ trend/history, starting/initiating/ending time/quantity/count, motion classification/type, change, temporal/frequency/ cycle change, etc.

Identification/identity/identifier/ID may comprise: MAC address/ASID/USID/AID/UID/UUID, label/tag/index, web link/address, numeral/alphanumeric ID, name/password/account/account ID, and/or another ID. ID may be assigned (e.g. by software/firmware/user/hardware, hardwired, via dongle). ID may be stored/retrieved (e.g. in database/ memory/cloud/edge/local/hub server, stored locally/remotely/permanently/temporarily). ID may be associated with any of: user/customer/household/information/data/address/phone number/social security number, user/customer number/record/account, timestamp/duration/timing. ID may be made available to Type1/Type2 device/sensing/SBP initiator/responder. ID may be for registration/initialization/ communication/identification/verification/detection/recognition/authentication/access control/cloud access/networking/social networking/logging/recording/cataloging/ classification/tagging/association/pairing/transaction/electronic transaction/intellectual property control (e.g. by local/ cloud/server/hub, Type1/Type2/nearby/user/another device, user).

Object may be person/pet/animal/plant/machine/user, baby/child/adult/older person, expert/specialist/leader/commander/manager/personnel/staff/officer/doctor/nurse/ worker/teacher/technician/serviceman/repairman/passenger/patient/customer/student/traveler/inmate/high-value person/, object to be tracked, vehicle/car/AGV/drone/robot/ wagon/transport/remote-controlled machinery/cart/moveable objects/goods/items/material/parts/components/machine/lift/elevator, merchandise/goods/cargo/people/items/ food/package/luggage/equipment/cleaning tool in/on workflow/assembly-line/warehouse/factory/store/supermarket/distribution/logistic/transport/manufacturing/retail/ wholesale/business center/facility/hub, phone/computer/laptop/tablet/dongle/plugin/companion/tool/peripheral/ accessory/wearable/furniture/appliance/amenity/gadget, IoT/networked/smart/portable devices, watch/glasses/ speaker/toys/stroller/keys/wallet/purse/handbag/backpack, goods/cargo/luggage/equipment/motor/machine/utensil/ table/chair/air-conditioner/door/window/heater/fan, light/ fixture/stationary object/television/camera/audio/video/surveillance equipment/parts, ticket/parking/toll/airplane ticket, credit/plastic/access card, object with fixed/changing/ no form, mass/solid/liquid/gas/fluid/smoke/fire/flame, signage, electromagnetic (EM) source/medium, and/or another object.

Object may have multiple parts, each with different movement (e.g. position/location/direction change). Object may be a person walking forward. While walking, his left/right hands may move in different directions, with different instantaneous motion/speed/acceleration.

Object may/may not be communicatively coupled with some network, such as WiFi, MiFi, 4G/LTE/5G/6G/7G/8G, Bluetooth/NFC/BLE/WiMax/Zigbee/mesh/adhoc network.

Object may be bulky machinery with AC power supply that is moved during installation/cleaning/maintenance/renovation. It may be placed on/in moveable platforms such as elevator/conveyor/lift/pad/belt/robot/drone/forklift/car/boat/vehicle. Type1/Type2 device may attach to/move with object. Type1/Type2 device may be part of/embedded in portable/another device (e.g. module/device with module, which may be large/sizeable/small/heavy/bulky/light, e.g. coin-sized/cigarette-box-sized). Type1/Type2/portable/another device may/may not be attached to/move with object, and may have wireless (e.g. via Bluetooth/BLE/Zigbee/NFC/WiFi) or wired (e.g. USB/micro-USB/Firewire/HDMI) connection with a nearby device for network access (e.g. via WiFi/cellular network). Nearby device may be object/phone/AP/IoT/device/appliance/peripheral/amenity/furniture/vehicle/gadget/wearable/networked/computing device. Nearby device may be connected to some server (e.g. cloud server via network/internet). It may/may not be portable/moveable, and may/may not move with object. Type1/Type2/portable/nearby/another device may be powered by battery/solar/DC/AC/other power source, which may be replaceable/non-replaceable, and rechargeable/non-rechargeable. It may be wirelessly charged.

Type1/Type2/portable/nearby/another device may comprise any of: computer/laptop/tablet/pad/phone/printer/monitor/battery/antenna, peripheral/accessory/socket/plug/charger/switch/adapter/dongle, internet-of-thing (IoT), TV/sound bar/HiFi/speaker/set-top box/remote control/panel/gaming device, AP/cable/broadband/router/repeater/extender, appliance/utility/fan/refrigerator/washer/dryer/microwave/oven/stove/range/light/lamp/tube/pipe/tap/lighting/air-conditioner/heater/smoke detector, wearable/watch/glasses/goggle/button/bracelet/chain/jewelry/ring/belt/clothing/garment/fabric/shirt/pant/dress/glove/handwear/shoe/footwear/ha t/headwear/bag/purse/wallet/makeup/cosmetic/ornament/book/magazine/paper/stationary/signage/poster/display/printed matter, furniture/fixture/table/desk/chair/sofa/bed/cabinet/shelf/rack/storage/box/bucket/basket/packaging/carriage/tile/shingle/brick/block/mat/panel/curtain/cushion/pad/carpet/material/building material/glass, amenity/sensor/clock/pot/pan/ware/container/bottle/can/utensil/plate/cup/bowl/toy/ball/tool/pen/racket/lock/bell/camera/microphone/painting/frame/mirror/coffee-maker/door/window, food/pill/medicine, embeddable/implantable/gadget/instrument/equipment/device/apparatus/machine/controller/mechanical tool, garage-opener, key/plastic/payment/credit card/ticket, solar panel, key tracker, fire-extinguisher, garbage can/bin, WiFi-enabled device, smart device/machine/machinery/system/house/office/building/warehouse/facility/vehicle/car/bicycle/motorcycle/boat/vessel/airplane/cart/wagon, home/vehicle/office/factory/building/manufacturing/production/computing/security/another device.

One/two/more of Type1/Type2/portable/nearby/another device/server may determine an initial characteristics/STI/MI of object, and/or may share intermediate information. One of Type1/Type2 device may move with object (e.g. "Tracker Bot"). The other one of Type1/Type2 device may not move with object (e.g. "Origin Satellite", "Origin Register"). Either may have known characteristics/STI/MI. Initial STI/MI may be computed based on known STI/MI.

Venue may be any space such as sensing area, room/house/home/office/workplace/building/facility/warehouse/factory/store/vehicle/property, indoor/outdoor/enclosed/semi-enclosed/open/semi-open/closed/over-air/floating/underground space/area/structure/enclosure, space/area with wood/glass/metal/material/structure/frame/beam/panel/column/wall/floor/door/ceiling/window/cavity/gap/opening/reflection/refraction medium/fluid/construction material/fixed/adjustable layout/shape, human/animal/plant body/cavity/organ/bone/blood/vessel/air-duct/windpipe/teeth/soft/hard/rigid/non-rigid tissue, manufacturing/repair/maintenance/mining/parking/storage/transportation/shipping/logistic/sports/entertainment/amusement/public/recreational/government/community/seniors/elderly care/geriatric/space facility/terminal/hub, distribution center/store, machine/engine/device/assembly line/workflow, urban/rural/suburban/metropolitan area, staircase/escalator/elevator/hallway/walkway/tunnel/cave/cavern/channel/duct/pipe/tube/lift/well/pathway/roof/basement/den/alley/road/path/highway/sewage/ventilation system/network, car/truck/bus/van/container/ship/boat/submersible/train/tram/airplane/mobile home, stadium/city/playground/park/field/track/court/gymnasium/hall/mart/market/supermarket/plaza/square/construction site/hotel/museum/school/hospital/university/garage/mall/airport/train/bus station/terminal/hub/platform, valley/forest/wood/terrain/landscape/garden/park/patio/land, and/or gas/oil/water pipe/line. Venue may comprise inside/outside of building/facility. Building/facility may have one/multiple floors, with a portion underground.

A event may be monitored based on TSCI. Event may be object/motion/gesture/gait related, such as fall-down, rotation/hesitation/pause, impact (e.g. person hitting sandbag/door/bed/window/chair/table/desk/cabinet/box/another person/animal/bird/fly/ball/bowling/tennis/soccer/volley ball/football/baseball/basketball), two-body action (e.g. person releasing balloon/catching fish/molding clay/writing paper/typing on computer), car moving in garage, person carrying smart phone/walking around venue, autonomous/moveable object/machine moving around (e.g. vacuum cleaner/utility/self-driving vehicle/car/drone).

Task may comprise: (a) sensing task, any of: monitoring/sensing/detection/recognition/estimation/verification/identification/authentication/classification/locationing/guidance/navigation/tracking/counting of/in any of: object/objects/vehicle/machine/tool/human/baby/elderly/patient/intruder/pet presence/proximity/activity/daily-activity/well-being/breathing/vital sign/heartbeat/health condition/sleep/sleep stage/walking/location/distance/speed/acceleration/navigation/tracking/exercise/safety/danger/fall-down/intrusion/security/life- threat/emotion/movement/motion/degree/pattern/periodic/repeated/cyclo-stationary/stationary/regular/transient/sudden/suspicious motion/irregularity/trend/change/breathing/human biometrics/environment informatics/gait/gesture/room/region/zone/venue, (b) computation task, any of: signal processing/preprocess/postprocessing/conditioning/denoising/calibration/analysis/feature extraction/transformation/mapping/supervised/unsupervised/semi-supervised/discriminative/machine/deep learning/training/clustering/training/PCA/eigen-decomposition/frequency/time/functional decomposition/neural network/map-based/model-based processing/correction/geometry estimation/analytics computation, (c) IoT task, any of: smart task for venue/user/object/human/pet/house/home/office/workplace/building/facility/warehouse/factory/store/vehicle/property/structure/assembly-line/IoT/device/system, energy/power management/transfer, wireless power transfer, interacting/engage with user/object/intruder/human/animal (e.g. presence/motion/gesture/gait/activity/behavior/voice/command/instruction/query/music/sound/image/vide o/location/movement/danger/threat detection/recognition/monitoring/analysis/response/execution/synthesis, generate/retrieve/play/display/render/synthesize dialog/exchange/ response/presentation/experience/media/multimedia/ expression/sound/speech/music/image/imaging/video/ animation/webpage/text/message/notification/reminder/ enquiry/warning, detect/recognize/monitor/interpret/ analyze/record/store user/intruder/object input/motion/ gesture/location/activity), activating/controlling/configuring (e.g. turn on/off/control/lock/unlock/open/close/adjust/configure) a device/system (e.g. vehicle/drone/electrical/mechanical/air-conditioning/heating/lighting/ventilation/ clearning/entertainment/IoT/security/siren/access system/ device/door/window/garage/lift/elevator/escalator/speaker/ television/light/peripheral/accessory/wearable/furniture/ appliance/amenity/gadget/alarm/camera/gaming/coffee/ cooking/heater/fan/housekeeping/home/office machine/ device/robot/vacuum cleaner/assembly line), (d) miscellaneous task, any of: transmission/coding/encryption/ storage/analysis of data/parameters/analytics/derived data, upgrading/administration/configuration/coordination/broadcasting/synchronization/networking/encryption/communication/protection/compression/storage/database/archiving/ query/cloud computing/presentation/augmented/virtual reality/other processing/task. Task may be performed by some of: Type1/Type2/nearby/portable/another device, and/ or hub/local/edge/cloud server.

Task may also comprise: detect/recognize/monitor/locate/ interpret/analyze/record/store user/visitor/intruder/object/ pet, interact/engage/converse/dialog/exchange with user/object/visitor/intruder/human/baby/pet, detect/locate/localize/ recognize/monitor/analyze/interpret/learn/train/respond/ execute/synthesize/generate/record/store/summarize health/ well-being/daily-life/activity/behavior/pattern/exercise/ food-intake/restroom visit/work/play/rest/sleep/relaxation/ danger/routine/timing/habit/trend/normality/normalcy/ anomaly/regularity/irregularity/change/presence/motion/ gesture/gait/expression/emotion/state/stage/voice/ command/instruction/question/query/music/sound/ location/movement/fall-down/threat/discomfort/sickness/ environment/, generate/retrieve/play/display/render/ synthesize dialog/exchange/response/presentation/report/ experience/media/multimedia/expression/sound/speech/ music/image/imaging/video/animation/webpage/text/ message/notification/reminder/enquiry/warning, detect/ recognize/monitor/interpret/analyze/record/store user/ intruder/object input/motion/gesture/location/activity), detect/check/monitor/locate/manage/control/adjust/configure/lock/unlock/arm/disarm/open/close/fully/partially/activat e/turn on/off some system/device/object (e.g. vehicle/ robot/drone/electrical/mechanical/air-conditioning/heating/ ventilation/HVAC/lighting/cleaning/entertainment/IoT/ security/siren/access systems/devices/items/components, door/window/garage/lift/elevator/escalator/speaker/television/light/peripheral/accessory/wearable/furniture/appliance/amenity/gadget/alarm/camera/gaming/coffee/cooking/ heater/fan/housekeeping/home/office machine/device/ vacuum cleaner/assembly line/window/garage/door/blind/ curtain/panel/solar panel/sun shade), detect/monitor/locate user/pet do something (e.g. sitting/sleeping on sofa/in bedroom/running on treadmill/cooking/watching TV/eating in kitchen/dining room/going upstairs/downstairs/outside/inside/using rest room), do something (e.g. generate message/ response/warning/clarification/notification/report) automatically upon detection, do something for user automatically upon detecting user presence, turn on/off/wake/control/adjust/dim light/music/radio/TV/HiFi/STB/computer/speaker/ smart device/air-conditioning/ventilation/heating system/ curtains/light shades, turn on/off/pre-heat/control coffeemachine/hot-water-pot/cooker/oven/microwave oven/ another cooking device, check/manage temperature/setting/ weather forecast/telephone/message/mail/system check, present/interact/engage/dialog/converse (e.g. through smart speaker/display/screen; via webpage/email/messaging system/notification system).

When user arrives home by car, task may be to, automatically, detect user/car approaching, open garage/door upon detection, turn on driveway/garage light as user approaches garage, and/or turn on air conditioner/heater/fan. As user enters house, task may be to, automatically, turn on entrance light/off driveway/garage light, play greeting message to welcome user, turn on user's favorite music/radio/news/ channel, open curtain/blind, monitor user's mood, adjust lighting/sound environment according to mood/current/imminent event (e.g. do romantic lighting/music because user is scheduled to eat dinner with girlfriend soon) on user's calendar, warm food in microwave that user prepared in morning, do diagnostic check of all systems in house, check weather forecast for tomorrow/news of interest to user, check calendar/to-do list, play reminder, check telephone answering/messaging system/email, give verbal report using dialog system/speech synthesis, and/or remind (e.g. using audible tool such as speakers/HiFi/speech synthesis/sound/ field/voice/music/song/dialog system, using visual tool such as TV/entertainment system/computer/notebook/tablet/display/light/color/brightness/patterns symbols, using haptic/ virtual reality/gesture/tool, using smart device/appliance/ material/furniture/fixture, using server/hub device/cloud/ fog/edge server/home/mesh network, using messaging/ notification/communication/scheduling/email tool, using UI/GUI, using scent/smell/fragrance/taste, using neural/nervous system/tool, or any combination) user of someone's birthday/call him, prepare/give report. Task may turn on air conditioner/heater/ventilation system in advance, and/or adjust temperature setting of smart thermostat in advance. As user moves from entrance to living room, task may be to turn on living room light, open living room curtain, open window, turn off entrance light behind user, turn on TV/settop box, set TV to user's favorite channel, and/or adjust an appliance according to user's preference/conditions/states (e.g. adjust lighting, choose/play music to build romantic atmosphere).

When user wakes up in morning, task may be to detect user moving around in bedroom, open blind/curtain/window, turn off alarm clock, adjust temperature from nighttime to day-time profile, turn on bedroom light, turn on restroom light as user approaches restroom, check radio/ streaming channel and play morning news, turn on coffee machine, preheat water, and/or turn off security system. When user walks from bedroom to kitchen, task may be to turn on kitchen/hallway lights, turn off bedroom/restroom lights, move music/message/reminder from bedroom to kitchen, turn on kitchen TV, change TV to morning news channel, lower kitchen blind, open kitchen window, unlock backdoor for user to check backyard, and/or adjust temperature setting for kitchen.

When user leaves home for work, task may be to detect user leaving, play farewell/have-a-good-day message, open/ close garage door, turn on/off garage/driveway light, close/ lock all windows/doors (if user forgets), turn off appliance (e.g. stove/microwave/oven), turn on/arm security system, adjust light/air-conditioning/heating/ventilation systems to "away" profile to save energy, and/or send alerts/reports/ updates to user's smart phone.

Motion may comprise any of: no-motion, motion sequence, resting/non-moving motion, movement/change in position/location, daily/weekly/monthly/yearly/repeating/ activity/behavior/action/routine, transient/time-varying/fall-down/repeating/repetitive/periodic/pseudo-periodic motion/breathing/heartbeat, deterministic/non-deterministic/probabilistic/chaotic/random motion, complex/combination motion, non-/pseudo-/cyclo-/stationary random motion, change in electro-magnetic characteristics, human/animal/plant/body/machine/mechanical/vehicle/drone motion, air-/wind-/weather-/water-/fluid-/ground/sub-surface/seismic motion, man-machine interaction, normal/abnormal/dangerous/warning/suspicious motion, imminent/rain/fire/flood/tsunami/explosion/collision, head/facial/eye/mouth/tongue/neck/finger/hand/arm/shoulder/upper/lower/body/chest/abdominal/hip/leg/foot/joint/knee/elbow/skin/below-skin/subcutaneous tissue/blood vessel/intravenous/organ/heart/lung/stomach/intestine/bowel/eating/breathing/talking/singing/dancing/coordinated motion, facial/eye/mouth expression, and/or hand/arm/gesture/gait/UI/keystroke/typing stroke.

Type1/Type2 device may comprise heterogeneous IC, low-noise amplifier (LNA), power amplifier, transmit-receive switch, media access controller, baseband radio, and/or 2.4/3.65/4.9/5/6/sub-7/over-7/28/60/76 GHz/another radio. Heterogeneous IC may comprise processor/memory/software/firmware/instructions. It may support broadband/wireless/mobile/mesh/cellular network, WLAN/WAN/MAN, standard/IEEE/3GPP/WiFi/4G/LTE/5G/6G/7G/8G, IEEE 802.11/a/b/g/n/ac/ad/af/ah/ax/ay/az/be/bf/15/16, and/or Bluetooth/BLE/NFC/Zigbee/WiMax.

Processor may comprise any of: general-/special-/purpose/embedded/multi-core processor, microprocessor/microcontroller, multi-/parallel/CISC/RISC processor, CPU/GPU/DSP/ASIC/FPGA, and/or logic circuit. Memory may comprise non-/volatile, RAM/ROM/EPROM/EEPROM, hard disk/SSD, flash memory, CD-/DVD-ROM, magnetic/optical/organic/storage system/network, network/cloud/edge/local/external/internal storage, and/or any non-transitory storage medium. Set of instructions may comprise machine executable codes in hardware/IC/software/firmware, and may be embedded/pre-loaded/loaded upon-boot-up/on-the-fly/on-demand/pre-installed/installed/downloaded.

Processing/preprocessing/postprocessing may be applied to data (e.g. TSCI/feature/characteristics/STI/MI/test quantity/intermediate/data/analytics) and may have multiple steps. Step/pre-/post-/processing may comprise any of: computing function of operands/LOS/non-LOS/single-link/multi-link/component/item/quantity, magnitude/norm/phase/feature/energy/timebase/similarity/distance/characterization score/measure computation/extraction/correction/cleaning, linear/nonlinear/FIR/IIR/MA/AR/ARMA/Kalman/particle filtering, lowpass/bandpass/highpass/median/rank/quartile/percentile/mode/selective/adaptive filtering, interpolation/intrapolation/extrapolation/decimation/subsampling/upsampling/resampling, matched filtering/enhancement/restoration/denoising/smoothing/conditioning/spectral analysis/mean subtraction/removal, linear/nonlinear/inverse/frequency/time transform, Fourier transform (FT)/DTFT/DFT/FFT/wavelet/Laplace/Hilbert/Hadamard/trigonometric/sine/cosine/DCT/power-of-2/sparse/fast/frequency transform, zero/cyclic/padding, graph-based transform/processing, decomposition/orthogonal/non-orthogonal/over-complete projection/eigen-decomposition/SVD/PCA/ICA/compressive sensing, grouping/folding/sorting/comparison/soft/hard/thresholding/clipping, first/second/high order derivative/integration/convolution/multiplication/division/addition/subtraction, local/global/maximization/minimization, recursive/iterative/constrained/batch processing, least mean square/absolute error/deviation, cost function optimization, neural network/detection/recognition/classification/identification/estimation/labeling/association/tagging/mapping/remapping/training/clustering/machine/supervised/unsupervised/semi-supervised learning/network, vector/quantization/encryption/compression/matching pursuit/scrambling/coding/storing/retrieving/transmitting/receiving/time-domain/frequency- domain/normalization/scaling/expansion/representing/merging/combining/splitting/tracking/monitoring/shape/silhouette/motion/activity/analysis, pdf/histogram estimation/importance/Monte Carlo sampling, error detection/protection/correction, doing nothing, time-varying/adaptive processing, conditioning/weighted/averaging/over selected components/links, arithmetic/geometric/harmonic/trimmed mean/centroid/medoid computation, morphological/logical operation/permutation/combination/sorting/AND/OR/XOR/union/intersection, vector operation/addition/subtraction/multiplication/division, and/or another operation. Processing may be applied individually/jointly. Acceleration using GPU/DSP/coprocessor/multicore/multiprocessing may be applied.

Function may comprise: characteristics/feature/magnitude/phase/energy, scalar/vector/discrete/continuous/polynomial/exponential/logarithmic/trigonometric/transcendental/logical/piecewise/linear/algebraic/nonlinear/circular/piecewise linear/real/complex/vector-valued/inverse/absolute/indicator/limiting/floor/rounding/sign/composite/sliding/moving function, derivative/integration, function of function, one-to-one/one-to-many/many-to-one/many-to-many function, mean/mode/median/percentile/max/min/range/statistics/histogram, local/global max/min/zero-crossing, variance/variation/spread/dispersion/deviation/standard deviation/divergence/range/interquartile range/total variation/absolute/total deviation, arithmetic/geometric/harmonic/trimmed mean/square/cube/root/power, thresholding/clipping/rounding/truncation/quantization/approximation, time function processed with an operation (e.g. filtering), sine/cosine/tangent/cotangent/secant/cosecant/elliptical/parabolic/hyperbolic/game/zeta function, probabilistic/stochastic/random/ergodic/stationary/deterministic/periodic/repeated function, inverse/transformation/frequency/discrete time/Laplace/Hilbert/sine/cosine/triangular/wavelet/integer/power-of-2/sparse transform, orthogonal/non-orthogonal/eigen projection/decomposition/eigenvalue/singular value/PCA/ICA/SVD/compressive sensing, neural network, feature extraction, function of moving window of neighboring items of time series, filtering function/convolution, short-time/discrete transform/Fourier/cosine/sine/Hadamard/wavelet/sparse transform, matching pursuit, approximation, graph-based processing/transform/graph signal processing, classification/identification/class/group/category/labeling, processing/preprocessing/postprocessing, machine/learning/detection/estimation/feature extraction/learning network/feature extraction/denoising/signal enhancement/coding/encryption/mapping/vector quantization/remapping/lowpass/highpass/bandpass/matched/Kalman/particle/FIR/IIR/MA/AR/ARMA/median/mode/adaptive filtering, first/second/high order derivative/integration/zero crossing/smoothing, up/down/random/importance/Monte Carlo sampling/resampling/converting, interpolation/extrapolation, short/long term statistics/auto/cross correlation/moment generating function/time averaging/weighted averaging, special/Bessel/Beta/Gamma/Gaussian/Poisson/integral complementary error function.

Sliding time window may have time-varying width/size. It may be small/large at beginning to enable fast/accurate acquisition and increase/decrease over time to steady-state size comparable to motion frequency/period/transient motion duration/characteristics/STI/MI to be monitored. Window size/time shift between adjacent windows may be constant/adaptively/dynamically/automatically changed/adjusted/varied/modified (e.g. based on battery life/power consumption/available computing power/change in amount of targets/nature of motion to be monitored/user request/choice/instruction/command).

Characteristics/STI/MI may be determined based on characteristic value/point of function and/or associated argument of function (e.g. time/frequency). Function may be outcome of a regression. Characteristic value/point may comprise local/global/constrained/significant/first/second/i^th maximum/minimum/extremum/zero-crossing (e.g. with positive/negative time/frequency/argument) of function. Local signal-to-noise-ratio (SNR) or SNR-like parameter may be computed for each pair of adjacent local max (peak)/local min (valley) of function, which may be some function (e.g. linear/log/exponential/monotonic/power/polynomial) of fraction or difference of a quantity (e.g. power/magnitude) of local max over the quantity of local min. Local max (or min) may be significant if its SNR is greater than threshold and/or if its amplitude is greater (or smaller) than another threshold. Local max/min may be selected/identified/computed using persistence-based approach. Some significant local max/min may be selected based on selection criterion (e.g. quality criterion/condition, strongest/consistent significant peak in a range). Unselected significant peaks may be stored/monitored as "reserved" peaks for use in future selection in future sliding time windows. E.g. a particular peak (e.g. at particular argument/time/frequency) may appear consistently over time. Initially, it may be significant but not selected (as other peaks may be stronger). Later, it may become stronger/dominant consistently. When selected, it may be back-traced in time and selected in earlier time to replace previously selected peaks (momentarily strong/dominant but not persistent/consistent). Consistency of peak may be measured by trace, or duration of being significant. Alternatively, local max/min may be selected based on finite state machine (FSM). Decision thresholds may be time-varying, adjusted adaptively/dynamically (e.g. based on back-tracing timing/FSM, or data distribution/statistics).

A similarity score (SS)/component SS may be computed based on two temporally adjacent CI/CIC, of one TSCI or of two different TSCI. The pair may come from same/different sliding window (s). SS or component SS may comprise: time reversal resonating strength (TRRS), auto/cross correlation/covariance, inner product of two vectors, L1/L2/Lk/Euclidean/statistical/weighted/distance score/norm/metric/quality metric, signal quality condition, statistical characteristics, discrimination score, neural network/deep learning network/machine learning/training/discrimination/weighted averaging/preprocessing/denoising/signal conditioning/filtering/time correction/timing compensation/phase offset compensation/transformation/component-wise operation/feature extraction/FSM, and/or another score.

Any threshold may be fixed (e.g. 0, 0.5, 1, 1.5, 2), pre-determined and/or adaptively/dynamically determined (e.g. by FSM, or based on time/space/location/antenna/path/link/state/battery life/remaining battery life/available resource/power/computation power/network bandwidth). Threshold may be applied to test quantity to differentiate two events/conditions/situations/states, A and B. Data (e.g. CI/TSCI/feature/similarity score/test quantity/characteristics/STI/MI) may be collected under A/B in training situation. Test quantity (e.g. its distribution) computed based on data may be compared under A/B to choose threshold based on some criteria (e.g. maximum likelihood (ML), maximum aposterior probability (MAP), discriminative training, minimum Type 1 (or 2) error for given Type 2 (or 1) error, quality criterion, signal quality condition). Threshold may be adjusted (e.g. to achieve different sensitivity), automatically/semi-automatically/manually/adaptively/dynamically, once/sometimes/often/periodically/repeatedly/occasionally/sporadically/on-demand (e.g. based on object/movement/location direction/action/characteristics/STI/MI/size/property/trait/habit/behavior/venue/feature/fixture/furniture/barrier/material/machine/living thing/thing/boundary/surface/medium/map/constraint/model/event/state/situation/condition/time/timing/duration/state/history/user/preference). An iterative algorithm may stop after N iterations, after time-out period, or after test quantity satisfies a condition (e.g. updated quantity greater than threshold) which may be fixed/adaptively/dynamically adjusted.

Searching for local extremum may comprise constrained/minimization/maximization, statistical/dual/constraint/convex/global/local/combinatorial/infinite-dimensional/multi-objective/multi-modal/non-differentiable/particle-swarm/simulation-based optimization, linear/nonlinear/quadratic/higher-order regression, linear/nonlinear/stochastic/constraint/dynamic/mathematical/disjunctive/convex/semidefinite/conic/cone/interior/fractional/integer/sequential/quadratic programming, conjugate/gradient/subgradient/coordinate/reduced descent, Newton's/simplex/iterative/point/ellipsoid/quasi-Newton/interpolation/memetic/genetic/evolutionary/pattern-/gravitational-search method/algorithm, constraint satisfaction, calculus of variations, optimal control, space mapping, heuristics/meta-heuristics, numerical analysis, simultaneous perturbation stochastic approximation, stochastic tunneling, dynamic relaxation, hill climbing, simulated annealing, differential evolution, robust/line/Tabu/reactive search/optimization, curve fitting, least square, variational calculus, and/or variant. It may be associated with an objective/loss/cost/utility/fitness/energy function.

Regression may be performed using regression function to fit data, or function (e.g. ACF/transform/mapped) of data, in regression window. During iterations, length/location of regression window may be changed. Regression function may be linear/quadratic/cubic/polynomial/another function. Regression may minimize any of: mean/weighted/absolute/square deviation, error, aggregate/component/weighted/mean/sum/absolute/square/high-order/another error/cost (e.g. in projection domain/selected axes/orthogonal axes), robust error (e.g. first error (e.g. square) for smaller error magnitude, second error (e.g. absolute) for larger error magnitude), and/or weighted sum/mean of multiple errors (e.g. absolute/square error). Error associated with different links/path may have different weights (e.g. link with less noise may have higher weight). Regression parameter (e.g. time-offset associated with max/min regression error of regression function in regression window, location/width of window) may be initialized and/or updated during iterations (e.g. based on target value/range/profile, characteristics/STI/MI/test quantity, object motion/quantity/count/location/state, past/current trend, location/amount/distribution of local extremum in previous windows, carrier/subcarrier frequency/bandwidth of signal, amount of antennas associated with the channel, noise characteristics, histogram/distribution/central/F-distribution, and/or threshold). When converged, current time offset may be at center/left/right (or fixed relative location) of regression window.

In presentation, information may be displayed/presented (e.g. with venue map/environmental model). Information may comprise: current/past/corrected/approximate/map/location/speed/acceleration/zone/region/area/segmentation/coverage-area, direction/path/trace/history/traffic/summary, frequently-visited areas, customer/crowd event/distribution/behavior, crowd-control information, acceleration/speed/vital-sign/breathing/heart-rate/activity/emotion/sleep/state/rest information, motion-statistics/MI/STI, presence/absence of motion/people/pets/object/vital sign, gesture (e.g. hand/arm/foot/leg/body/head/face/mouth/eye)/meaning/control (control of devices using gesture), location-based gesture-control/motion-interpretation, identity/identifier (ID) (e.g. of object/person/user/pet/zone/region, device/machine/vehicle/drone/car/boat/bicycle/TV/air-con/fan/, self-guided machine/device/vehicle), environment/weather information, gesture/gesture control/motion trace, earthquake/explosion/storm/rain/fire/temperature, collision/impact/vibration, event/door/window/open/close/fall-down/accident/burning/freezing/water-/wind-/air-movement event, repeated/pseudo-periodic event (e.g. running on treadmill, jumping up/down, skipping rope, somersault), and/or vehicle event. Location may be one/two/three dimensional (e.g. expressed/represented as 1D/2D/3D rectangular/polar coordinates), relative (e.g. w.r.t. map/environmental model) or relational (e.g. at/near/distance—from a point, halfway between two points, around corner, upstairs, on table top, at ceiling, on floor, on sofa).

Information (e.g. location) may be marked/displayed with some symbol. Symbol may be time-varying/flashing/pulsating with changing color/intensity/size/orientation. Symbol may be a number reflecting instantaneous quantity (e.g. analytics/gesture/state/status/action/motion/breathing/heart rate, temperature/network traffic/connectivity/remaining power). Symbol/size/orientation/color/intensity/rate/characteristics of change may reflect respective motion. Information may be in text or presented visually/verbally (e.g. using pre-recorded voice/voice synthesis)/mechanically (e.g. animated gadget, movement of movable part).

User device may comprise smart phone/tablet/speaker/camera/display/TV/gadget/vehicle/appliance/device/IoT, device with UI/GUI/voice/audio/record/capture/sensor/playback/display/animation/VR/AR (augmented reality)/voice (assistance/recognition/synthesis) capability, and/or tablet/laptop/PC.

Map/floor plan/environmental model (e.g. of home/office/building/store/warehouse/facility) may be 2-/3-/higher-dimensional. It may change/evolve over time (e.g. rotate/zoom/move/jump on screen). Walls/windows/doors/entrances/exits/forbidden areas may be marked. It may comprise multiple layers (overlays). It may comprise maintenance map/model comprising water pipes/gas pipes/wiring/cabling/air ducts/crawl-space/ceiling/underground layout.

Venue may be segmented/subdivided/zoned/grouped into multiple zones/regions/sectors/sections/territories/districts/precincts/localities/neighborhoods/areas/stretches/expance such as bedroom/living/dining/rest/storage/utility/warehouse/conference/work/walkway/kitchen/foyer/garage/first/second floor/offices/reception room/area/regions. Segments/regions/areas may be presented in map/floor plan/model with presentation characteristic (e.g. brightness/intensity/luminance/color/chrominance/texture/animation/flashing/rate).

An example of disclosed system/apparatus/method. Stephen and family want to install disclosed wireless motion detection system to detect motion in their 2000 sqft two-storey town house in Seattle, Washington. Because his house has two storeys, Stephen decides to use one Type2 device (named A) and two Type1 devices (named B and C) in ground floor. His ground floor has three rooms: kitchen, dining and living rooms arranged in straight line, with dining room in middle. He put A in dining room, and B in kitchen and C in living room, partitioning ground floor into 3 zones (dining room, living room, kitchen). When motion is detected by AB pair and/or AC pair, system would analyze TSCI/feature/characteristics/STI/MI and associate motion with one of 3 zones.

When Stephen and family go camping in holiday, he uses mobile phone app (e.g. Android phone app or iPhone app) to turn on motion detection system. If system detects motion, warning signal is sent to Stephen (e.g. SMS, email, push message to mobile phone app). If Stephen pays monthly fee (e.g. $10/month), a service company (e.g. security company) will receive warning signal through wired (e.g. broadband)/wireless (e.g. WiFi/LTE/5G) network and perform security procedure (e.g. call Stephen to verify any problem, send someone to check on house, contact police on behalf of Stephen).

Stephen loves his aging mother and cares about her well-being when she is alone in house. When mother is alone in house while rest of family is out (e.g. work/shopping/vacation), Stephen turns on motion detection system using his mobile app to ensure mother is ok. He uses mobile app to monitor mother's movement in house. When Stephen uses mobile app to see that mother is moving around house among the three regions, according to her daily routine, Stephen knows that mother is ok. Stephen is thankful that motion detection system can help him monitor mother's well-being while he is away from house.

On typical day, mother would wake up at 7 am, cook her breakfast in kitchen for 20 minutes, eat breakfast in dining room for 30 minutes. Then she would do her daily exercise in living room, before sitting down on sofa in living room to watch favorite TV show. Motion detection system enables Stephen to see timing of movement in 3 regions of house. When motion agrees with daily routine, Stephen knows roughly that mother should be doing fine. But when motion pattern appears abnormal (e.g. no motion until 10 am, or in kitchen/motionless for too long), Stephen suspects something is wrong and would call mother to check on her. Stephen may even get someone (e.g. family member/neighbor/paid personnel/friend/social worker/service provider) to check on mother.

One day Stephen feels like repositioning a device. He simply unplugs it from original AC power plug and plugs it into another AC power plug. He is happy that motion detection system is plug-and-play and the repositioning does not affect operation of system. Upon powering up, it works right away.

Sometime later, Stephen decides to install a similar setup (i.e. one Type2 and two Type1 devices) in second floor to monitor bedrooms in second floor. Once again, he finds that system set up is extremely easy as he simply needs to plug Type2 device and Type1 devices into AC power plug in second floor. No special installation is needed. He can use same mobile app to monitor motion in both ground/second floors. Each Type2 device in ground/second floors can interact with all Type1 devices in both ground/second floors. Stephen has more than double capability with combined systems.

Disclosed system can be applied in many applications. Type1/Type2 devices may be any WiFi-enabled devices (e.g. smart IoT/appliance/TV/STB/speaker/refrigerator/stove/ oven/microwave/fan/heater/air-con/router/phone/computer/tablet/accessory/plug/pipe/lamp/smoke detector/furniture/fixture/shelf/cabinet/door/window/lock/sofa/table/chair/piano/utensil/wearable/watch/tag/key/ticket/belt/wallet/pen/hat/necklace/implantable/phone/eyeglasses/glass panel/gaming device) at home/office/facility, on table, at ceiling, on floor, or at wall. They may be placed in conference room to count people. They may form a well-being monitoring system to monitor daily activities of older adults and detect any sign of symptoms (e.g. dementia, Alzheimer's disease). They may be used in baby monitors to monitor vital signs (breathing) of babies. They may be placed in bedrooms to monitor sleep quality and detect any sleep apnea. They may be placed in cars to monitor well-being of passengers and drivers, detect sleepy drivers or babies left in hot cars. They may be used in logistics to prevent human trafficking by monitoring any human hidden in trucks/containers. They may be deployed by emergency service at disaster area to search for trapped victims in debris. They may be deployed in security systems to detect intruders.

User presence detection, e.g. child presence detection (CPD), is an essential vehicular technology that prevents heat-related injuries or fatalities by detecting the presence of an unattended user (e.g. a child). With the increasing number of child heatstroke deaths reported over the past decades, in-car child presence detection (CPD) systems have become a safety evaluation criterion for next-generation automobiles. The European New Car Assessment Program (Euro NCAP) has introduced a child occupant protection protocol to ensure the protection of children from heart stroke deaths and offers rewards to vehicles that offer CPD solutions satisfying the given protocol. Existing solutions (e.g. CPD solutions based on indirect sensing methods, such as pressure, weight, heat, capacitive and PIR sensors) have limitations in terms of accuracy, coverage, and additional device requirements. While WiFi-based solutions can overcome the limitations, they face challenges in dealing with environmental impacts and distinguishing child-only presence from adult presence.

The present disclosure discloses a robust, WiFi-based child presence detection (RoWiCPD) system using commodity WiFi. In some embodiments, the system may include three main modules: a presence detection module, a seat occupancy detection module, and a child and adult classification module. The presence detection module leverages image enhancement techniques to improve detection in unfavorable scenarios with remarkable accuracy and minimal false alarms. The seat occupancy detection module determines the occupied seat using confidence scores that measure the quality of the breathing signal. The child and adult classification module employs a CNN-based neural network to distinguish child-only presence from other scenarios. Extensive experimental results show that the system can achieve high detection accuracy and lower false alarm rate for presence detection, high accuracy for seat occupancy detection and CNN-based classification, over different cars and applications.

FIG. 1 illustrates an example framework of a wireless sensing system 100 for in-vehicle child presence detection, according to some embodiments of the present disclosure. As shown in FIG. 1, the system 100 includes three core modules: presence detection 110, seat occupancy detection 120, and child and adult classification 130. The presence detection module 110 employs both motion and enhanced breathing detectors to detect the presence of occupants within the car. The seat occupancy detection module 120 evaluates the quality of breathing signals through a confidence score metric to pinpoint the occupied seat. The child/adult classification module 130 utilizes a CNN-based classifier to identify adult presence and reduce false alerts.

In the presence detection module 110, the system can improve the detectability of periodic signals corresponding to subtle breathing movements by enhancing breathing signals. In some embodiments, the stripes in the autocorrelation function (ACF) of the WiFi channel state information (CSI) over a given window reflect the breathing rate and can be corrupted under severe environmental impact. Treating the ACF as an image, the system may utilize an image enhancement technique that involves peak enhancement followed by histogram equalization to enhance the breathing pattern. As the enhancement may also create breathing-like patterns, the system can use two metrics, zero crossing rate (ZCR) and dynamic time warping (DTW) to mitigate the false alarms. The system may further use a window-based decision fusion to re-establish continuity of detection and remove sudden false detection spikes.

The in-vehicle seat occupancy module 120, which identifies the occupied seat, can be used to enhance passenger safety, as knowing which seat is occupied can offer vital information when sending an alert to the responsible adult/authorities. The seat occupancy module 120 can determine confidence scores which can reflect the quality/strength of breathing for each antenna pair, compare the scores over the multiple antenna pairs, and detect the occupied seat.

In some embodiments, as CPD technology aims to detect unattended children who cannot exit the vehicle on their own, it is essential to distinguish the presence of a child and an adult to prevent unnecessary alerts when an adult is in the car. To achieve this, the system utilizes a CNN-based neural network model in the child/adult classification module 130 to extract the necessary features to further classify the presence of a child, an adult, or an empty case.

In some embodiments, within the confines of a vehicle, rich multi-path propagation of WiFi signals can undergo reflection, scattering, and diffraction off various surfaces, including human bodies, seats, and the vehicle's structure, before reaching the receiver. This results in the superposition of numerous multi-path components (MPC) at the receiver. Taking this multi-path effect into account, the channel state information (CSI) estimated on a subcarrier on frequency f at time t can be modeled as $$H(t,f)=\sum_{l\in\Omega_m}a_l(t)e^{-j2\pi f\tau_l(t)}+n(t,f), \quad (1)$$

where $\Omega_m$ denotes the set of multipath components, $a_l(t)$ and $\tau_l(t)$ denote the complex amplitude and the propagation delay of the lth multipath component, and $n(t,f)$ represents the additive white Gaussian noise, with power of $\sigma^2(f)$.

In some embodiments, dynamic entities, such as humans, generate time-varying MPCs due to movement, while static objects contribute time-invariant MPCs. Notably, even stationary humans can induce time-varying MPCs, as WiFi signals are sensitive to the subtle movements caused by breathing. Consequently, the estimated CSI, $H(t,f)$, can be reformulated as $$H(t,f)=\sum_{m\in\Omega_s}a_m(t)e^{-j2\pi f\tau_m(t)}+\sum_{n\in\Omega_d}a_n(t)e^{-j2\pi f\tau_n(t)}+n(t,f), \quad (2)$$

where $\Omega_s$ and $\Omega_d$ denote the time-invariant and time-variant multi-path components, respectively. $a_m(t)$, $a_n(t)$ are the complex amplitudes, $\tau_m$, $\tau_n$ are the time delay of the m and n-th MPC. Assuming that the time-invariant MPCs ($\Omega_s$) remain constant over time, the CSI can be approximated by $$H(t,f)\approx H_s(f)+\sum_{n\in\Omega_d}a_n(t)e^{-j2\pi f\tau_n(t)}+n(t,f), \quad (3)$$

where $H_s(f)$ is the sum of all static MPCs. In practical applications, as the phase information usually becomes unreliable due to synchronization offsets, one can focus on power response of the CSI given by $$G(t,f)=|H(t,f)|^2=|H_s(f)+\Sigma_{n\in\Omega_d}\alpha_n(t)e^{-j2\pi f\tau_n(t)}|^2+\epsilon(t,f)=\mu(t,f)+\epsilon(t,f). \quad (4)$$

In some embodiments, the presence detection module 110 aims to detect the presence of life in a car, regardless of whether the person is awake and moving or in a stationary position, such as sleeping. To fulfill this requirement, it leverages two detectors: a motion detector and a breathing detector.

A person performing movements creates many dynamic scatters, which can be detected by a motion detector with the extracted CSI at the receiver. The motion detector leverages the intensity of motion statistics. According to electromagnetic wave theory, the ACF of the CSI power, $\rho(\tau,f)$, correlates directly with the power of dynamic scatters as $$\rho(\tau,f) = \frac{\text{cov}[G(t,f), G(t+\tau,f)]}{\text{var}[G(t,f)]} \quad (5)$$

$$= \frac{E_d^2(f)}{E_d^2(f)+\sigma^2(f)}\rho_\mu(\tau,f) + \frac{\sigma^2(f)}{E_d^2(f)+\sigma^2(f)}\delta(\tau), \quad (6)$$

where $E_d^2(f)$ and $\sigma^2(f)$ reflects the power of dynamic scatters and the power of measurement noise, respectively. $\rho_\mu(\tau,f)$ is the ACF of $\mu(t,f)$ and $\delta(\tau)$ is the Dirac delta function.

In a dynamic environment, $E_d^2>0$, while in a static environment, $E_d^2=0$ as there are no dynamic scatters. Therefore, $\lim_{\tau\to 0}\rho(\tau,f)$ is an excellent indicator for detecting motion. In practise, the direct measurement of the $\lim_{\tau\to 0}\rho(\tau,f)$ is not feasible due to the limitation of sampling frequency $F_s$. Thus, it can be approximate as $\lim_{\tau\to 0}\rho(\tau,f)\approx\rho(\tau=1/F_s,f)$. Motion statistics can then be defined as $$\psi = 1/N_f \sum_{i=1}^{N_f} \rho(\tau = 1/F_s, f_i)$$

which is average over all subcarriers $N_f$ to get a more reliable indicator.

To detect the presence of a person through motion, one can employ a pre-defined threshold $k_m$, meaning if the motion statistics $\psi>k_m$, the system detects the presence. Otherwise, it proceeds to the breathing detector for further evaluation.

If there is no motion but breathing, the breathing pattern can be inferred from the periodicity in ACF. One can define the channel gain $$g(f) \triangleq \frac{E_d^2(f)}{E_d^2(f)+\sigma^2(f)}.$$

Then for $\tau\neq 0$, one can write the ACF in Eqn. (6) as, $$\rho(\tau,f)=g(f)\rho_\mu(\tau,f). \quad (7)$$

With the existence of breathing, $\rho_\mu(\tau,f)$ exhibits a periodic pattern with peak values varying across each subcarrier f. To maximize the overall SNR of the breathing signal, maximum ration combining (MRC) by utilizing the subcarrier diversity can be adopted, and the SNR-boosted ACF can be given as $$\rho_b(\tau) = \sum_{i=1}^{N_f} \rho(\tau = 1/F_s, f_i)\rho(\tau, f_i). \quad (8)$$

In some embodiments, even though MRC provides the SNR boost, it is insufficient to recover breathing signals that have been corrupted by background interference. Due to the periodic nature of the breathing pattern, one can observe horizontal stripes corresponding to the peaks of the signal $\rho_b(\tau)$ in the ACF for a given time window. The ACF can be viewed as a 2D image, and the system can formulate the breathing signal enhancement as image enhancement.

In some embodiments, as the peak enhancement is sensitive to noise which can cause false peaks, before enhancing the ACF, the system can first apply a median filter across the time axis to remove the noise. Then, to enhance the horizontal stripes, the system may utilize 1D peak enhancement based on the first-order derivative of the signal, to amplify the sharpness of the peak, making it more distinct and easier to identify. The enhanced signal $\rho_{en}(\tau)$ can be given as, $$\rho_{en}(\tau)=\rho_b(\tau)+k\rho_b'(\tau)\approx\rho_b(\tau)+k[\rho_b(\tau-1)+\rho_b(\tau+1)-2\rho_b(\tau)], \quad (9)$$

where $\rho_b'(\tau)$ is the first-order derivative of $\rho_b(\tau)$ and k is the weighting factor. Peak enhancement can sometimes result in uneven contrast in the image. Thus, following the peak enhancement, the system can perform histogram equalization on the two-dimensional ACF image to improve contrast and facilitate clearer peak identification.

Due to the above enhancement techniques, interference/noise from outside the vehicle can easily create periodic patterns similar to breathing patterns and cause false alarms. To remove these false detections, two metrics are detailed below.

In some embodiments, zero crossing rate is used as a metric to remove false detections. A clear breathing signal exhibits a sinusoidal pattern in the enhanced ACF $\rho_{en}(\tau)$, while a noisy signal lacks such a clear periodic pattern and has a dominant noise term, corresponding to high-frequency components with many oscillations in the ACF $\rho_{en}(\tau)$. One can use an FFT-based algorithm to identify noisy signals to prevent false breathing detection, but this is computationally expensive. Instead, the system may opt for a simpler zero crossing rate (ZCR) calculation. Histogram of ZCR values obtained from true and false breathing signals can show that false breathing signals exhibit high ZCR due to many oscillations, while true breathing exhibits low ZCR corresponding to the number of breaths in the given time frame.

Therefore, the system can utilize soft thresholding to remove false breathing detection. It assigns a confidence score, a value between 0 and 1, to indicate the probability that the breathing signal is classified as true breathing. After analyzing the histogram derived from data, one can set two bounds, a lower bound $Z_l$ and an upper bound $Z_u$, and assign the confidence score, $C_{ZCR}$ as, $$C_{ZCR} = \begin{cases} 1 & \text{if } Z_l \leq ZCR \leq Z_u \\ \max(0, 0.1(ZCR-Z_u)) & \text{if } ZCR > Z_u \\ 0 & \text{Otherwise} \end{cases} \quad (10)$$

In some embodiments, DTW calculation is used as a metric to remove false detections. With ZCR metric alone, one still cannot differentiate fallacious breathing patterns due to periodic motions outside a vehicle. To further remove such false alarms, one can compare the enhanced ACF $\rho_{en}(\tau)$ with a pre-defined template that corresponds to actual breathing. DTW technique is utilized for this comparison, as it can account for synchronization errors and time shifts. The true breathing signals is expected to be more similar to the template, resulting in lower DTW distances, while false breathing patterns would yield higher DTW values.

In some embodiments, soft thresholding is also employed to assign the confidence score based on the DTW metric. Based on the empirical histogram generated from data, one can establish two thresholds, denoted as $D_1$ and $D_2$. The confidence score, $C_{DTW}$, is assigned as follows:

$$C_{DTW} = \begin{cases} 1 & \text{if } DTW \leq D_1 \\ \frac{D_2 - DTW}{D_2 - D_1} & \text{if } D_1 < DTW < D_2 \\ 0 & \text{if } DTW \geq D_2 \end{cases} \quad (11)$$

In some embodiments, after enhancing the breathing signal and eliminating false alarms, the system employs a peak detection algorithm, which assesses peak characteristics such as peak prominence, width, amplitude, and location, to determine peak locations and calculate the breathing rate. To ensure robust detection and further eliminate false detection, the algorithm identifies two consecutive peaks. If two peaks are detected, it assigns a confidence score of $C_{peak}=1$, indicating a high likelihood of a true breathing signal; otherwise, it assigns $C_{peak}=0$.

In some embodiments, a window-based decision fusion strategy is designed to address occasional failures in restoring the breathing trace, which can lead to misdetections and sporadic false alarms. The strategy employs historical data to maintain detection continuity and eliminate abrupt false alarms.

In some embodiments, the confidence score at a given time instance t, denoted as $C_t$, is computed using a weighted summation of the confidence scores derived from the false alarm removal metrics and peak detection, given as $$C_t = \frac{W_1 C_{DTW} + W_2 C_{ZCR} + W_3 C_{peak}}{W1 + W2 + W3}, \quad (12)$$

where the weights $W_1$, $W_2$, and $W_3$ are chosen empirically based on the importance of each metric, and their sum in the denominator normalizes the confidence score to ensure a fair comparison. This normalized score, $C_t$, ranges between 0 and 1 and represents the probability that the signal at time t is a true breathing signal. Based on data analysis, $W_3$ is set higher than $W_1$ and $W_2$ as the $C_{peak}$ metric is more reliable than the other two metrics.

In some embodiments, to incorporate the past data into consideration, the system may utilize T-second decision window and combine confidence scores extracted from previous time instances with the current time instance to obtain the final confidence score $C_{final}$, defined as $$C_{final} = \frac{1}{\sum_{i=t-T}^{T} k_i} \sum_{i=t-T}^{T} k_i C_i. \quad (13)$$

Here, $k_i$ represents the weight for the $i^{th}$ time instance, reflecting its relevance to the final decision. One can assign a weight of $k_{t-T}=0.1$ to the earliest time instance and increase the weights linearly up to $k_T=1$ for the current instance. In some embodiments, the system conforms the presence if the final confidence score, $C_{final}$, exceeds the preset threshold, ensuring the reliable detection outcome.

Due to the resolution limitation imposed by lower bandwidth and limited antenna arrays, seat occupant detection with WiFi is challenging. In some embodiments, to overcome this, the system uses a confidence score-based detection method that utilizes the ACF extracted from each Tx-Rx pair.

Figure 2:
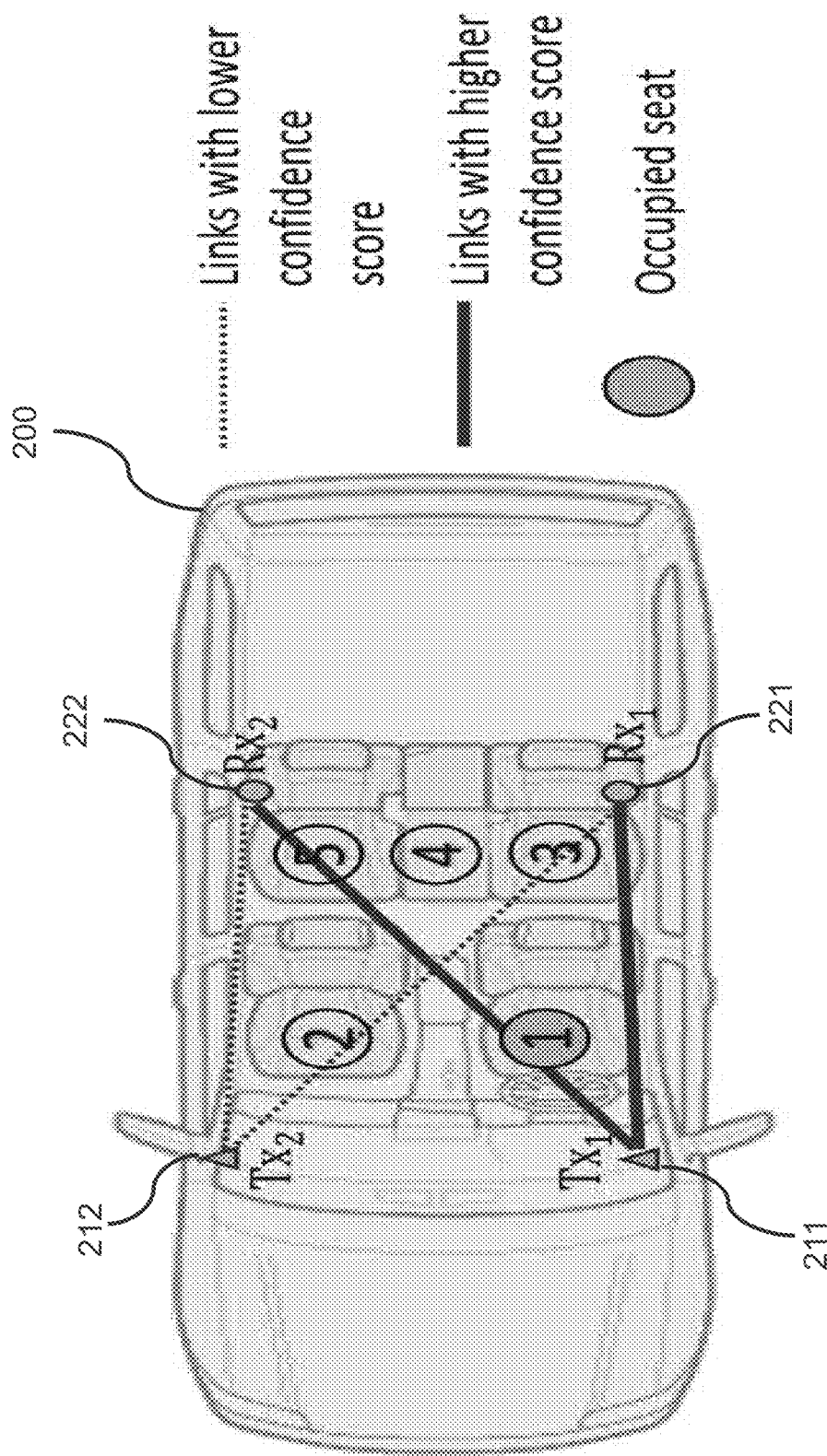
FIG. 2 illustrates an example configuration and placement of wireless devices for in-vehicle wireless sensing, according to some embodiments of the present disclosure.

Without loss of generality, one can assume a pair of transmitter (Tx) and receiver (Rx), each equipped with two antennas, and the antennas can be separately placed at different locations in the car. One example setup is illustrated in FIG. 2 with two Tx antennas 211, 212 positioned near the two side mirrors and two Rx antennas 221, 222 positioned at the rear seat near the back doors. It can be generalized to other separated antenna locations as long as prior knowledge about the antenna placement is available. One can further assume that there is only a single occupant to be detected in the car, and he/she should maintain a static position to extract breathing for a certain time duration (e.g. 10 seconds for breathing calculations) to ensure an accurate decision.

In some embodiments, each of the two Tx antennas 211, 212 may serve as a Bot (e.g. Type1 device), while each of the two Rx antennas 221, 222 may serve as an Origin (e.g. Type2 device). Each Bot can transmit a wireless (sounding/probe) signal to the Origin, which can obtain channel information of a wireless multipath channel based on the wireless signal.

Given the two Tx and two Rx antennas, the system has four distinct links, each generating a unique ACF. Following the steps outlined before, the system can obtain an enhanced ACF and a confidence score, $C_{final}$, for each link. The proximity of a user to an antenna influences the confidence score. For instance, if a user is in the driver's seat (e.g. Seat #1 in FIG. 2), the ACFs corresponding to the $Tx_1$-$Rx_1$ and $Tx_1$-$Rx_2$ pairs are less noisy and yield higher confidence scores compared to the other two pairs. The ACF can be visualized for a 100-second time frame when the user occupied the driver's seat, obtained from each of the four links to validate the above claim. Based on the visualization, the ACF corresponding to the first two rows shows cleaner breathing traces, resulting in higher confidence scores. As such, one can estimate with high probability that the occupied seat is the one nearest to $Tx_1$, which is the driver seat.

On the other hand, if the user occupies the middle rear seat (e.g. Seat #4 in FIG. 2), the confidence scores across all four links are similar. This observation allows the system to detect the presence and pinpoint the location of a single occupant in the vehicle. As these scores vary with environmental conditions, one can define a threshold $C_{th}$ to check the relative similarity between the scores. If the differences between confidence scores are less than the threshold $C_{th}$, the system can consider all scores to be at similar levels and decide that the user is in the middle seat. Otherwise, the system can identify the two maximum scores, determine the antenna corresponding to the two links, and assign the seat closest to the antenna.

For the antenna configuration depicted in FIG. 2, if $\hat{A}=Tx_1$ the predicted seat is Seat #1; if $\hat{A}=Tx_2$, the predicted seat is Seat #2; if $\hat{A}=Rx_1$, the predicted seat is Seat #3; and if $\hat{A}=Rx_2$, the predicted seat is Seat #5.

In some embodiments, after user presence detection, the system needs to differentiate child presence from adult presence, while false positives caused by adult presence should be avoided. Given the requirement, the system can utilize deep neural network architecture based on CNN layers to address the limitation.

Figure 3:
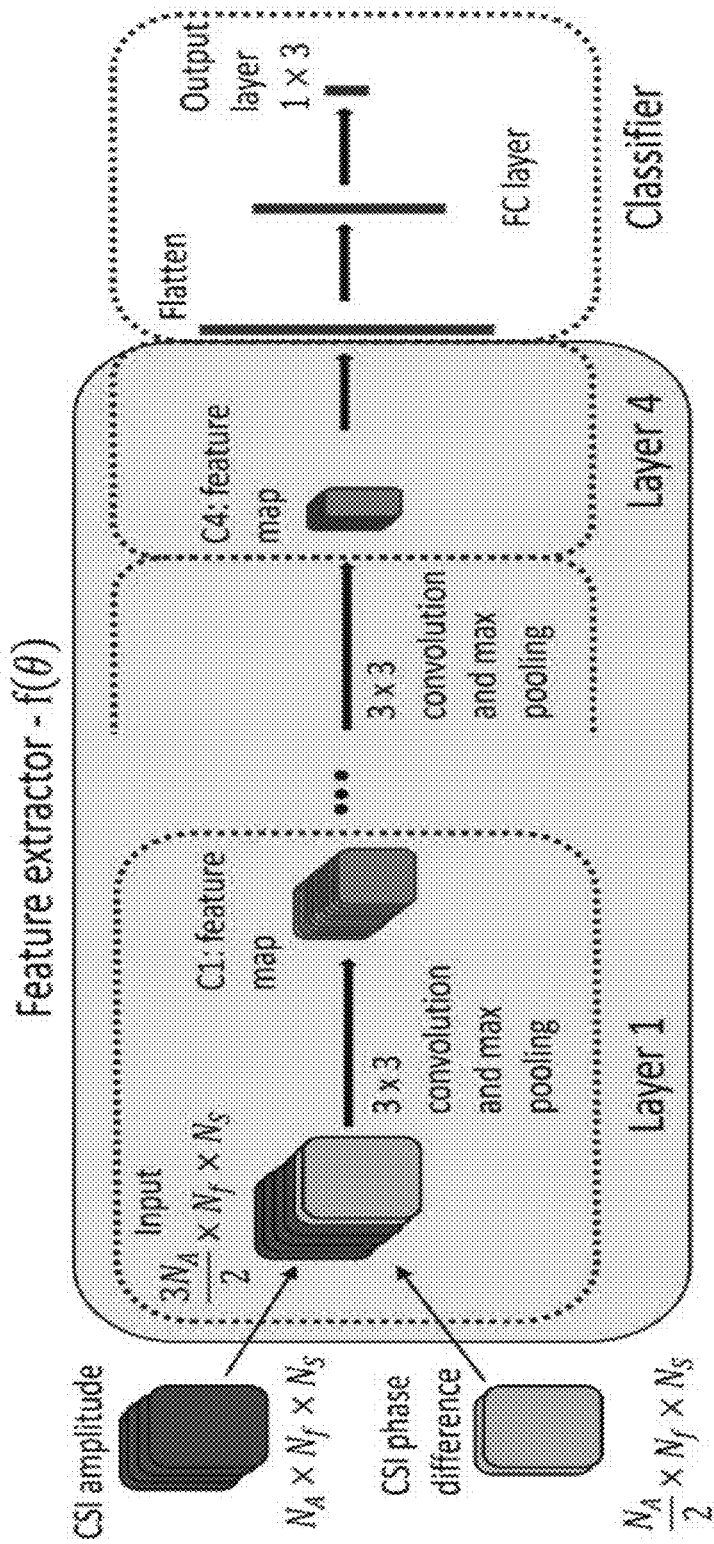
FIG. 3 illustrates an example classification network based on a convolutional neural network, according to some embodiments of the present disclosure.

Due to the difference in breathing rates, a static child can be easily differentiated from a static adult by the detected breathing rate. However, recognizing child motion from adult motion is challenging due to the nature of the defined motion statistics. The statics of motion depend on the magnitude of dynamic motions and can be similar for adults and children depending on the motion type. As a result, one can infer that ACF does not provide the necessary information required to distinguish between a child's and an adult's presence. Given that, the system may use CSI data as the input to the neural network and use a CNN-based classification network, as shown in FIG. 3 to extract features useful for child presence evaluation.

The use of CSI as input involves processing complex numbers. However, CNN layers are primarily designed to process real numbers. To address this challenge, the system can modify the input CSI. Like multiple channels in RGB input, one can separate the power and phase data of CSI into distinct channels. However, the phase information of CSI is prone to noise due to the effects of synchronization. To mitigate this, the system may utilize the phase difference between two adjacent antennas instead of the raw phase.

In some embodiments, it is assumed that there are M transmit antennas and N receiver antennas, yielding a total of $N_A = M \times N$ antenna pairs. The CSI estimated from all these antenna pairs forms a 3D matrix of size $N_A \times N_f \times N_S$ with complex numbers. Here, $N_f$ denotes the number of subcarriers, and $N_S$ represents the number of samples within the considered time window. After separating the power and phase data into separate channels, the CSI comprises $N_A$ power channels. The number of phase channels is reduced to $N_A/2$ as the system uses the phase difference instead of the raw phase. As a result, input CSI is a 3D matrix with the size $3N_A/2 \times N_f \times N_S$.

As the input to the classifier leverages both the amplitude and phase information of CSI over all the subcarriers and samples, which encapsulates the vital indicators of human presence, e.g., breathing patterns, the system can distinguish between child and adult presence. Furthermore, the robustness and generalizability of the classifier can be further enhanced by training it on a diverse dataset, including those from diverse car models and environmental conditions.

In some embodiments, the system uses 4 CNN layers followed by max-pooling to extract features from CSI, and the extracted features are concatenated to fed through fully connected layers, followed by softmax activation at the last layer to extract output probabilities of each class. In addition, to prevent overfitting, one can apply dropout with probability p=0.2 to the fully connected layers. FIG. 3 shows the detailed network design used for the classification. To further improve the robustness and generalization capabilities, the system may leverage the mixup data augmentation technique. In the mixup, the system can randomly mix two data points and the corresponding labels using linear interpolation. This allows the system to learn the model using unseen examples capturing rare features.

In some embodiments, while a neural network design can adapt to various car models with a given antenna setting, it may not generalize well for significantly different antenna configurations. To mitigate potential overfitting, the system can employ the few-shot learning strategy and pre-train the network with a limited number of data samples collected under a new antenna setup. In the pertaining step, one can fix the feature extractor, $f(\theta)$, select a few data samples (5 or 10) per class, and re-train the fully connected layers to adjust weights to the new antenna configuration. This approach allows the system to achieve the desired performance despite the altered conditions.

In some embodiments, the disclosed lightweight CNN model can provide a generalized solution to child and adult classification, eliminating the need for specific training when deploying in a new car model. When dealing with changes in the antenna configuration, few-shot learning becomes necessary. Despite this requirement, it does not involve full network training, which can be a time-consuming and computationally expensive process. Instead, it focuses on changing weights in the last two fully connected layers with limited data. The simplicity of the network design and low computational requirements for learning allows for easier implementation and are suitable for deployment at the edge device. In some embodiments, a disclosed CNN-based neural network model comprises 800,000 parameters, requiring only 3.34 MB of storage. The compact size underscores its feasibility for edge device deployment, where storage and computational resources are often limited.

In some embodiments, to evaluate the results of three modules: presence detection, seat occupancy detection, and child and adult classification, one can implement the system using a pair of WiFi devices operating at 5 GHz with a bandwidth of 40 MHz. In some examples, each device is equipped with two omnidirectional antennas. The estimated CSI at the receiver contains 58 subcarriers with a sample rate of 30 Hz.

In some embodiments, one can collect data under various antenna setups to study their impact on the performance, as detailed below.

Figure 4A:
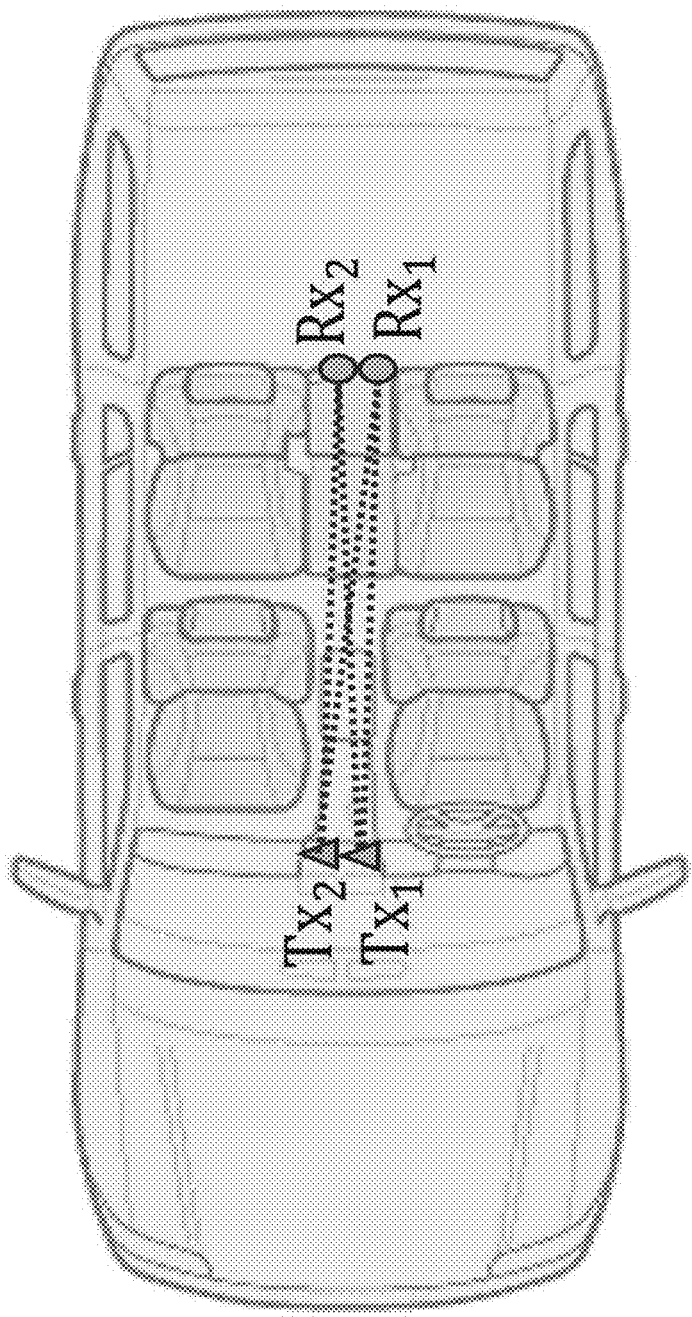
FIGS. 4A, 4B and 4C illustrate example antenna configurations for in-vehicle wireless sensing, according to some embodiments of the present disclosure.

In a Colocated setup example, both the transmit (Tx) and receive (Rx) antennas are colocated as shown in FIG. 4A. The Tx antennas can be placed in the front, and the Rx antennas can be placed in the back, or vice versa.

Figure 4B:
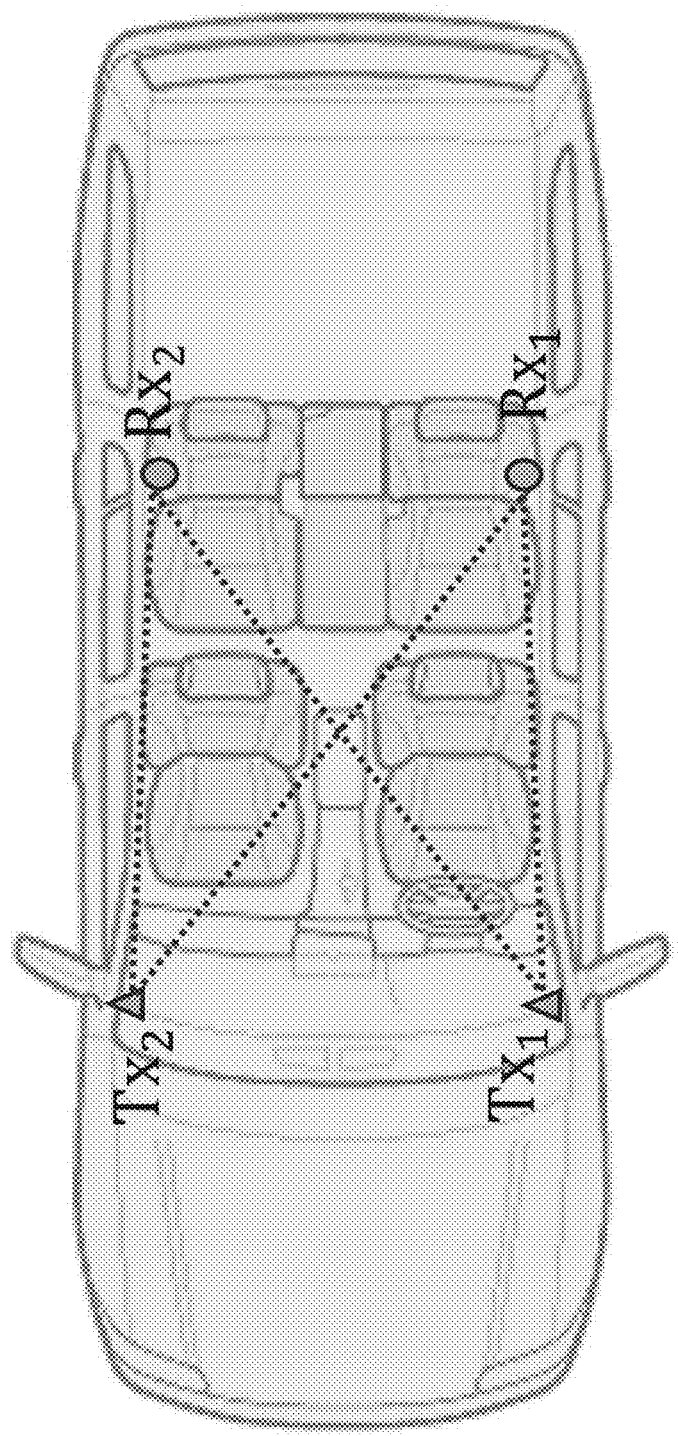

In a Distributed setup example, the two Tx and two Rx antennas are placed in the four corners of the car as shown in FIG. 4B, where the Tx antennas are placed in the two corners of the front dashboard and the Rx antennas are near the two sides of the back seats.

Figure 4C:
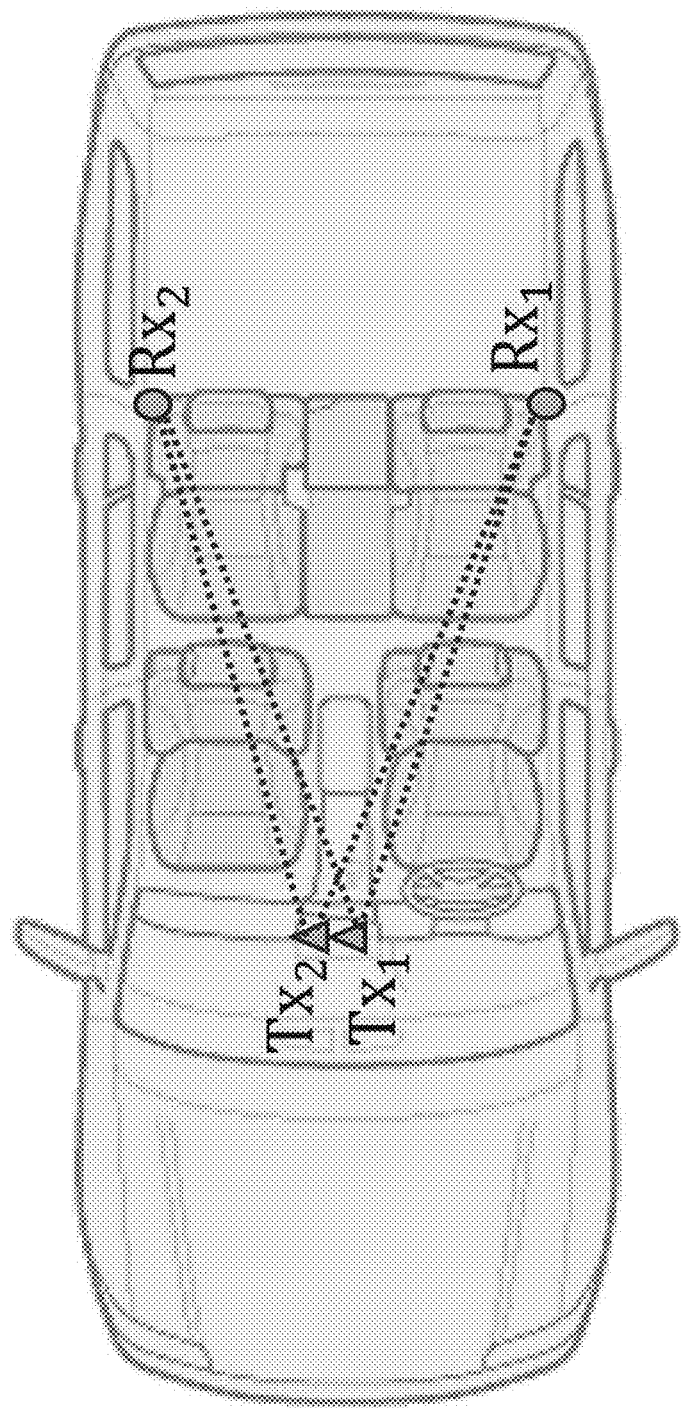

In a Hybrid setup example, the Tx antennas are placed in a colocated manner, and the Rx antennas are placed in a distributed way as in FIG. 4C. The positions of Tx and Rx antennas can be interchanged.

In some embodiments, the system is implemented the system using a commercial WiFi chipset to validate the performance with 25 distinct cars under different environments to ensure the performance of the system under realistic conditions. The dataset includes child data, adult data, and empty data collected over a period of six months, considering various car models, antenna settings, subject positions, and environmental factors. Experiment results show that the system can achieve high detection accuracy with low false alarm rate for presence detection, high overall accuracy in seat occupancy detection with high child detection rate using the learning-based classification for test data collected from different cars.

In some embodiments, in a venue, a Type1 heterogeneous wireless device (TX) with one or more antennas may transmit a wireless signal (e.g. a train/series of sounding signals) to a Type2 heterogeneous wireless device (RX) with one or more antennas. Each transmit antenna and each receive antenna form a wireless link. The Type2 device may extract one or more time series of channel information (TSCI) based on the received signal, one TSCI for each wireless link. The TSCI may be preprocessed.

As discussed above, in some embodiments, the system may comprise 3 modules: (1) Presence Detection Module, (2) Seat Occupancy Detection Module, and (3) Child/Adult Classification.

Module 1: Presence Detection Module.

In some embodiments, presence of user can bee detected. In the venue, one or more users may be present. The Presence Detection Module (PDM) detects the presence or absence of the one or more users based on the one or more TSCI. The PDM may comprise (1) a motion detector module to detect object motion based on the TSCI, and (2) a breathing detector module to detect breathing of any object based on the TSCI.

In some embodiments, motion detector of PDM is used. In a sliding time window, the motion detector may compute a motion statistics. Motion may be detected when the motion statistics exceeds a threshold. The motion statistics may be a time reversal resonance strength (TRRS), or a correlation between adjacent CI of a TSCI. A linkwise motion statistics may be computed for each wireless link, and the motion statistics may be an aggregate (e.g. average/sum, or arithmetic/geometric/harmonic mean) of the linkwise motion statistics. Presence is detected when motion is detected. If motion is not detected, the breathing detector may be applied to detect any breathing.

In some embodiments, 2D image construction is performed based on 1D transform, and enhancement. The breathing detector may compute a 1D transform (e.g. autocorrelation function (ACF), short time Fourier transform (STFT), frequency transform) of CI of a TSCI in each of a plurality of sliding time windows. Multiple 1D transform associated with a plurality of sliding time windows may be put/assembled/combined together to form/construct a 2D image (transform-image). When breathing of a user is present, horizontal stripes (corresponding to peaks of the transform/ACF/STFT) should appear in the 2D image. In the breathing detector, the 2D image may be enhanced. Peak enhancement/emphasis may be applied to each 1D transform by adding to it one (or more) scaled highpass version of it. For example, a highpass version of the 1D transform is its first order derivative, or a linear combination of any order derivative (e.g. first/second/third/fourth/. order derivative). Histogram equalization may be applied to the 2D image to improve/enhance the contrast.

In some embodiments, 1D transform construction is performed based on component 1D transform. Each CI (e.g. CSI, CIR, CFR, RSSI) may comprise a plurality of components (e.g. subcarriers of CFR, taps of CIR). A respective 1D transform of each component ("component 1D transform", such as component ACF, component STFT, component frequency transform) may be computed in each sliding time window. For example, it may compute a feature (e.g. magnitude, magnitude square, phase) of each component and, for each component, compute the component 1D transform for the component based on the feature of the component. It may compute the 1D transform (e.g. ACF) of the CI in the sliding time window by combining the component 1D transform (e.g. ACF). In particular, the ACF may be an aggregate or a weighted aggregate (e.g. weighted average/sum or weighted arithmetic/geometric/harmonic mean) of the component ACF. The weight for each component ACF may be a value of the component ACF evaluated at a particular time tag (e.g. sampling/sounding period, or tau=1).

Consider a time period (larger/longer than sliding time window) comprising a plurality of sliding time windows. A plurality of 1D transform (e.g. ACF) may be obtained for the time period, each 1D transform computed from CI in respective sliding time window. A 2D structure/matrix/image may be computed/obtained/formed/generated for the time period by assembling/grouping/combining the plurality of 1D transform, with one dimension of the 2D structure/matrix/image being the time axis and the second dimension being the transform domain axis of the 1D transform. If the 1D transform is ACF, the second dimension may be the axis of time lag. If the 1D transform is STFT, the second dimension may be the (STFT) frequency axis. Suppose each 1D transform has K components and is represented as a K-tuple vector. Suppose there are L sliding time windows in the time period such that there are L vectors each with K components. The L vectors may be put together to form the 2D matrix/structure/image with a size of K×L.

In some embodiments, breathing detection is performed by peak detection. A detection of horizontal stripes (e.g. along/parallel to the time axis) may be performed based on the 2D image (e.g. enhanced 2D image). The 2D image may be enhanced. The enhanced 2D image may be obtained by peak enhancement, edge enhancement, histogram equalization, directional filtering (e.g. horizontal/near-horizontal lowpass, vertical highpass), and/or other image enhancement means.

In some embodiments, peak detection may be performed by computing peak characteristics such as peak prominence, peak width, peak amplitude, and/or peak location. Candidate peaks may be obtained—local maxima for each 1D transform (e.g. enhanced 1D transform) of the 2D image. But often, some candidate peaks may be untrustworthy/false/bad peaks due to noise. For each peak/maximum of each 1D transform, individual peak characteristics may be computed/tested/analyzed/assessed. Peaks of each 1D transform satisfying acceptance criteria may be considered "good" peaks and may be chosen. The acceptance criteria may comprise any of: (1) peak prominence>T6, (2) peak amplitude>T7, (3) T8<peak width<T9. Peaks not satisfying acceptance criteria may not be "good" and may be discarded. If a "consistently-good" peak location can be found such that a "good" (or chosen) peak occurs at or near the peak location in at least A1 percentage (e.g. A1 may be 90%, 80%, or 70%, etc.) of the 1D transform in the time period (or a sliding portion of the time period, each sliding portion with multiple sliding time windows), user breathing may be detected and the peaks at or near the consistently-good peak location may be determined as the peaks associated with user breathing.

In some embodiments, a user breathing rate/period may be computed based on the consistently-good peak location. If the 1D transform is ACF, the time lag associated with the consistently-good peak location may be the user breathing period. The user breathing rate may be the reciprocal of the user breathing period. There may be more than one consistently-good peak locations, with one being the breathing period (e.g. the first/smallest/lowest one) and the others being integer multiple of the breathing period. The breathing period may be computed/determined as a greatest common factor (GCF) (approximately) of the more than one consistently-good peak locations.

In some embodiments, if the 1D transform is STFT, there may be multiple consistently-good peak locations, with one (e.g. the first/smallest/lowest one) being the breathing rate and the others being harmonics (e.g. integer multiples) of the breathing rate. The breathing rate may be computed/determined a greatest common factor (GCF) (approximately) of the multiple consistently-good peak locations (i.e. all the harmonics and/or the basic breathing rate).

In some embodiments, false alarm removal is performed. Sometimes false alarm may occur—that is, breathing may be accidentally (and incorrectly) detected, probably due to noise. To suppress such false alarm, one can use a false alarm removal scheme based on some confidence scores (CS): (1) Oscillation CS, (2) DTW CS, (3) peak CS.

An oscillation rate (OR) may be computed for each 1D transform of the 2D image. The oscillation rate may be a zero crossing rate obtained by counting the amount of zero crossing in each 1D transform (e.g. enhanced 1D transform from the enhanced 2D image). Alternatively, the oscillation rate may be a zero crossing rate of mean-subtracted 1D transform (obtained by subtracting a mean from 1D transform). The mean to be subtracted from a 1D transform may be a mean function (e.g. moving average, moving weighted average, lowpass filtered, smoothing in transform domain) of the 1D transform obtained by smoothing/lowpass filtering, moving average or moving weighted average applied to the 1D transform in transformed domain. Alternatively, the oscillation rate may be an amount of maxima (or minima) obtained by counting the amount of local maxima (or minima) of the 1D transform (or the mean-subtracted 1D transform). The 1D transform may be filtered with a lowpass filter to suppress noise before counting the local max/min.

In some embodiments, the Oscillation CS may be computed as a function of the oscillation rate (OR), in relation to some "acceptable" behavior/range of OR. The Oscillation CS may be a real number between 0 and 1 (or may be scaled/mapped to any finite range). It may be 1 if the oscillation rate is within an acceptable range between a lower bound T1 and upper bound T2 (T1<OR<T2). It may be a monotonic non-increasing (or monotonic decreasing) function (e.g. piecewise linear) when the oscillation rate exceeds T2 (OR>T2). For example, it may be decreasing (e.g. linearly, piecewise linear, exponentially) between T2 and T3 (T2<OR<T3), and zero beyond T3 (OR>T3). It may be 0 below T1 (OR<T1). It may be a monotonic non-decreasing (or monotonic increasing) function (e.g. piecewise linear) when the oscillation rate is below T1 (OR<T1). For example, it may be decreasing (e.g. linearly, piecewise linear, exponentially) between T2 and T3 (T2<OR<T3), and zero beyond T3 (OR>T3). It may be 0 below T1 (OR<T1).

In some embodiments, reference 1D transform is utilized. A reference 1D transform (e.g. a K-component vector, obtained by applying the 1D transform on CI of TSCI obtained when user breathing is present) may be obtained. In a training phase, at least one training wireless signal may be transmitted from at least one training Type1 device to at least one training Type2 device in at least one training venue when breathing of a training user at least one location in the training venue is present. At least one training TSCI may be obtained by the at least one training Type2 device based on the at least one received training wireless signal. At least one training 1D transform of CI of the at least one TSCI may be computed. The reference 1D transform (with some user breathing present) may be computed (e.g. as an aggregate) based on the at least one training 1D transform of CI.

In some embodiments, DTW between 1D transform and reference 1D transform is determined. In a detection phase, to detect whether user breathing is present, each current 1D transform (K-tuple vector) may be compared with the reference 1D transform (K-tuple vector). If no user (and thus no user breathing) is present, the current 1D transform vector (without user breathing info/impact embedded) would naturally not match the reference 1D transform vector (with user breathing info embedded). The two non-matching vectors may have low similarity score or large distance, such as L1-distance, L2-distance (Euclidean distance) or Lk-distance for some k.

However, if a user with user breathing is present in the detection phase, the current 1D transform vector may still not match the reference 1D transform vector because there may be different breathing rates in the reference 1D vector (in training phase) and the current 1D transform vector (in detection phase). Although there should be peaks/maxima in both the reference 1D transform vector and also in the current 1D transform vector due to the presence of user breathing, the corresponding peaks/maxima may happen at different locations/components due to the different breathing rates. Thus direct comparison between the current 1D transform vector and the reference 1D transform vector may still give low similarity score or large distance. But if the vectors (or the vector components) are properly mapped/matched/scaled, the two vectors should give high similarity score or small distance. Thus dynamic time warping (DTW) may be applied to find the best possible match between the two vectors. After the DTW, the similarity score and/or distance between the two vectors may be computed. User breathing may be determined/considered/concluded to be present if the similarity score is larger than a first threshold or the distance is less than a second threshold.

In other words, a matching between the current 1D transform and the reference 1D transform may suggest a high likelihood of the presence of user breathing (i.e. the detected breathing by breathing detector may not be a false alarm). Conversely, a mismatch between the 1D transform and the reference 1D transform may suggest a low likelihood of the presence of user breathing (i.e. the detected breathing by breathing detector may be a false alarm). However, there may be a scale mismatch (local/global) between the current 1D transform and the reference 1D transform. Thus dynamic time warping (DTW) may be applied to find the best match between 1D transform and the reference 1D transform, with associated DTW distance/DTW cost (DC) which may be the similarity score and/or the distance. The similarity score or the distance may be compared with corresponding thresholds In some embodiments, DTW CS is determined based on DTW cost. The DTW CS may be computed for each current 1D transform as a function of the DTW cost (DC) associated with best DTW matching between the current 1D transform and the reference 1D transform. The DTW CS may be a real number between 0 and 1 (or may be scaled/mapped to any finite range). The DTW CS may be a monotonic decreasing (or monotonic non-increasing) function of DC. It may be 1 if DC<T4. It may be 0 if DC>T5 (T5>T4). It may be decreasing/non-increasing (e.g. linearly, piecewise linear, exponential) for T4<DC<T5.

In some embodiments, Peak CS is determined based on amount of good peaks. Peak CS may be computed for each 1D transform as a real number between 0 and 1 (or may be scaled/mapped to any finite range). If only one good peak (or only one consistently-good peak location) is identified, Peak CS may be 0. If M1 good peaks (or M1 consistently-good peak locations) at peak locations L1<L2< ... <L(M1) are identified with all the peak locations being an integer multiple of the smallest peak location (i.e. if L2/L1, L3/L1, ..., L(M1)/L1 are all integers), the Peak CS may be a monotonic increasing/non-decreasing function f1 of M1, i.e. Peak CS=f1(M1). Else if M2 consistently-good peak locations are identified with a greatest common factor (GCF) of all the consistently-good peak locations being greater than T6 (T6>1), the Peak CS may be a second increasing function f2 of M2, wherein f1(x)=f2(x). In one embodiment, f1 (M1)=1 for M1>=2.

In some embodiments, a Combined CS, CCS(t), is computed based on weighted mean of CS. At any time t associated with a 1D transform, a combined CS (CCS(t)) may be computed as a weighted aggregate (e.g. weighted sum/product, weighted arithmetic mean, weighted geometric mean, weighted harmonic mean, weighted median) of any/all of (1) Oscillation CS, (2) DTW CS, (3) Peak CS computed for the 1D transform. As all of Oscillation CS(t), DTW CS(t) and Peak CS(t) are real numbers between 0 and 1 (or may be scaled/mapped to any finite range), the CCS(t) may also be a real number between 0 and 1 (or may be scaled/mapped to any finite range). Any CS(t) may be viewed as a likelihood that user breathing happened/occurred at time t. The weight for Peak CS may be larger than the weights of Oscillation CS and DTW CS.

In some embodiments, a Final CS, FCS(t), is computed based on weighted time average of CCS(t). To incorporate past data into consideration, a final CS (FCS) may be computed as weighted average of CCS(t) with t in a sliding time window. The weight may increase with time t, with higher weight for later CCS(t) and smaller weights for earlier CCS(t). In other words, CCS(t1)<=CCS(t2) if t1<t2.

Module 2: Seat Occupancy Detection Module.

In some embodiments, in a venue (such as a vehicle), there may be multiple "seats" (e.g. chair/sofa/seats in vehicle/van/RV/trailer/train/tram/airplane/boat, seats/chairs/benches in facilities/office/classroom/lab/cinema/meeting room/waiting area/waiting room, beds in a dormitory, partitions in toilet/changing room/shower facility/voting booth, cages in animal facilities/zoos, parking spaces in parking facility, storage bins in shelving/cabinet, etc.). A user (e.g. human, animal, or object) may occupy/sit/stand/recline/rest/station/stay/store at any of the seats. The seat occupancy detection module (SOD) may detect which of the seats is/are being occupied.

In some embodiments, for seat and antenna placement in venue, without loss of generality, the venue may have 5 (or 6) seats in a "rectangular" area (e.g. a cabin of a vehicle with 5/6 seats): front left seat, front right seat, back left seat, back right seat, and/or some center seat(s) (e.g. center back seat, center front seat, center left seat, center right seat, seat in middle of the rectangular area). A user may be seated at one of the 5 seats. The Seat Occupancy Detection (SOD) module may be used to detect which of the 5 seats is being occupied by the user based on multiple TSCI obtained/captured/extracted based on wireless signal communicated between multiple (TX-RX) antenna pairs between the Type1 and Type2 devices. In particular, the Type1 device (TX) may have two (or more) antennas (TX1 and TX2) spaced together/apart/close-by, such as being placed at two of the corners (e.g. left front corner, right front corner) of the rectangular area/cabin. The Type2 device (RX) may have two (or more) antennas (RX1 and RX2) placed together/close-by/apart, such as being at the other two corners (e.g. left back corner, right back corner) of the rectangular area/cabin. Additional TX and/or RX antennas may be placed in the cabin, such as on the ceiling, floor, etc. (e.g. ceiling center, and/or toward the back/front). The TX antennas and Rx antennas may be placed at different locations inside the rectangular cabin. There may be N1 wireless links resulting in N1 TSCI being captured/extracted. For the case of 2 TX antennas and 2 RX antennas, there may be N1=4 TSCI comprise (1) a left link between the TX-RX antennas at the left front corner and left back corner, (2) a right link between the TX-RX antennas at the right front corner and right back corner, (3) a diagonal link between the TX-RX antennas at the left front corner and right back corner, and (4) an anti-diagonal link between the TX-RX antennas at the right front corner and left back corner.

In some embodiments, seat occupancy detection is performed based on linkwise confidence score. For each of the N1 TSCI and each sliding time window, a respective 1D transform (e.g. ACF or enhanced ACF, STFT or enhanced STFT) may be computed based on CI of the TSCI in the sliding time window. Based on the respective 1D transform, respective Oscillation CS(t), DTW CS(t), Peak CS(t), CSS (t) and FCS(t) may be computed for each of the N1 link/TSCI. Seat occupancy may be computed based on the N1 FCS. If each of the N1 FCS(t) are greater than a threshold T10, the occupied seat may be determined to be the center seat. Otherwise, two max FCS(t) may be identified and the occupied seat may be determined based on the two max FCS(t).

In some example, if the two max FCS(t) occur in the left link and the diagonal link, the occupied seat may be determined to be the left front seat. If the two max FCS(t) occur in the left link and the anti-diagonal link, the occupied seat may be determined to be the left back seat. If the two max FCS(t) occur in the right link and the anti-diagonal link, the occupied seat may be determined to be the right front seat. If the two max FCS(t) occur in the right link and the diagonal link, the occupied seat may be determined to be the right back seat. If the two max FCS(t) occur in the right link and the left link, there may be some user present outside the venue (e.g. some outside the left side/wall of the rectangular area, and some outside the right side/wall), but no user present in the venue (rectangular area/cabin). If the two max FCS(t) occur in the diagonal link and the anti-diagonal link, the occupied seat may be determined to be the center seat.

Module 3: Child/Adult classification Module.

In some embodiments, CNN for feature extraction is performed with a fully-connected network for classification. Even when user presence is detected, it remains to be determined if the user present is an adult or a child. The child/adult classification module may comprise two stages to determine if the user is an adult or a child. In the first stage (called feature extraction), initial features of the N1 TSCI (e.g. CI amplitude and CI phase difference) may be computed and used as input to a convolutional neural network (CNN) comprising N2 layers (e.g. 3 or 4 or 5 or more layers). The output of the N2-layer CNN may be considered final features of the TSCI, for further processing/classification. The N2-layer CNN may be effectively a feature extractor to compute final features of the N1 TSCI based on initial features of the N1 TSCI. The final features (the extracted features) may be flattened into a vector and fed as input to a N3-layer fully-connected network (e.g. 2/3/4/more layers, or nearly fully connected) to classify between no-user-present, child-present and adult-present.

In some embodiments, initial features comprising CIC magnitude and pairwise CIC phase difference are obtained. Each CI may comprise N4 scalar components ("CIC" or CI components). Each sliding time window may comprise N5 CI of any TSCI. Thus in each sliding time window, there may be a total of N1×N4×N5 CIC in each sliding time window. The initial features comprise the magnitude (CIC amplitude) of the N1×N4×N5 CIC (i.e. the N1×N4×N5 CIC magnitude). The phase of CIC (CIC phase) may/may not be used as initial feature directly because they may contain much noise and distortion. Pairwise CIC phase difference may be used instead of the CIC phase itself. The difference between the phases of each pair of CIC may be computed and used as the part of initial features.

In some embodiments, TSCI-level CIC pair formation is performed for computing pairwise CIC phase difference. To compute the pairwise CIC phase difference as initial features, the N1×N4×N5 CIC may be organized/grouped into N6×N4×N5 CIC pairs. The pairing may be done at a TSCI level such that all CIC of CI of a first TSCI may be paired with respective CIC of respective CI of a second TSCI. In a first example, all possible pairings of TSCI may be used such that N6=N1C2=(N1)(N1−1)/2. In a second example, each TSCI may be used once to form pairing such that N6~=N1/2. If N1 is even, then N6=N1/2. If N1 is odd, one TSCI may be used twice to form pairing such that N6=(N1+1)/2. In a third example, the two TSCI of any pair of TSCI may be associated with same/identical Type1 device antenna (TX antenna). Then for each TX antenna, pairing the associated TSCI is equivalent to pairing the associated RX antennas. Suppose there are N7 TX antennas and N8 RX antennas such that N1=N7*N8. In one case, all possible RX antenna pairing may be used such that there may be N8C2=N8(N8−1)/2 pairs (for N8>1) for each TX antenna, and thus N6=N7(N8)(N8−1)/2 for the N7 TX antennas. In another case, each RX antenna is paired only once. If N8 is even, then N6=N7*N8/2. If N8 is odd, one of the RX antennas may be used twice to form pairs, such that N6=N7*(N8+1)/2>N7*N8/2. In the third example, the wireless signals used to generate the two TSCI of a pair of TSCI are a same/common wireless signal transmitted by a common TX antenna. Phase artifacts of the same/common wireless signal received by the two RX antennas may be similar/correlated. Thus the difference between their phases may have reduced phase artifacts. And if a first CI is paired with a second CI, all first CIC of the first CI are paired with corresponding second CIC of the second CI.

In some embodiments, formation of 3D matrix is performed from multiple 2D matrices. The N1×N4×N5 CIC magnitude may be organized/re-organized/grouped into N1 2-dimensional matrices. Each 2D matrix of size N4×N5 may be associated with a respective one of the N1 TSCI and may comprise N5 columns. Each of the N5 columns may comprise the N4 CIC of a respective one of the N5 CI of the TSCI. The N6×N4×N5 CIC phase difference may be organized into N6 2D matrices. Each 2D matrix of size N4×N5 may be associated with a respective one of the N6 pairs of TSCI and may comprise N5 columns. Each of the N5 columns may comprise the N4 phase difference between the N4 CIC pairs associated with a respective pair of CI associated with the pair of TSCI. All the N1+N6 2D matrices (all having a size of N4×N5) may be stacked together (in any order) to form a 3-dimensional matrix, with each N4×N5 matrix being a 2D sheet/layer/channel/image of the 3D matrix. There may be N1+N6 2D sheets/layers of the 3D matrix.

In some embodiments, feature extraction is performed using CNN. The 3D matrix of the size (N1+N6)×N4×N5 may be fed as the input to the CNN. Each layer of the CNN may comprise M3 (e.g. M3=2 or 4 or . . . s.t. M3>1) 2D convolution kernels (e.g. of size 3×3, 5×5, 3×5, etc.) each applied to the 2D sheets/layers of the input 3D matrix to give a respective 2D output matrix. In each layer, the CNN may apply the M3 2D convolutional filters/kernel across all the input 2D sheets/layers/channels, either simultaneously or at any order (as there is no fixed/required/pre-defined order), followed by down-sampling/max-pooling such that each input 2D sheet/image/layer may give rise to M3 output 2D sheets/images/layers of smaller size than the input 2D sheet/image/layer. All the output 2D sheets/images/layers may be stacked together to form a 3D matrix to be processed by the next layer of the CNN.

In a similar manner, every subsequent CNN layer takes the 3D matrix output of the previous CNN layer as 3D matrix input. Multiple respective 2D convolution kernels may be applied separately/independently (e.g. simultaneously or in any order) to each sheet/layer/image/channel to give a respective 2D output matrix followed by down-sampling/max-pooling. Different 2D convolution kernels may be used in different CNN layers to generate respective output 2D matrices/sheets. For example, suppose the CNN has 3 layers, with M3=4 and 2-to-1 down-sampling/max-pooling. The input to the first layer of CNN (Layer 1) may be the 3D matrix comprising (N1+N6) 2D sheets/layers each of size N4×N5.

In some embodiments, at the output of Layer 1, four 2D Layer-1 (N4/2)×(N5/2) output sheets may be generated for each 2D Layer-1 N4×N5 input sheet. As there may be a total of (N1+N6) Layer-1 input sheets, there may be a total of 4×(N1+N6) Layer-1 output sheets each of size (N4/2)×(N5/2) which may serve as input to the second layer of CNN (Layer 2). The 4×(N1+N6) Layer-1 output sheets (or Layer-2 input sheets) may be stacked together to form a 3D matrix of size 4×(N1+N6)×(N4/2)×(N5/2). At the output of Layer 2, four 2D Layer-2 (N4/4)×(N5/4) output sheets may be generated for each 2D Layer-2 (N4/2)×(N5/2) input sheet. As there may be a total of 4×(N1+N6) Layer-2 input sheets, there may be a total of 16×(N1+N6) Layer-2 output sheets each of size (N4/4)×(N5/4) which may serve as input to the third layer of CNN (Layer 3). The 16×(N1+N6) Layer-2 output sheets (or Layer-3 input sheets) may be stacked together to form a 3D matrix of size 16×(N1+N6)×(N4/4)×(N5/4). At the output of Layer 3, four 2D Layer-3 (N4/8)×(N5/8) output sheets may be generated for each 2D Layer-3 (N4/4)×(N5/4) input sheet. As there may be a total of 16×(N1+N6) Layer-3 input sheets, there may be a total of 64×(N1+N6) Layer-3 output sheets each of size (N4/8)×(N5/8) which may serve as input to the fourth layer of CNN (Layer 4). The 64×(N1+N6) Layer-3 output sheets (or Layer-4 input sheets) may be stacked together to form a 3D matrix of size 64×(N1+N6)×(N4/8)×(N5/8). At the output of Layer 4, four 2D Layer-4 (N4/16)×(N5/16) output sheets may be generated for each 2D Layer-4 (N4/8)×(N5/8) input sheet. As there may be a total of 64×(N1+N6) Layer-4 input sheets, there may be a total of 256×(N1+N6) Layer-4 output sheets each of size (N4/16)×(N5/16) which may be the final features generated by the 4-layer CNN. The 256×(N1+N6) Layer-4 output sheets may be stacked together to form a 3D matrix of size 256×(N1+N6)×(N4/16)×(N5/16). The final features may be flattened/concatenated/re-organized/re-arranged into a vector and fed as input to a N3-layer fully-connected network.

In some embodiments, all the parameters of all the 2D convolution kernels and all the parameters of the fully-connected layer may be trained in a training phase. Supervised training may be used. To adapt to new car/vehicle/venue models with different antenna setting and placement, few shot learning may be applied, in which the parameters of the N2-layer CNN may be frozen and the parameters of the fully-connected layer may be updated/trained/re-trained using limited training data collected using the new car/vehicle/venue models.

In some embodiments, the child/adult classification module may be used for other classification task. It may be used without the presence detection and/or the seat occupancy.

Figure 5:
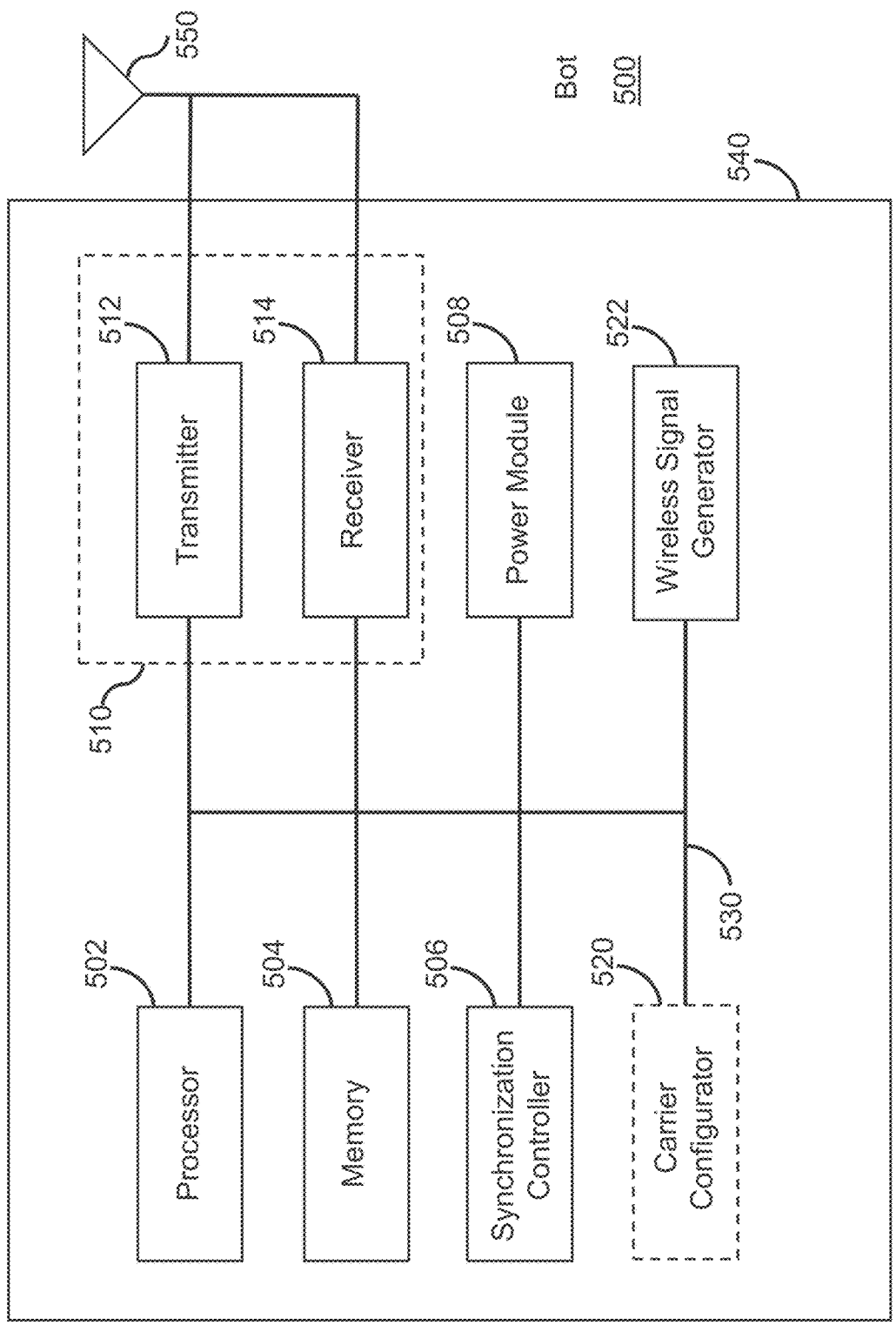
FIG. 5 illustrates an example block diagram of a first wireless device of a system for wireless sensing, according to some embodiments of the present disclosure.

FIG. 5 illustrates an example block diagram of a first wireless device, e.g. a Bot 500, of a wireless sensing system, according to one embodiment of the present teaching. The Bot 500 is an example of a device that can be configured to implement the various methods described herein. As shown in FIG. 5, the Bot 500 includes a housing 540 containing a processor 502, a memory 504, a transceiver 510 comprising a transmitter 512 and receiver 514, a synchronization controller 506, a power module 508, an optional carrier configurator 520 and a wireless signal generator 522.

In this embodiment, the processor 502 controls the general operation of the Bot 500 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 504, which can include both read-only memory (ROM) and random access memory (RAM), can provide instructions and data to the processor 502. A portion of the memory 504 can also include non-volatile random access memory (NVRAM). The processor 502 typically performs logical and arithmetic operations based on program instructions stored within the memory 504. The instructions (a.k.a., software) stored in the memory 504 can be executed by the processor 502 to perform the methods described herein. The processor 502 and the memory 504 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 510, which includes the transmitter 512 and receiver 514, allows the Bot 500 to transmit and receive data to and from a remote device (e.g., an Origin or another Bot). An antenna 550 is typically attached to the housing 540 and electrically coupled to the transceiver 510. In various embodiments, the Bot 500 includes (not shown) multiple transmitters, multiple receivers, and multiple transceivers. In one embodiment, the antenna 550 is replaced with a multi-antenna array 550 that can form a plurality of beams each of which points in a distinct direction. The transmitter 512 can be configured to wirelessly transmit signals having different types or functions, such signals being generated by the processor 502. Similarly, the receiver 514 is configured to receive wireless signals having different types or functions, and the processor 502 is configured to process signals of a plurality of different types.

The Bot 500 in this example may serve as Bot 211 or Bot 212 in FIG. 2 for detecting user presence or motion in a venue. For example, the wireless signal generator 522 may generate and transmit, via the transmitter 512, a wireless signal through a wireless multipath channel impacted by a motion of an object in the venue. The wireless signal carries information of the channel. Because the channel was impacted by the motion, the channel information includes motion information that can represent the motion of the object. As such, the motion can be indicated and detected based on the wireless signal. The generation of the wireless signal at the wireless signal generator 522 may be based on a request for motion detection from another device, e.g. an Origin, or based on a system pre-configuration. That is, the Bot 500 may or may not know that the wireless signal transmitted will be used to detect motion.

The synchronization controller 506 in this example may be configured to control the operations of the Bot 500 to be synchronized or un-synchronized with another device, e.g. an Origin or another Bot. In one embodiment, the synchronization controller 506 may control the Bot 500 to be synchronized with an Origin that receives the wireless signal transmitted by the Bot 500. In another embodiment, the synchronization controller 506 may control the Bot 500 to transmit the wireless signal asynchronously with other Bots. In another embodiment, each of the Bot 500 and other Bots may transmit the wireless signals individually and asynchronously.

The carrier configurator 520 is an optional component in Bot 500 to configure transmission resources, e.g. time and carrier, for transmitting the wireless signal generated by the wireless signal generator 522. In one embodiment, each CI of the time series of CI has one or more components each corresponding to a carrier or sub-carrier of the transmission of the wireless signal. The detection of the motion may be based on motion detections on any one or any combination of the components.

The power module 508 can include a power source such as one or more batteries, and a power regulator, to provide regulated power to each of the above-described modules in FIG. 5. In some embodiments, if the Bot 500 is coupled to a dedicated external power source (e.g., a wall electrical outlet), the power module 508 can include a transformer and a power regulator.

The various modules discussed above are coupled together by a bus system 530. The bus system 530 can include a data bus and, for example, a power bus, a control signal bus, and/or a status signal bus in addition to the data bus. It is understood that the modules of the Bot 500 can be operatively coupled to one another using any suitable techniques and mediums.

Although a number of separate modules or components are illustrated in FIG. 5, persons of ordinary skill in the art will understand that one or more of the modules can be combined or commonly implemented. For example, the processor 502 can implement not only the functionality described above with respect to the processor 502, but also implement the functionality described above with respect to the wireless signal generator 522. Conversely, each of the modules illustrated in FIG. 5 can be implemented using a plurality of separate components or elements.

Figure 6:
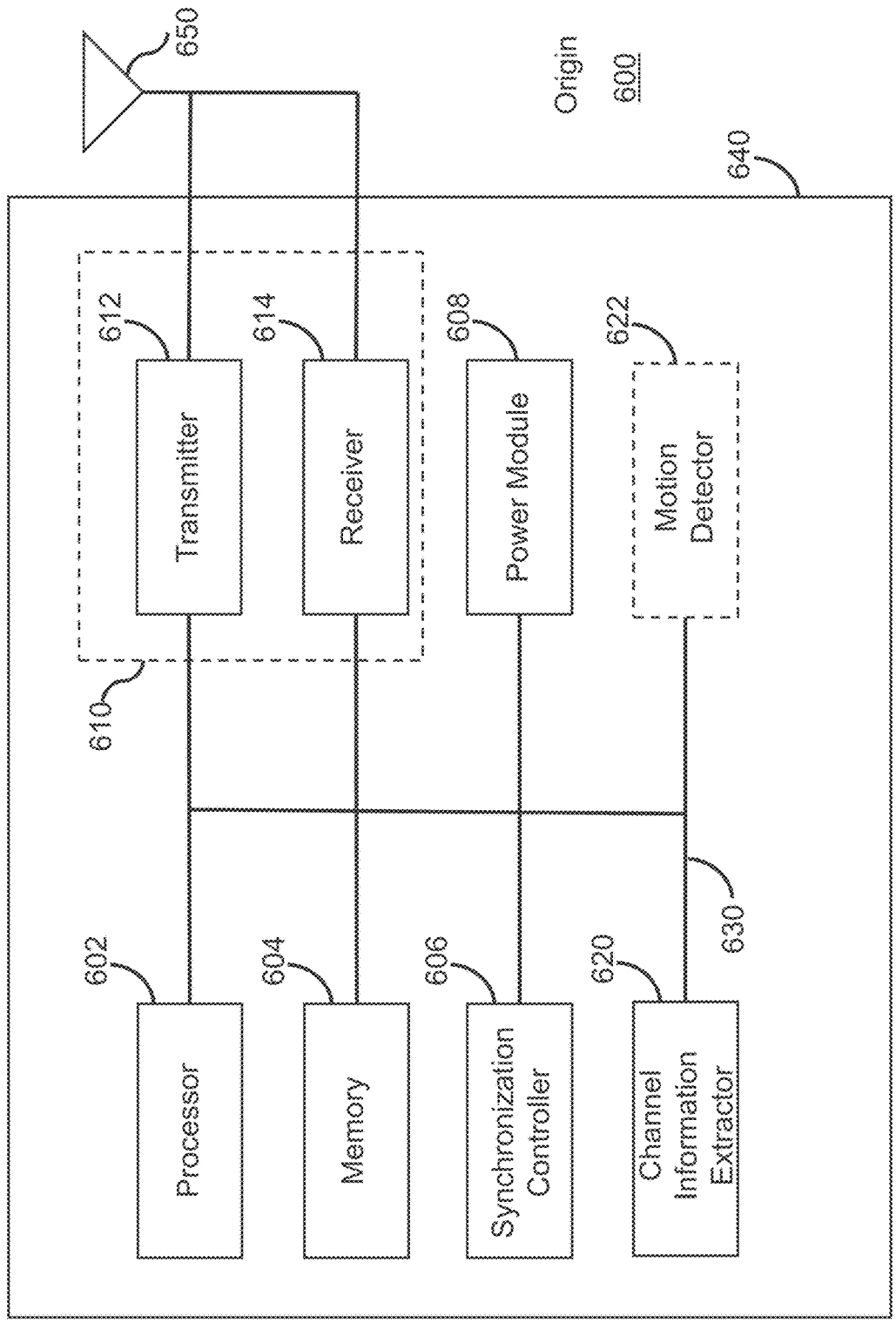
FIG. 6 illustrates an example block diagram of a second wireless device of a system for wireless sensing, according to some embodiments of the present disclosure.

FIG. 6 illustrates an example block diagram of a second wireless device, e.g. an Origin 600, of a wireless sensing system, according to one embodiment of the present teaching. The Origin 600 is an example of a device that can be configured to implement the various methods described herein. The Origin 600 in this example may serve as Origin 221 or Origin 222 in FIG. 2 for detecting user presence or motion in a venue. As shown in FIG. 6, the Origin 600 includes a housing 640 containing a processor 602, a memory 604, a transceiver 610 comprising a transmitter 612 and a receiver 614, a power module 608, a synchronization controller 606, a channel information extractor 620, and an optional motion detector 622.

In this embodiment, the processor 602, the memory 604, the transceiver 610 and the power module 608 work similarly to the processor 502, the memory 504, the transceiver 510 and the power module 508 in the Bot 500. An antenna 650 or a multi-antenna array 650 is typically attached to the housing 640 and electrically coupled to the transceiver 610.

The Origin 600 may be a second wireless device that has a different type from that of the first wireless device (e.g. the Bot 500). In particular, the channel information extractor 620 in the Origin 600 is configured for receiving the wireless signal through the wireless multipath channel impacted by the motion of the object in the venue, and obtaining a time series of channel information (CI) of the wireless multipath channel based on the wireless signal. The channel information extractor 620 may send the extracted CI to the optional motion detector 622 or to a motion detector outside the Origin 600 for detecting object motion in the venue.

The motion detector 622 is an optional component in the Origin 600. In one embodiment, it is within the Origin 600 as shown in FIG. 6. In another embodiment, it is outside the Origin 600 and in another device, which may be a Bot, another Origin, a cloud server, a fog server, a local server, and an edge server. The optional motion detector 622 may be configured for detecting the motion of the object in the venue based on motion information related to the motion of the object. The motion information associated with the first and second wireless devices is computed based on the time series of CI by the motion detector 622 or another motion detector outside the Origin 600.

The synchronization controller 606 in this example may be configured to control the operations of the Origin 600 to be synchronized or un-synchronized with another device, e.g. a Bot, another Origin, or an independent motion detector. In one embodiment, the synchronization controller 606 may control the Origin 600 to be synchronized with a Bot that transmits a wireless signal. In another embodiment, the synchronization controller 606 may control the Origin 600 to receive the wireless signal asynchronously with other Origins. In another embodiment, each of the Origin 600 and other Origins may receive the wireless signals individually and asynchronously. In one embodiment, the optional motion detector 622 or a motion detector outside the Origin 600 is configured for asynchronously computing respective heterogeneous motion information related to the motion of the object based on the respective time series of CI.

The various modules discussed above are coupled together by a bus system 630. The bus system 630 can include a data bus and, for example, a power bus, a control signal bus, and/or a status signal bus in addition to the data bus. It is understood that the modules of the Origin 600 can be operatively coupled to one another using any suitable techniques and mediums.

Although a number of separate modules or components are illustrated in FIG. 6, persons of ordinary skill in the art will understand that one or more of the modules can be combined or commonly implemented. For example, the processor 602 can implement not only the functionality described above with respect to the processor 602, but also implement the functionality described above with respect to the channel information extractor 620. Conversely, each of the modules illustrated in FIG. 6 can be implemented using a plurality of separate components or elements.

In one embodiment, in addition to the Bot 500 and the Origin 600, the system may also comprise: an assistance device, a third wireless device, e.g. another Bot, configured for transmitting an additional heterogeneous wireless signal through an additional wireless multipath channel impacted by the motion of the object in the venue, or a fourth wireless device, e.g. another Origin, that has a different type from that of the third wireless device. The fourth wireless device may be configured for: receiving the additional heterogeneous wireless signal through the additional wireless multipath channel impacted by the motion of the object in the venue, and obtaining a time series of additional channel information (CI) of the additional wireless multipath channel based on the additional heterogeneous wireless signal. The additional CI of the additional wireless multipath channel is associated with a different protocol or configuration from that associated with the CI of the wireless multipath channel. For example, the wireless multipath channel is associated with LTE, while the additional wireless multipath channel is associated with Wi-Fi. In this case, the optional motion detector 622 or a motion detector outside the Origin 600 is configured for detecting the motion of the object in the venue based on both the motion information associated with the first and second wireless devices and additional motion information associated with the third and fourth wireless devices computed by at least one of: an additional motion detector and the fourth wireless device based on the time series of additional CI.

In some embodiments, the present teaching discloses systems and methods for wireless sensing for in-vehicle child presence detection.

Figure 7A:
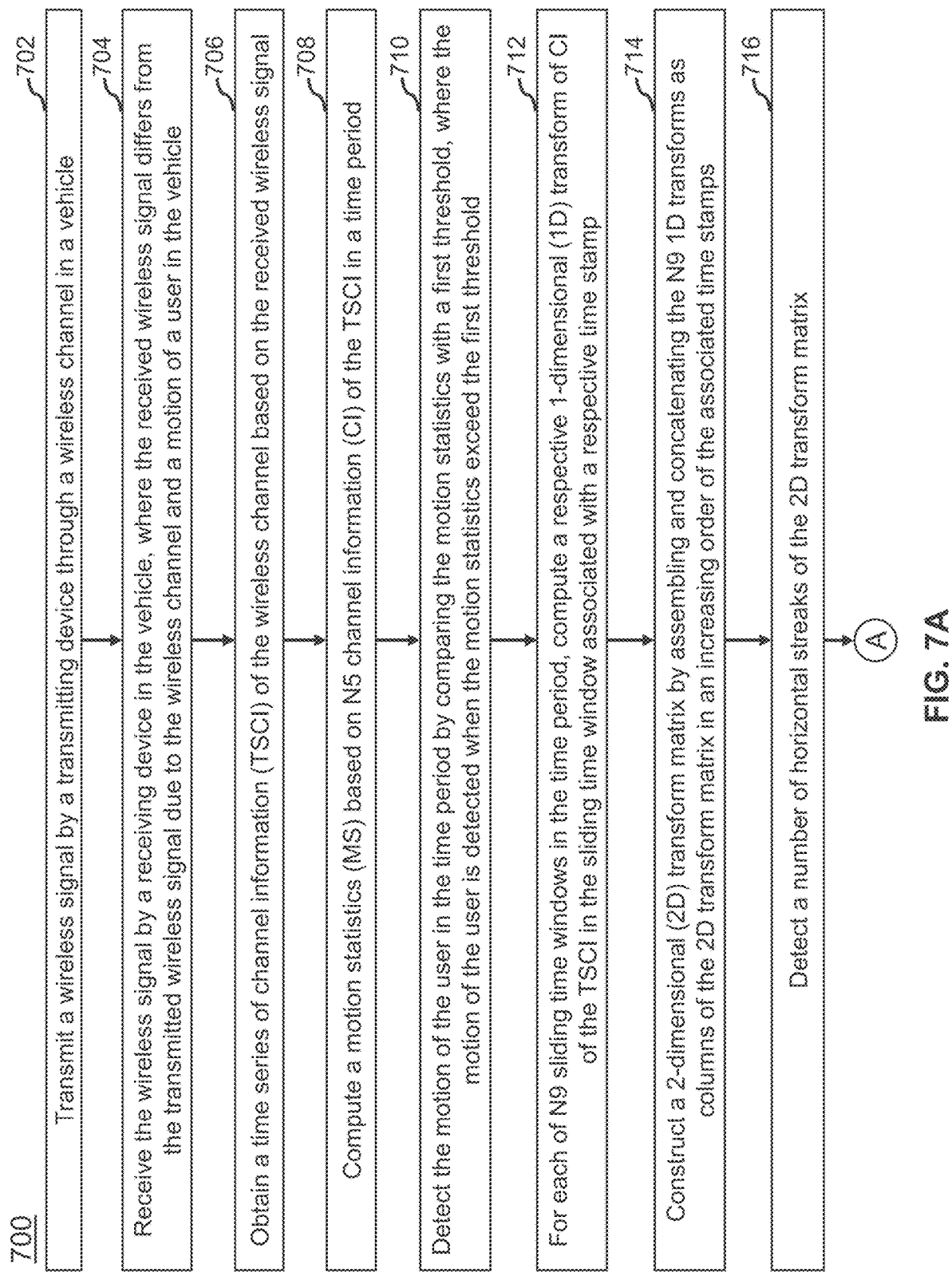
FIG. 7A and FIG. 7B illustrate a flow chart of an example method for performing wireless sensing for in-vehicle child presence detection, according to some embodiments of the present disclosure.
Figure 7B:
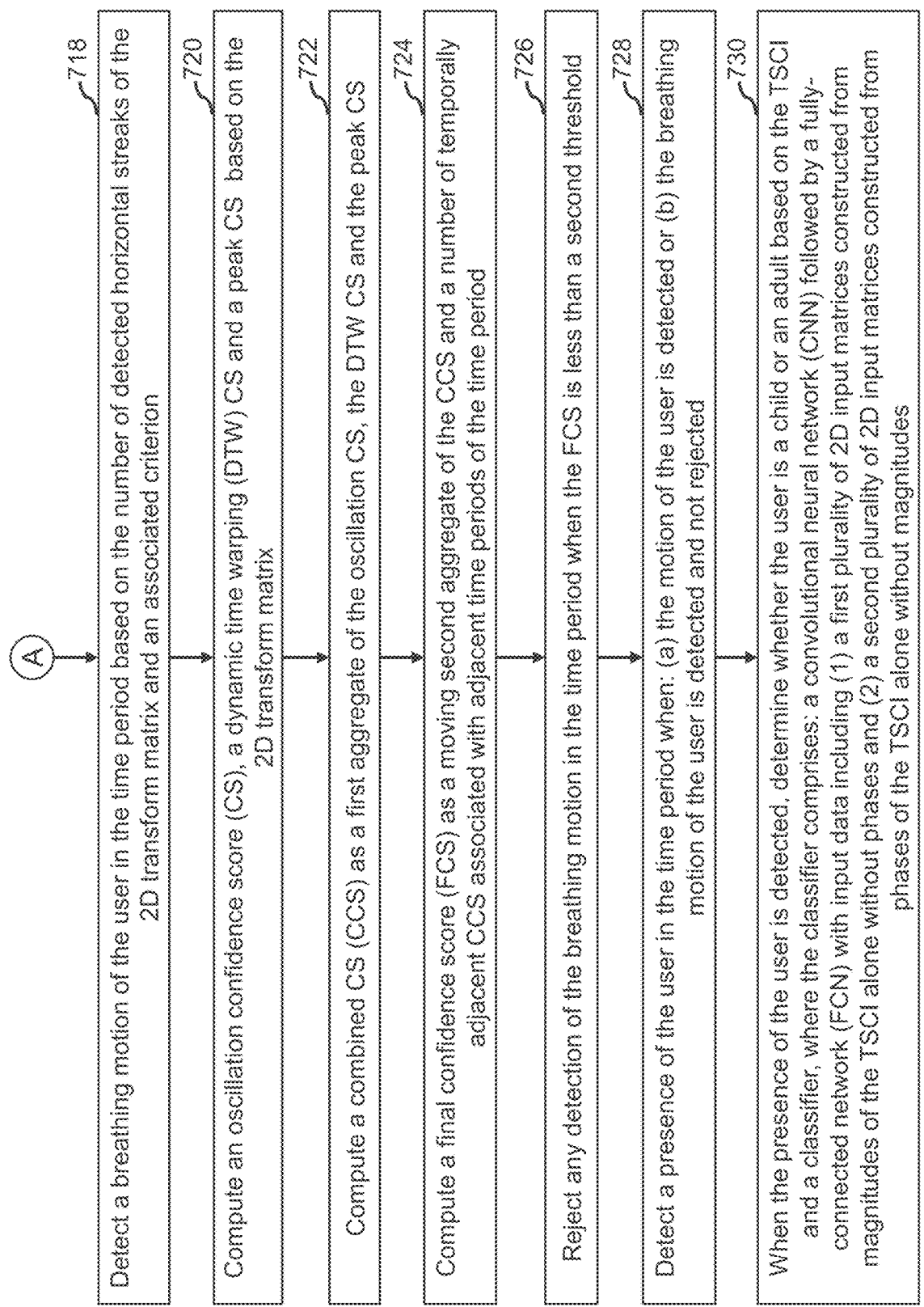

FIG. 7A and FIG. 7B illustrate a flow chart of an example method 700 for performing wireless sensing for in-vehicle child presence detection, according to some embodiments of the present disclosure. In various embodiments, the method 700 can be performed by the systems disclosed above. As shown in FIG. 7A, at operation 702, a wireless signal is transmitted by a transmitting device through a wireless channel in a vehicle. At operation 704, the wireless signal is received by a receiving device in the vehicle, where the received wireless signal differs from the transmitted wireless signal due to the wireless channel and a motion of a user in the vehicle. At operation 706, a time series of channel information (TSCI) of the wireless channel is obtained based on the received wireless signal. At operation 708, a motion statistics (MS) is computed based on N5 channel information (CI) of the TSCI in a time period. At operation 710, the motion of the user is detected in the time period by comparing the motion statistics with a first threshold, where the motion of the user is detected when the motion statistics exceed the first threshold. At operation 712, for each of N9 sliding time windows in the time period, a respective 1-dimensional (1D) transform of CI of the TSCI is computed in the sliding time window associated with a respective time stamp. At operation 714, a 2-dimensional (2D) transform matrix is constructed by assembling and concatenating the N9 1D transforms as columns of the 2D transform matrix in an increasing order of the associated time stamps. At operation 716, a number of horizontal streaks of the 2D transform matrix are detected.

As shown in FIG. 7B, at operation 718, a breathing motion of the user is detected in the time period based on the number of detected horizontal streaks of the 2D transform matrix and an associated criterion. At operation 720, an oscillation confidence score (CS), a dynamic time warping (DTW) CS and a peak CS based on the 2D transform matrix are computed. At operation 722, a combined CS (CCS) is computed as a first aggregate of the oscillation CS, the DTW CS and the peak CS. At operation 724, a final confidence score (FCS) is computed as a moving second aggregate of the CCS and a number of temporally adjacent CCS associated with adjacent time periods of the time period. At operation 726, any detection of the breathing motion in the time period is rejected when the FCS is less than a second threshold. At operation 728, a presence of the user in the time period is detected when: (a) the motion of the user is detected or (b) the breathing motion of the user is detected and not rejected. At operation 730, when the presence of the user is detected, it is determined whether the user is a child or an adult based on the TSCI and a classifier. The classifier comprises: a convolutional neural network (CNN) followed by a fully-connected network (FCN) with input data including (1) a first plurality of 2D input matrices constructed from magnitudes of the TSCI alone without phases and (2) a second plurality of 2D input matrices constructed from phases of the TSCI alone without magnitudes.

Figure 8:
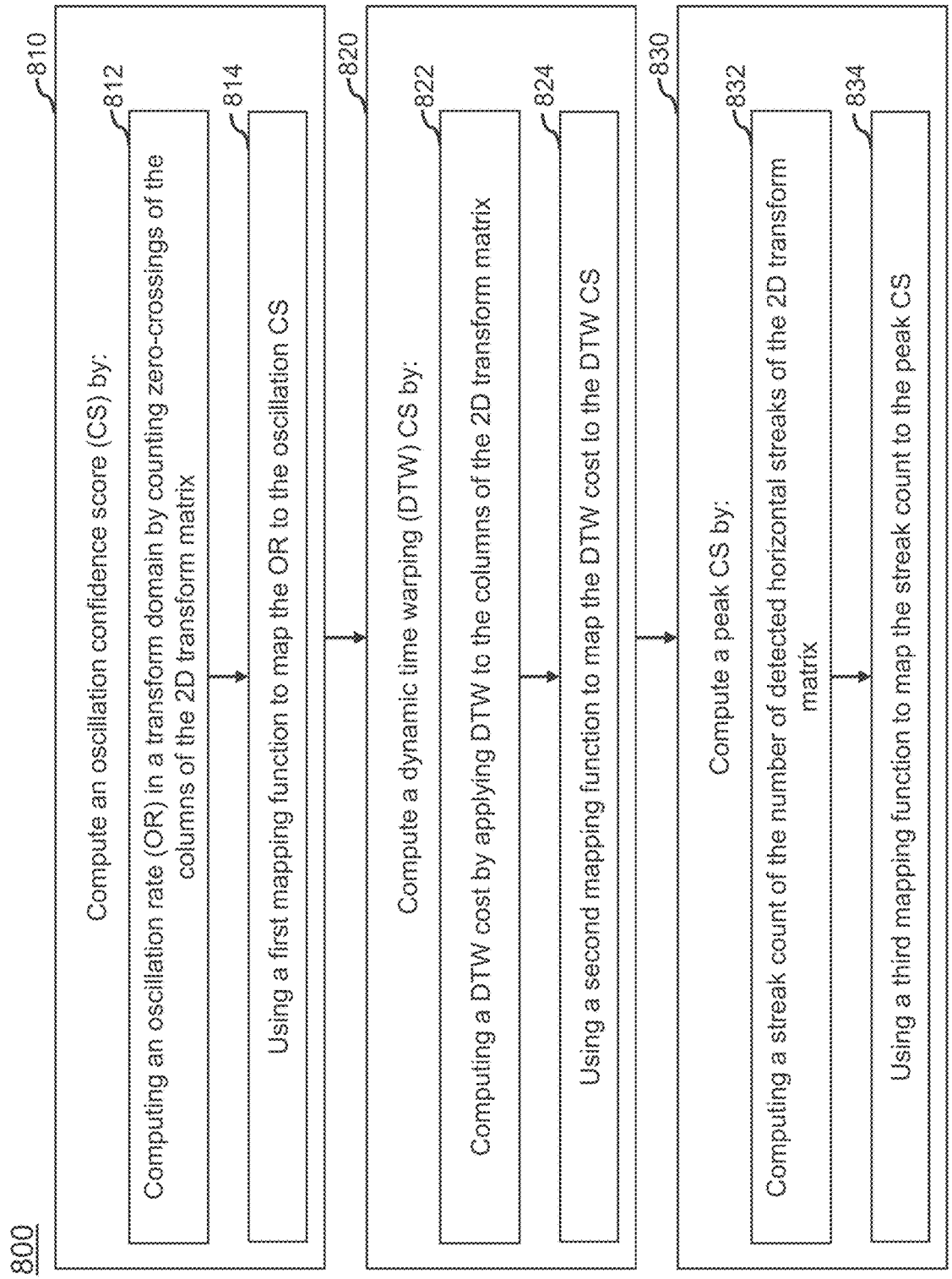
FIG. 8 illustrates a flow chart of an example method for computing an oscillation confidence score (CS), a dynamic time warping (DTW) CS and a peak CS, according to some embodiments of the present disclosure.

FIG. 8 illustrates a flow chart of an example method 800 for computing an oscillation confidence score (CS), a dynamic time warping (DTW) CS and a peak CS, according to some embodiments of the present disclosure. In various embodiments, the method 800 can be performed by the systems disclosed above. The operation 810 in this example includes multiple sub-operations 812-814 performed to compute an oscillation confidence score (CS). At sub-operation 812, an oscillation rate (OR) in a transform domain is computed by counting zero-crossings of the columns of the 2D transform matrix. At sub-operation 814, a first mapping function is used to map the OR to the oscillation CS. The operation 820 in this example includes multiple sub-operations 822-824 performed to compute a dynamic time warping (DTW) CS. At sub-operation 822, a DTW cost is computed by applying DTW to the columns of the 2D transform matrix. At sub-operation 824, a second mapping function is used to map the DTW cost to the DTW CS. The operation 830 in this example includes multiple sub-operations 832-834 performed to compute a peak CS. At sub-operation 832, a streak count of the number of detected horizontal streaks of the 2D transform matrix is computed. At sub-operation 834, a third mapping function is used to map the streak count to the peak CS. In some embodiments, the method 800 may be performed as part of the operation 720 in the method 700.

Figure 9:
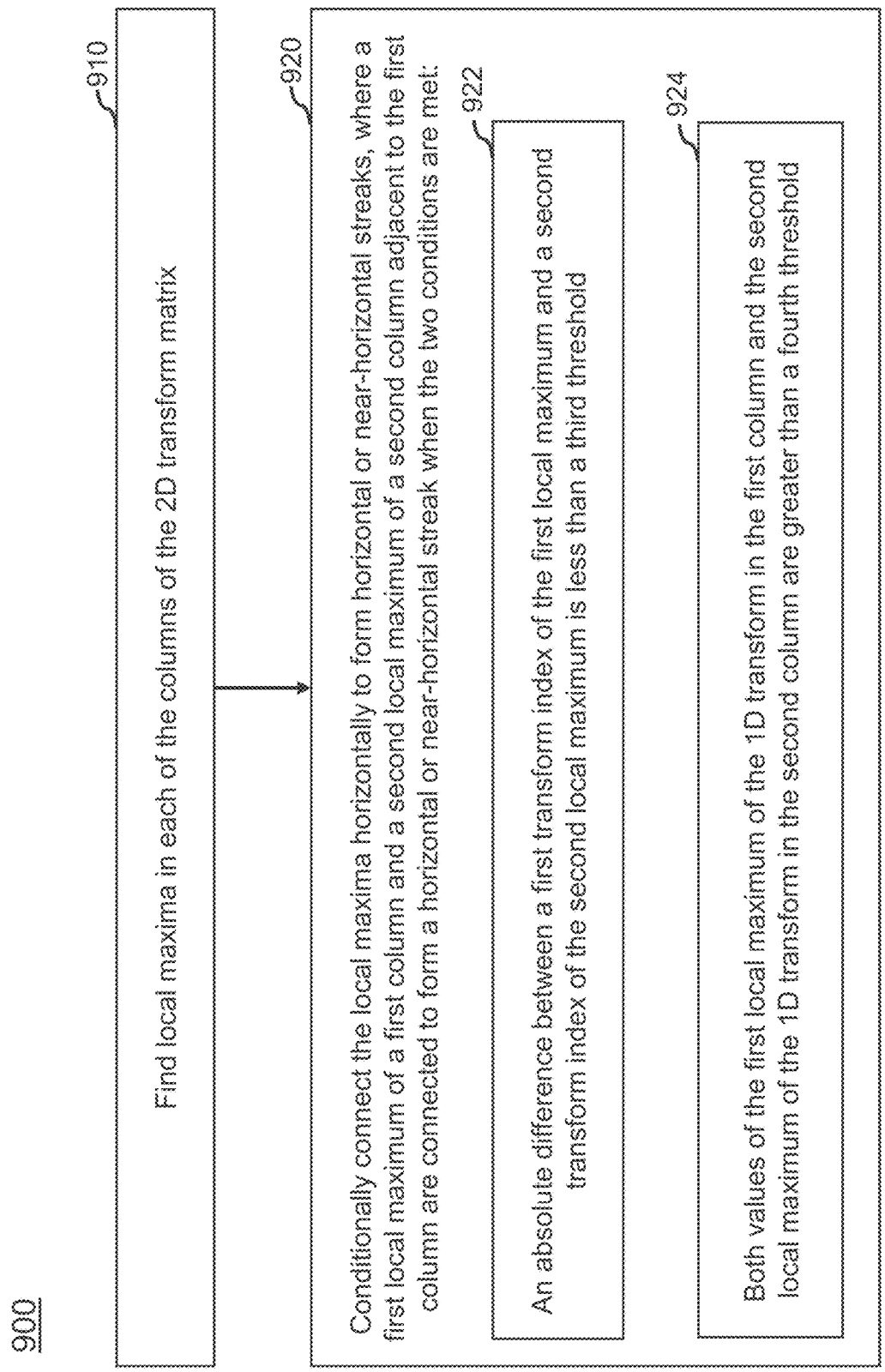
FIG. 9 illustrates a flow chart of an example method for detecting a number of horizontal streaks of a 2D transform matrix, according to some embodiments of the present disclosure.

FIG. 9 illustrates a flow chart of an example method 900 for detecting a number of horizontal streaks of a 2D transform matrix, according to some embodiments of the present disclosure. In various embodiments, the method 900 can be performed by the systems disclosed above. At operation 910, local maxima are found in each of the columns of the 2D transform matrix. At operation 920, the local maxima are conditionally connected horizontally to form horizontal or near-horizontal streaks. A first local maximum of a first column and a second local maximum of a second column adjacent to the first column are connected to form a horizontal or near-horizontal streak when the two conditions 922, 924 are met. Condition 922 includes that an absolute difference between a first transform index of the first local maximum and a second transform index of the second local maximum is less than a third threshold. Condition 924 includes that both values of the first local maximum of the 1D transform in the first column and the second local maximum of the 1D transform in the second column are greater than a fourth threshold. In some embodiments, the method 900 may be performed as part of the operation 716 in the method 700.

Figure 10A:
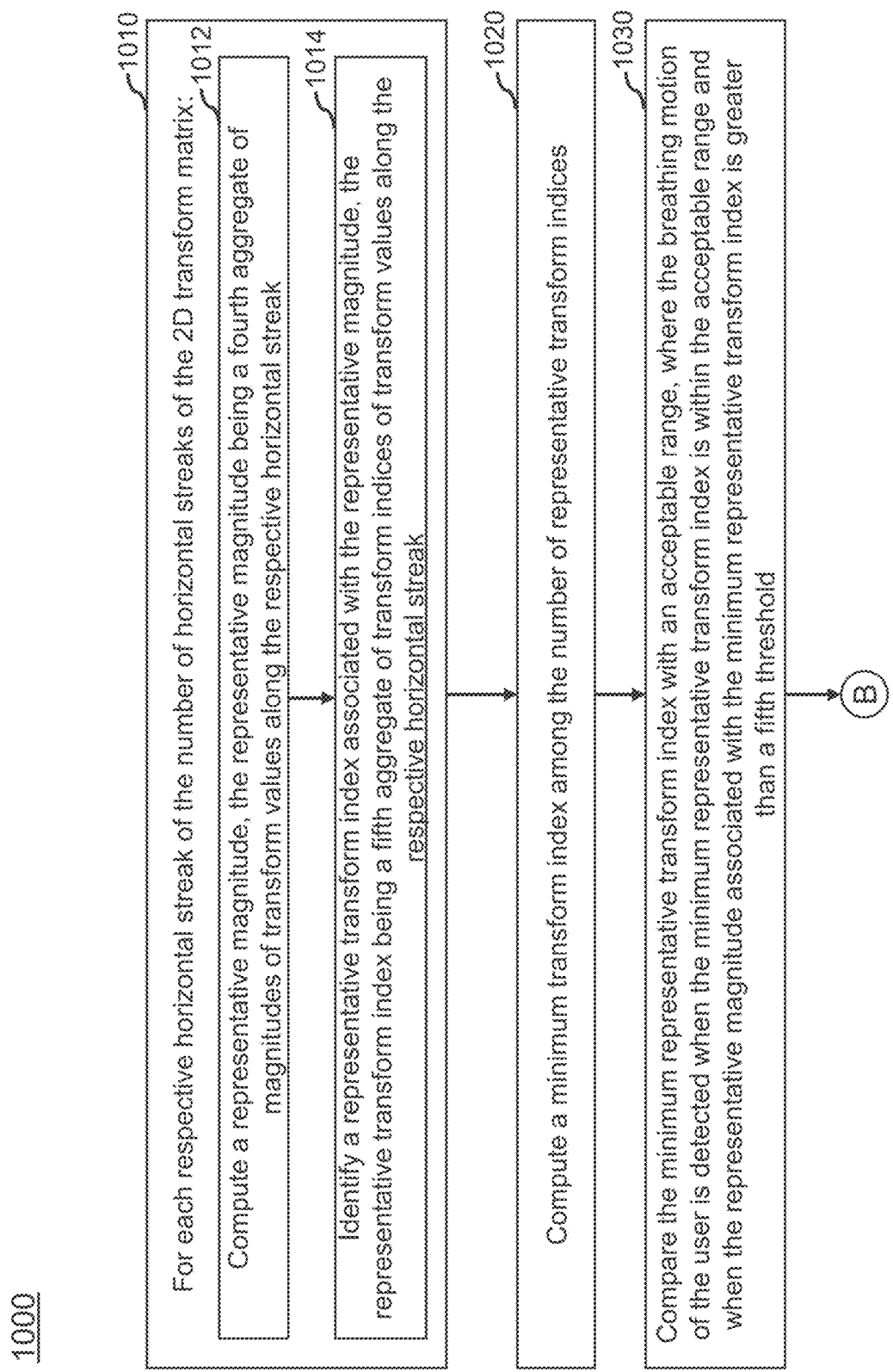
FIG. 10A and FIG. 10B illustrate a flow chart of an example method for detecting a breathing motion of a user in a time period, according to some embodiments of the present disclosure.
Figure 10B:
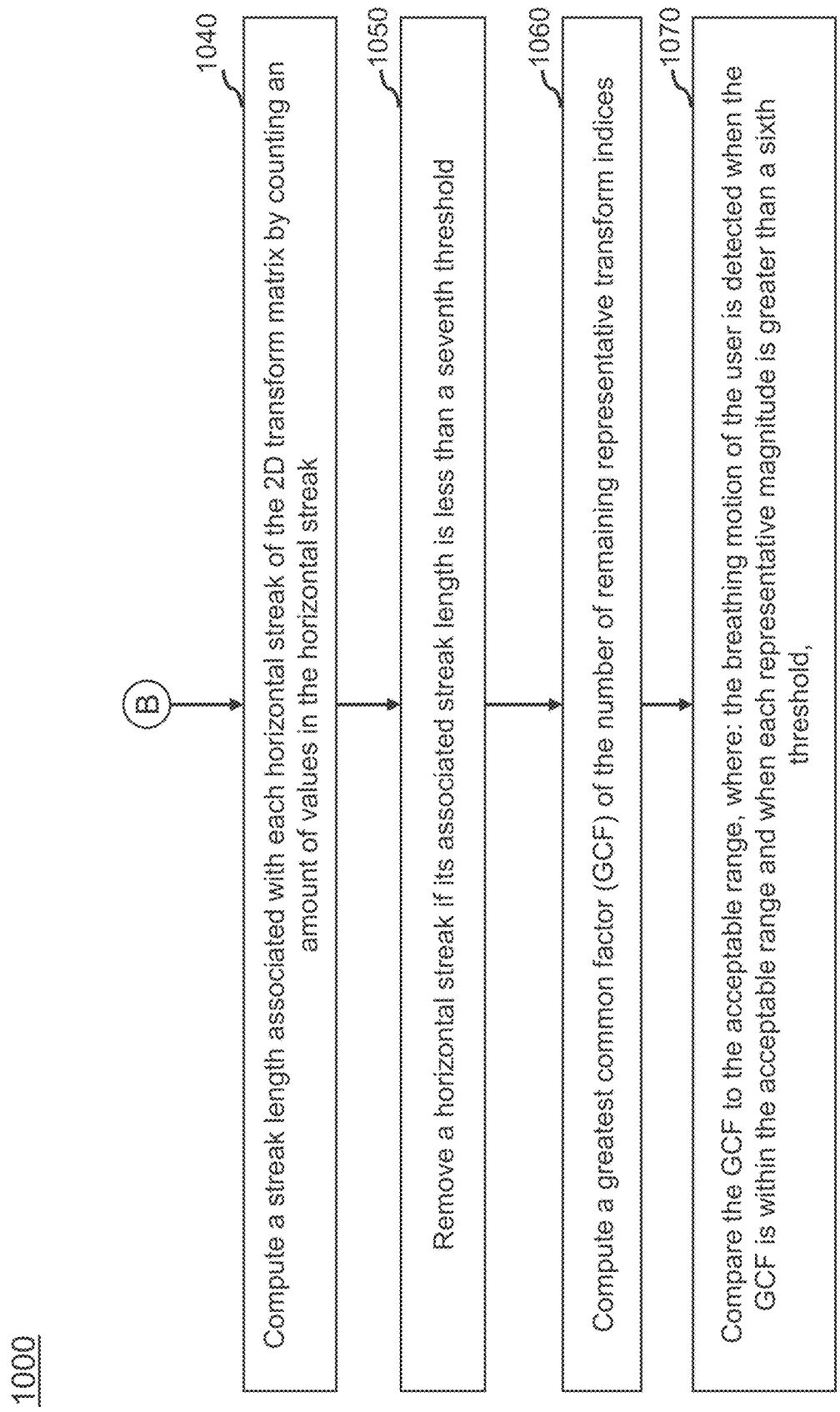

FIG. 10A and FIG. 10B illustrate a flow chart of an example method 1000 for detecting a breathing motion of a user in a time period, according to some embodiments of the present disclosure. In various embodiments, the method 1000 can be performed by the systems disclosed above. As shown in FIG. 10A, the operation 1010 in this example includes multiple sub-operations 1012-1014 performed for each respective horizontal streak of the number of horizontal streaks of the 2D transform matrix. At sub-operation 1012, a representative magnitude is computed, the representative magnitude being a fourth aggregate of magnitudes of transform values along the respective horizontal streak. At sub-operation 1014, a representative transform index associated with the representative magnitude is identified, the representative transform index being a fifth aggregate of transform indices of transform values along the respective horizontal streak. At operation 1020, a minimum transform index is computed among the number of representative transform indices. At operation 1030, the minimum representative transform index is compared with an acceptable range. The breathing motion of the user is detected when the minimum representative transform index is within the acceptable range and when the representative magnitude associated with the minimum representative transform index is greater than a fifth threshold. As shown in FIG. 10B, at operation 1040, a streak length associated with each horizontal streak of the 2D transform matrix is computed by counting an amount of values in the horizontal streak. At operation 1050, a horizontal streak is removed if its associated streak length is less than a seventh threshold. At operation 1060, a greatest common factor (GCF) of the number of remaining representative transform indices is computed. At operation 1070, the GCF is compared to the acceptable range. The breathing motion of the user is detected when the GCF is within the acceptable range and when each representative magnitude is greater than a sixth threshold. In some embodiments, the method 1000 may be performed as part of the operation 718 in the method 700.

Figure 11:
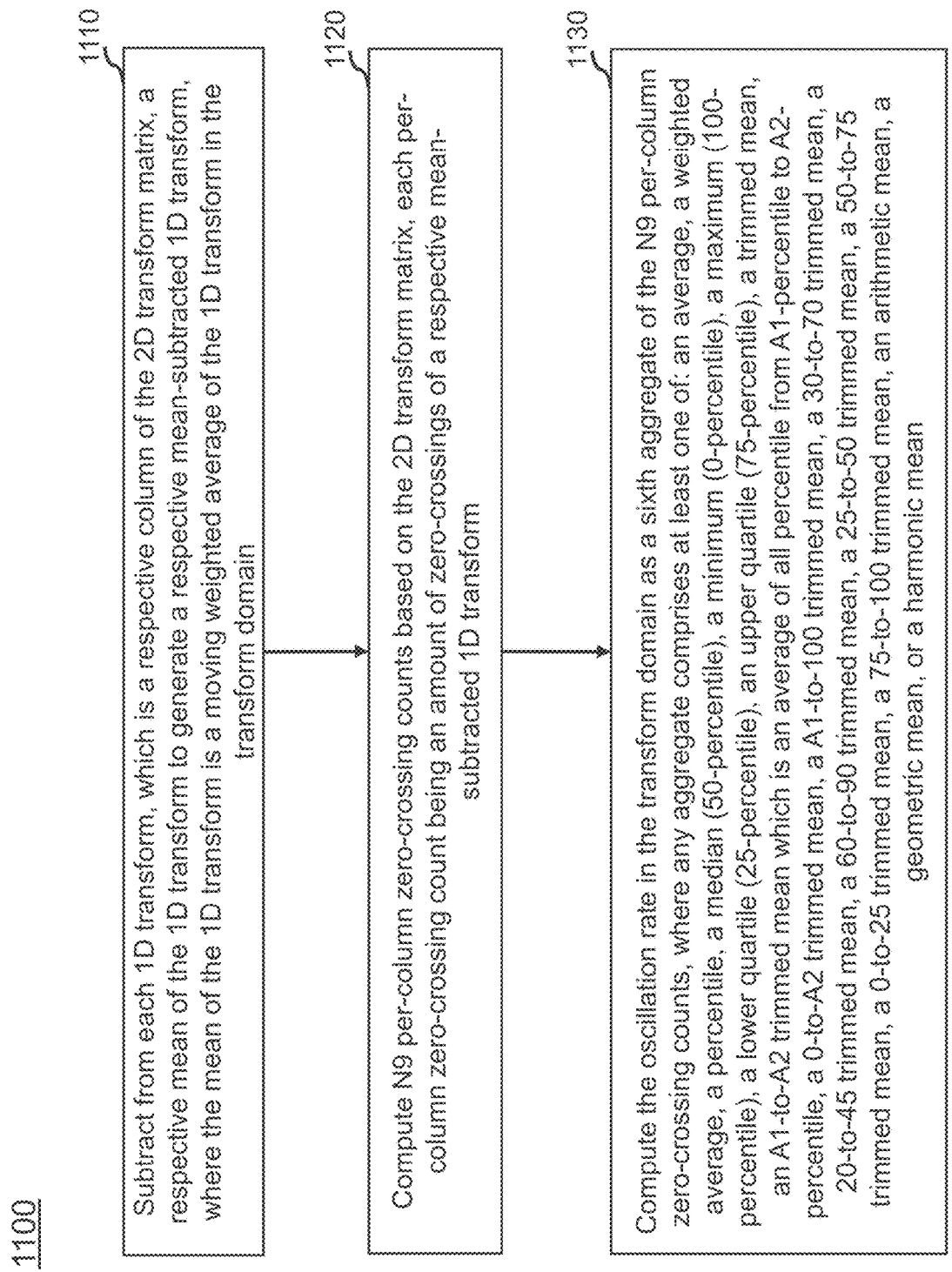
FIG. 11 illustrates a flow chart of an example method for computing oscillation rate in transform domain, according to some embodiments of the present disclosure.

FIG. 11 illustrates a flow chart of an example method 1100 for computing oscillation rate in transform domain, according to some embodiments of the present disclosure. In various embodiments, the method 1100 can be performed by the systems disclosed above. At operation 1110, a respective mean of the 1D transform is subtracted from each 1D transform, which is a respective column of the 2D transform matrix, to generate a respective mean-subtracted 1D transform. The mean of the 1D transform is a moving weighted average of the 1D transform in the transform domain. At operation 1120, N9 per-column zero-crossing counts are computed based on the 2D transform matrix, each per-column zero-crossing count being an amount of zero-crossings of a respective mean-subtracted 1D transform. At operation 1130, the oscillation rate is computed in the transform domain as a sixth aggregate of the N9 per-column zero-crossing counts. Any aggregate comprises at least one of: an average, a weighted average, a percentile, a median (50-percentile), a minimum (0-percentile), a maximum (100-percentile), a lower quartile (25-percentile), an upper quartile (75-percentile), a trimmed mean, an A1-to-A2 trimmed mean which is an average of all percentile from A1-percentile to A2-percentile, a 0-to-A2 trimmed mean, a A1-to-100 trimmed mean, a 30-to-70 trimmed mean, a 20-to-45 trimmed mean, a 60-to-90 trimmed mean, a 25-to-50 trimmed mean, a 50-to-75 trimmed mean, a 0-to-25 trimmed mean, a 75-to-100 trimmed mean, an arithmetic mean, a geometric mean, or a harmonic mean. In some embodiments, the method 1100 may be performed as part of the operation 812 in the method 800.

Figure 12:
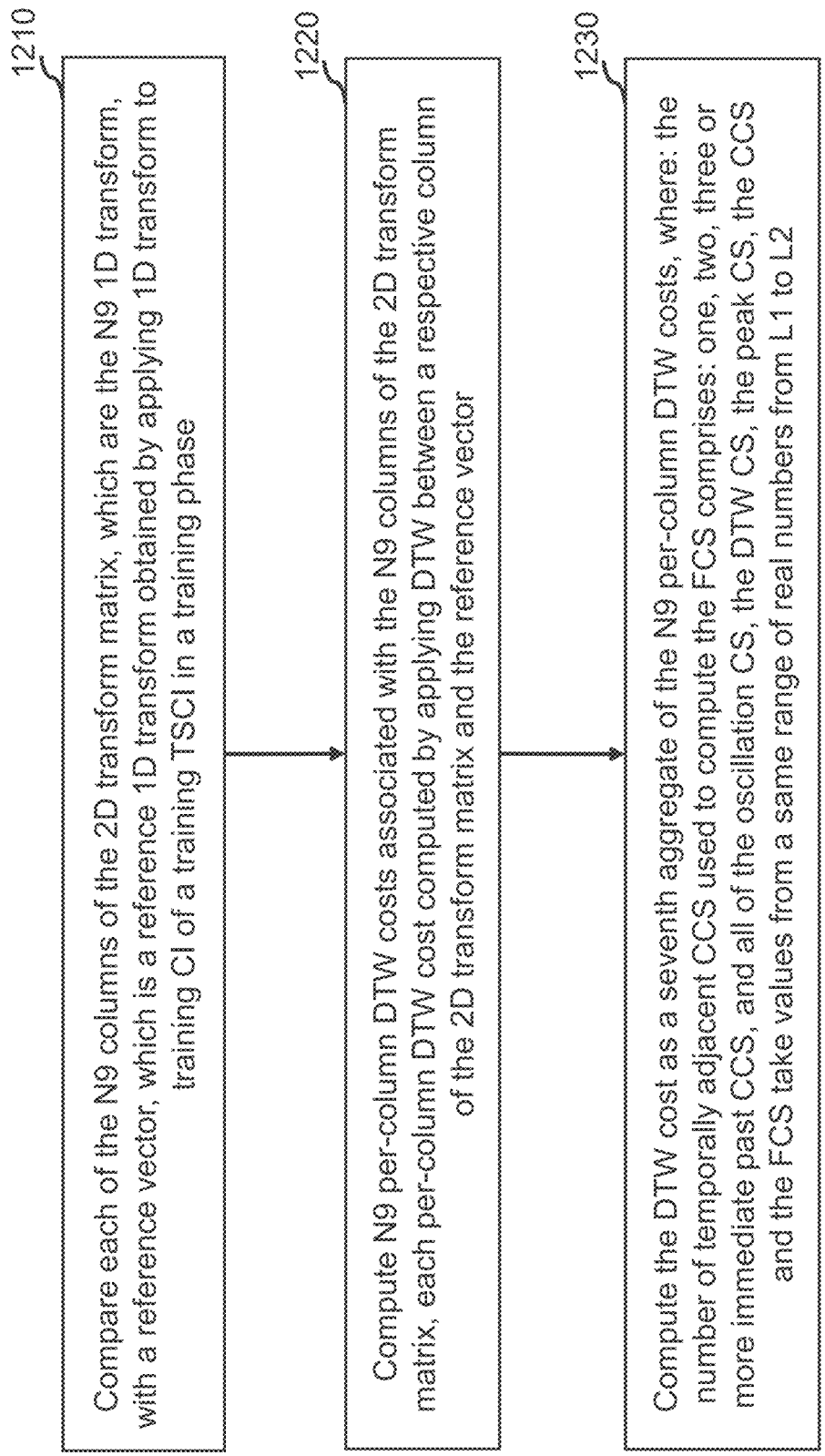
FIG. 12 illustrates a flow chart of an example method for computing DTW cost, according to some embodiments of the present disclosure.

FIG. 12 illustrates a flow chart of an example method 1200 for computing DTW cost a, according to some embodiments of the present disclosure. In various embodiments, the method 1200 can be performed by the systems disclosed above. At operation 1210, each of the N9 columns of the 2D transform matrix, which are the N9 1D transform, is compared with a reference vector, which is a reference 1D transform obtained by applying 1D transform to training CI of a training TSCI in a training phase. At operation 1220, N9 per-column DTW costs associated with the N9 columns of the 2D transform matrix are computed, each per-column DTW cost computed by applying DTW between a respective column of the 2D transform matrix and the reference vector. At operation 1230, the DTW cost is computed as a seventh aggregate of the N9 per-column DTW costs. The number of temporally adjacent CCS used to compute the FCS comprises: one, two, three or more immediate past CCS, and all of the oscillation CS, the DTW CS, the peak CS, the CCS and the FCS take values from a same range of real numbers from L1 to L2. In some embodiments, the method 1200 may be performed as part of the operation 822 in the method 800.

Figure 13:
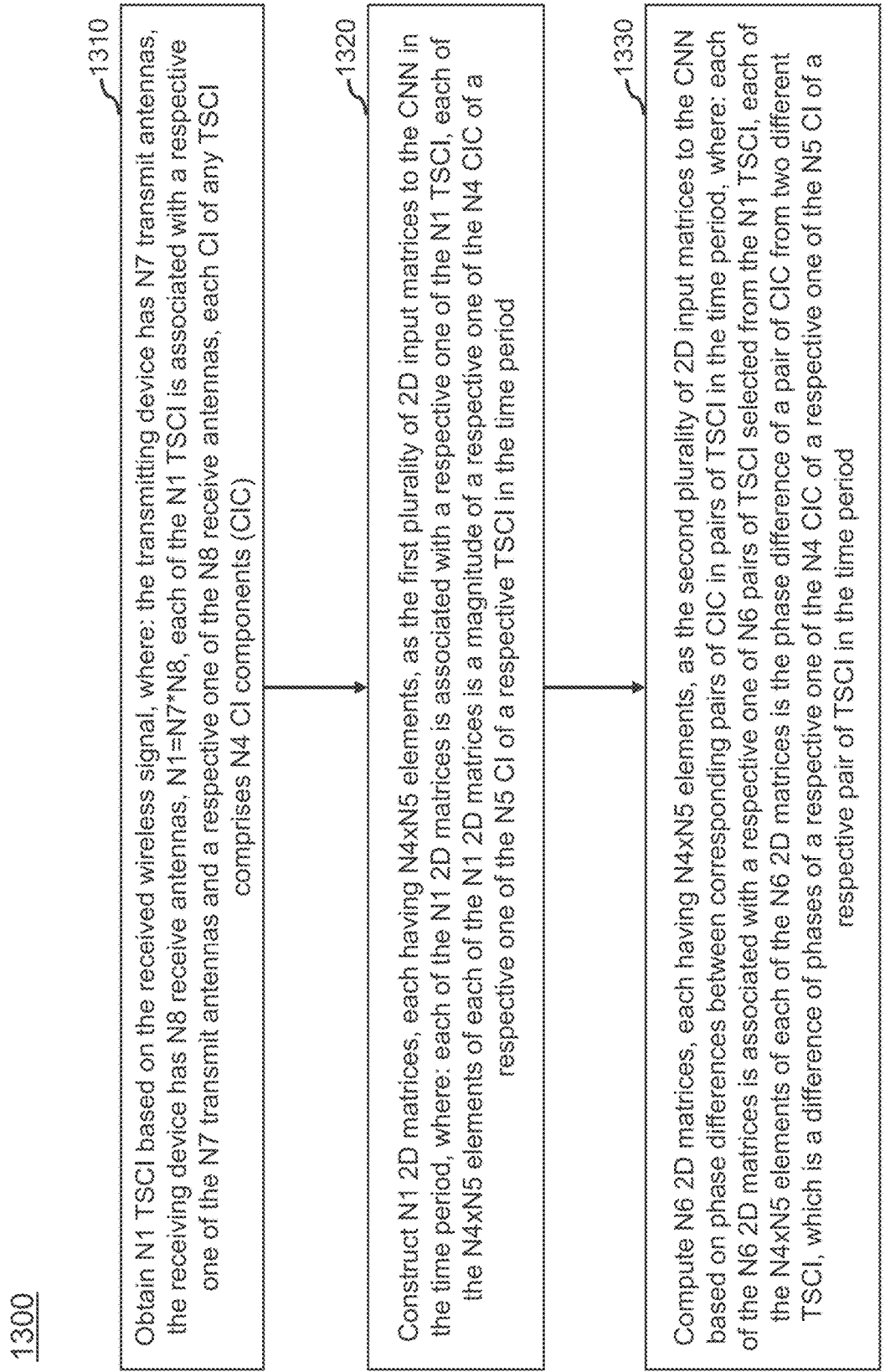
FIG. 13 illustrates a flow chart of an example method for computing 2D matrices, according to some embodiments of the present disclosure.

FIG. 13 illustrates a flow chart of an example method 1300 for computing 2D matrices, according to some embodiments of the present disclosure. In various embodiments, the method 1300 can be performed by the systems disclosed above. At operation 1310, N1 TSCI are obtained based on the received wireless signal. The transmitting device has N7 transmit antennas. The receiving device has N8 receive antennas. N1=N7*N8. Each of the N1 TSCI is associated with a respective one of the N7 transmit antennas and a respective one of the N8 receive antennas, each CI of any TSCI comprises N4 CI components (CIC). At operation 1320, N1 2D matrices, each having N4×N5 elements, are constructed as the first plurality of 2D input matrices to the CNN in the time period. Each of the N1 2D matrices is associated with a respective one of the N1 TSCI. Each of the N4×N5 elements of each of the N1 2D matrices is a magnitude of a respective one of the N4 CIC of a respective one of the N5 CI of a respective TSCI in the time period. At operation 1330, N6 2D matrices, each having N4×N5 elements, are computed as the second plurality of 2D input matrices to the CNN based on phase differences between corresponding pairs of CIC in pairs of TSCI in the time period. Each of the N6 2D matrices is associated with a respective one of N6 pairs of TSCI selected from the N1 TSCI. Each of the N4×N5 elements of each of the N6 2D matrices is the phase difference of a pair of CIC from two different TSCI, which is a difference of phases of a respective one of the N4 CIC of a respective one of the N5 CI of a respective pair of TSCI in the time period.

Figure 14A:
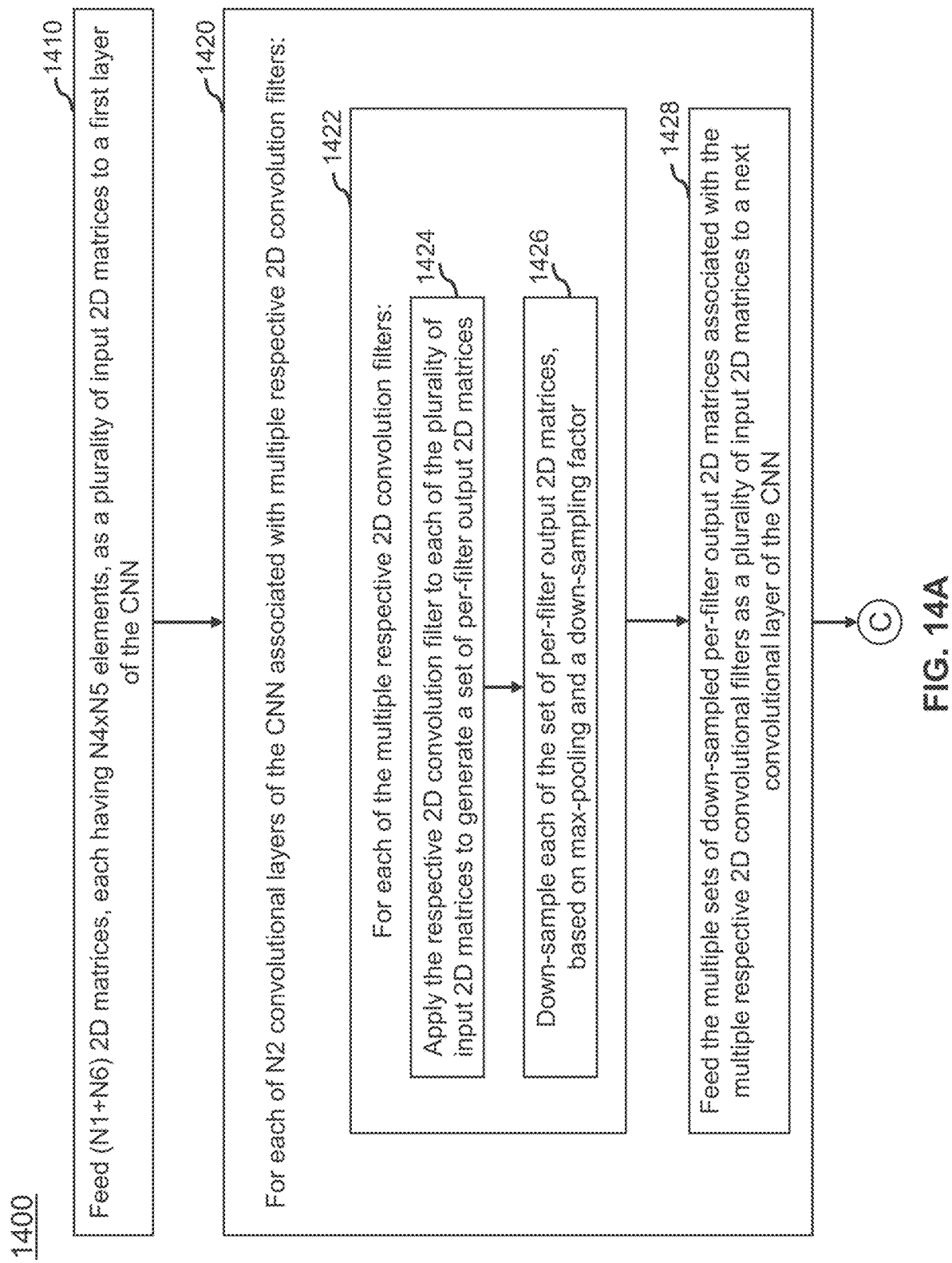
FIG. 14A and FIG. 14B illustrate a flow chart of an example method for generating output probability scores for a fully-connected network, according to some embodiments of the present disclosure.
Figure 14B:
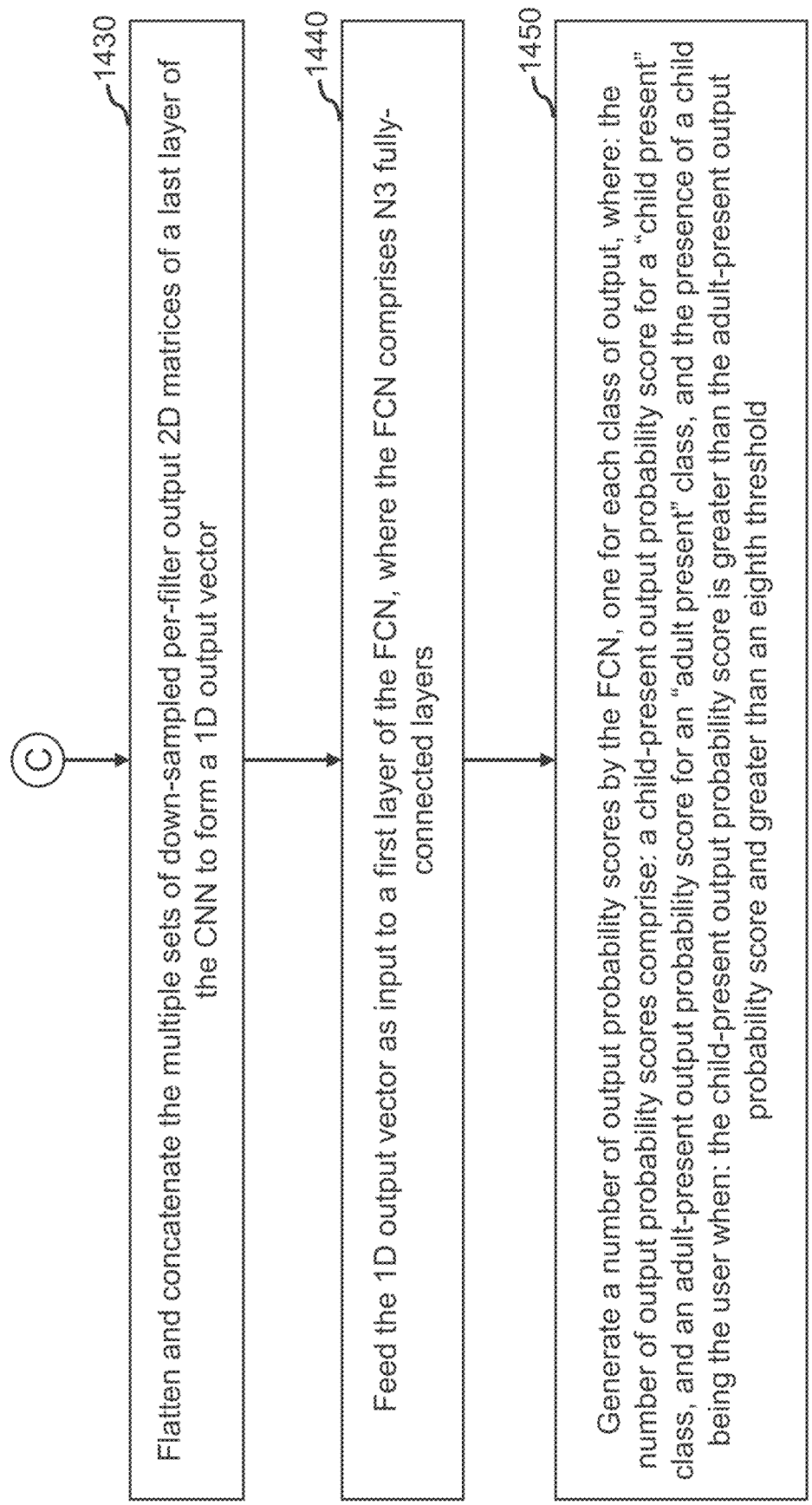

FIG. 14A and FIG. 14B illustrate a flow chart of an example method 1400 for generating output probability scores for a fully-connected network, according to some embodiments of the present disclosure. In various embodiments, the method 1400 can be performed by the systems disclosed above.

As shown in FIG. 14A, at operation 1410, (N1+N6) 2D matrices, each having N4×N5 elements, are fed as a plurality of input 2D matrices to a first layer of the CNN. In this example, the operation 1420 includes multiple sub-operations 1422 and 1428 performed for each of N2 convolutional layers of the CNN associated with multiple respective 2D convolution filters. The sub-operation 1422 includes steps 1424 and 1426 performed for each of the multiple respective 2D convolution filters. At step 1424, the respective 2D convolution filter is applied to each of the plurality of input 2D matrices to generate a set of per-filter output 2D matrices. At step 1426, each of the set of per-filter output 2D matrices is down-sampled based on max-pooling and a down-sampling factor. At sub-operation 1428, the multiple sets of down-sampled per-filter output 2D matrices associated with the multiple respective 2D convolutional filters are fed as a plurality of input 2D matrices to a next convolutional layer of the CNN.

As shown in FIG. 14B, at operation 1430, the multiple sets of down-sampled per-filter output 2D matrices of a last layer of the CNN are flattened and concatenated to form a 1D output vector. At operation 1440, the 1D output vector is fed as input to a first layer of the FCN, where the FCN comprises N3 fully-connected layers. At operation 1450, a number of output probability scores are generated by the FCN, one for each class of output. The number of output probability scores comprise: a child-present output probability score for a "child present" class, and an adult-present output probability score for an "adult present" class. The presence of a child is the user when: the child-present output probability score is greater than the adult-present output probability score and greater than an eighth threshold.

The following numbered clauses provide examples for wireless sensing for in-vehicle child presence detection.

Clause 1. A system/device/method/software of wireless sensing for in-vehicle child presence detection, comprising: transmitting a wireless signal by a Type1 heterogeneous wireless device through a wireless channel in a vehicle; receiving the wireless signal by a Type2 heterogeneous wireless device in the vehicle, wherein the received wireless signal differs from the transmitted wireless signal due to the wireless channel and a motion of a user in the vehicle; obtaining a time series of channel information (TSCI) of the wireless channel by the Type2 device based on the received wireless signal; computing a motion statistics (MS) based on N5 CI of the TSCI in a time period; detecting the motion of the user in the time period by comparing the motion statistics with a first threshold, wherein the motion of user is detected when the motion statistics exceed the first threshold; for each of N9 sliding time windows in the time period, computing a respective 1-dimensional (1D) transform of channel information (CI) of the TSCI in the sliding time window associated with a respective time stamp; constructing a 2-dimensional (2D) transform matrix by assembling and concatenating the N9 1D transform as columns of the 2D transform matrix in increasing order of the time stamp; detecting a number of horizontal streaks of the 2D transform matrix; detecting a breathing motion of the user in the time period based on the number of detected horizontal streaks of the 2D transform matrix and an associated criterion; computing an oscillation confidence score (oscillation CS) by: computing an oscillation rate (OR) in the transform domain by counting zero-crossings of the 2D transform matrix, and using a first mapping function to map the OR to the oscillation CS; computing a DTW confidence score (DTW CS) by: computing a DTW cost by applying dynamic time warping (DTW) to the 2D transform matrix, and using a second mapping function to map the DTW cost to the DTW CS; computing a peak confidence score (peak CS) by: computing a streak count of the number of detected horizontal streaks of the 2D transform matrix, and using a third mapping function to map the streak count to the peak CS; computing a combined confidence score (CCS) as a first aggregate of the oscillation CS, the DTW CS and the peak CS; computing a final confidence score (FCS) as a moving second aggregate of the CCS and a number of temporally adjacent CCS associated with adjacent time periods, wherein any aggregate comprises at least one of: a sum, product, mean, arithmetic mean, geometric mean, harmonic mean, weighted sum, weighted average, percentile, median (50-percentile), minimum (0-percentile), maximum (100-percentile), trimmed mean (mean from A1-percentile to A2-percentile), trimmed arithmetic mean, trimmed geometric mean, trimmed harmonic mean, or mode; rejecting any detection of the breathing motion in the time period when FCS is less than a second threshold; detecting a presence of the user in the time period when either (a) the motion of the user is detected, or (b) the breathing motion of the user is detected and not rejected; when presence of the user is detected, detecting whether the detected user is a child or an adult in the time period based on the TSCI and a classification module comprising a convolutional neural network (CNN) followed by a fully-connected network (FCN) with input being a first plurality of 2D input matrices constructed from magnitude of TSCI alone with the phase, and a second plurality of 2D input matrices constructed from phase of TSCI alone without the magnitude.

Clause 2. The system/device/method/software of wireless sensing for in-vehicle child presence detection of clause 1, further comprising: wherein the motion statistics comprises a similarity score of a pair of temporally adjacent CI of the TSCI.

In some embodiments, these may be some possible 1D transform: ACF, STFT, or some frequency transform such as wavelet transform, sin transform, cosine transform, trigonometic transform, Hadamard transform, Haar transform, etc.

Clause 3. The system/device/method/software of wireless sensing for in-vehicle child presence detection of clause 1: wherein the 1D transform comprises one of: autocorrelation function (ACF), short-time Fourier transform (STFT), fast Fourier transform (FFT), or frequency transform.

In some embodiments, 1D transform may be an aggregate of multiple per-component 1D transform.

Clause 4. The system/device/method/software of wireless sensing for in-vehicle child presence detection of clause 3, further comprising: wherein any CI has N4 CI components (CIC); computing the respective 1D transform by: for each of the N4 CIC, computing a respective per-component 1D transform of the respective CIC of CI of the TSCI in the respective sliding time window, and computing the respective 1D transform as a third aggregate of the N4 per-component 1D transform, wherein the any third aggregate comprises at least one of: sum, product, mean, arithmetic mean, geometric mean, harmonic mean, weighted sum, weighted average, percentile, median (50-percentile), minimum (0-percentile), maximum (100-percentile), trimmed mean (mean from A1-percentile to A2-percentile), trimmed arithmetic mean, trimmed geometric mean, trimmed harmonic mean, or mode In some embodiments, a special case includes MRC used in the aggregate to generate 1D transform.

Clause 5. The system/device/method/software of wireless sensing for in-vehicle child presence detection of clause 4, further comprising: computing the respective 1D transform as the third aggregate of the N4 per-component 1D transform based on maximum ratio combining (MRC).

In some embodiments, the 2D transform matrix (formed by representing each of the N9 1D transform as a 1-dimensional vector and concatenating/grouping/combining the N9 vectors) may be enhanced in clause 1.

Clause 6. The system/device/method/software of wireless sensing for in-vehicle child presence detection of clause 1, further comprising: enhancing the 2D transform matrix by at least one of: image peak enhancement, edge enhancement, peak emphasis, highpass emphasis, directional filtering, vertical highpass filtering, horizontal lowpass filtering, near-horizontal lowpass filtering, histogram equalization, or image enhancement.

Clause 7. The system/device/method/software of wireless sensing for in-vehicle child presence detection of clause 1, further comprising: detecting the number of horizontal peaks of the 2D transform matrix by finding local maxima in each of the vertical columns and conditionally connecting the maxima horizontally to form horizontal or near-horizontal streaks.

In some embodiments, the threshold may be 1 or 2 or 3 or . . . The streak may be horizontal if threshold is 1, and near horizontal if threshold is 2 or 3 or larger.

Clause 8. The system/device/method/software of wireless sensing for in-vehicle child presence detection of clause 7, further comprising: conditionally connecting a first local maximum of a first column and a second local maximum of an adjacent column adjacent to the first column to form a horizontal or near-horizontal streak when: an absolute difference between a first transform index of the first local maximum and a second transform index of the second local maximum is less than a third threshold, both the first local maximum value of the 1D transform in the first column and the second local maximum value of the 1D transform in the adjacent column are greater than a fourth threshold.

In some embodiments, the system can compute a representative magnitude of each horizontal streak (e.g. average or weighted average of magnitude of transform values along the streak). In one example, all values may have equal weights along the streak. In another example, the all values may have a common weight along the streak, except that the last one or more may have different weights (e.g. smaller or greater than the common weight). Ideally, the representative magnitude should be large enough in order for it to be trustworthy. In some embodiments, the system can compute a representative transform index for each horizontal streak (related to breathing rate).

Clause 9. The system/device/method/software of wireless sensing for in-vehicle child presence detection of clause 1, further comprising: detecting the breathing motion of the user in the time period by: computing a representative magnitude of each of the number of horizontal streaks of the 2D transform matrix, the representative magnitude being a fourth aggregate of magnitude of transform values along the respective streak, identifying a representative transform index associated with each of the number of horizontal streaks of the 2D transform matrix, the representative transform index being a fifth aggregate of transform index of transform values along the respective streak, computing a minimum transform index among the number of representative transform indices, comparing the minimum representative transform index to an acceptable range, wherein the breathing motion of the user is detected when the minimum representative transform index is within the acceptable range and the associated representative magnitude is greater than a fifth threshold.

Clause 10. The system/device/method/software of wireless sensing for in-vehicle child presence detection of clause 9, further comprising: detecting the breathing motion of the user in the time period further by: computing a greatest common factor (GCF) of the number of representative transform indices, and comparing the GCF to the acceptable range, wherein the breathing motion of the user is detected when the GCF is within the acceptable range and each of the representative magnitude is greater than a sixth threshold, wherein the sixth threshold is larger than the fifth threshold.

In some embodiments, short horizontal streaks may be due to noise and may be eliminated/removed/deleted.

Clause 11. The system/device/method/software of wireless sensing for in-vehicle child presence detection of clause 10, further comprising: detecting the breathing motion of the user in the time period further by: computing a streak length of each horizontal streak of the 2D transform matrix by counting an amount of values in each streak, and remove a streak if the associated streak length is less than a seventh threshold.

In some embodiments, zero-crossing count may be obtained for each column of 2D transform matrix (i.e. for each 1D transform). Oscillation rate may be an aggregate of N9 per-column zero-crossing counts.

Clause 12. The system/device/method/software of wireless sensing for in-vehicle child presence detection of clause 1, further comprising: computing N9 per-column zero-crossing counts based on the 2D transform matrix, each per-column zero-crossing count being an amount of zero-crossings of a respective 1D transform which is a respective one of the N9 columns of the 2D transform matrix, and computing the oscillation rate in the transform domain as a sixth aggregate of the N9 per-column zero-crossing counts, wherein sixth aggregate comprises at least one of: an average, a weighted average, a percentile, a median (50-percentile), a minimum (0-percentile), a maximum (100-percentile), a lower quartile (25-percentile), an upper quartile (75-percentile), a trimmed mean, an A1-to-A2 trimmed mean which is an average of all percentile from A1-percentile to A2-percentile, a 0-to-A2 trimmed mean, a A1-to-100 trimmed mean, a 30-to-70 trimmed mean, a 20-to-45 trimmed mean, a 60-to-90 trimmed mean, a 25-to-50 trimmed mean, a 50-to-75 trimmed mean, a 0-to-25 trimmed mean, a 75-to-100 trimmed mean, an arithmetic mean, a geometric mean, or a harmonic mean.

In some embodiments, a mean (e.g. a constant mean, or a mean function) of each column may be subtracted from the column before zero-crossing counts are computed.

Clause 13. The system/device/method/software of wireless sensing for in-vehicle child presence detection of clause 12, further comprising: subtracting from each 1D transform, which is a respective column of the 2D transform matrix, a respective mean of the 1D transform; computing each per-column zero-crossing count as the amount of zero-crossings of a respective mean-subtracted 1D transform.

In some embodiments, the mean function may be computed by applying a (weighted) moving average filter (a smoothing filter) to the 1D transform.

Clause 14. The system/device/method/software of wireless sensing for in-vehicle child presence detection of clause 13: wherein the mean of the 1D transform to be subtracted is a moving weighted average of the 1D transform in the transform domain.

In some embodiments, DTW cost may be an aggregate of individual per-column (i.e. per 1D transform) DTW cost.

Clause 15. The system/device/method/software of wireless sensing for in-vehicle child presence detection of clause 1, further comprising: comparing each of the N9 columns of the 2D transform matrix, which are the N9 1D transform, with a reference vector, which is a reference 1D transform obtained by applying 1D transform to training CI of a training TSCI in a training phase; computing N9 per-column DTW cost associated with the N9 columns of the 2D transform matrix, each per-column DTW cost computed by applying dynamic time warping (DTW) between respective column of the 2D transform matrix and the reference vector; computing the DTW cost as a seventh aggregate of the N9 per-column DTW cost, wherein the seventh aggregate comprises at least one of: an average, a weighted average, a percentile, a median (50-percentile), a minimum (0-percentile), a maximum (100-percentile), a lower quartile (25-percentile), an upper quartile (75-percentile), a trimmed mean, an A1-to-A2 trimmed mean which is an average of all percentile from A1-percentile to A2-percentile, a 0-to-A2 trimmed mean, a A1-to-100 trimmed mean, a 30-to-70 trimmed mean, a 20-to-45 trimmed mean, a 60-to-90 trimmed mean, a 25-to-50 trimmed mean, a 50-to-75 trimmed mean, a 0-to-25 trimmed mean, a 75-to-100 trimmed mean, an arithmetic mean, a geometric mean, or a harmonic mean.

In some embodiments, FS may be moving average of several temporally adjacent CCS.

Clause 16. The system/device/method/software of wireless sensing for in-vehicle child presence detection of clause 1: wherein the number of temporally adjacent CCS used to compute the FCS comprises: one, two, or three immediate past CCS.

Clause 17. The system/device/method/software of wireless sensing for in-vehicle child presence detection of clause 1, further comprising: wherein all of oscillation CS, DTW CS, peak CS, combined CS and final CS take values from a same range of real numbers.

In some embodiments, all CS may be in the range between 0 and 1.

Clause 18. The system/device/method/software of wireless sensing for in-vehicle child presence detection of clause 17: wherein the same range of real numbers is from 0 to 1.

In some embodiments, there may be multiple (N1) TSCI due to multiple TX antennas or multiple RX antennas. A number (N1) of 2D matrices may be constructed as part of input to CNN. Each 2D matrix of size N4×N5 may be associated with a respective TSCI. Each element may be magnitude of one of N4 CIC of one of N5 CI of respective TSCI in the time period.

Clause 19. The system/device/method/software of wireless sensing for in-vehicle child presence detection of clause 1, comprising: obtaining N1=N7*N8 TSCI based on the received wireless signal, wherein the Type1 device has N7 TX antennas and the Type2 device has N8 RX antennas, wherein each of the N1 TSCI is associated with a respective one of the N7 TX antennas and a respective one of the N8 RX antennas, wherein each CI of any TSCI comprises N4 CI components (CIC); constructing N1 2-dimensional (2D) matrices each of size N4×N5 as the first plurality of 2D input matrices to the CNN in the time period, wherein each of the N1 2D matrices is associated with a respective one of the N1 TSCI, wherein each of the N4×N5 elements of each 2D matrix is the magnitude of a respective one of the N4 CIC of a respective one of the N5 CI of a respective TSCI in the time period.

In some embodiments, another number (N6) of 2D matrices may be constructed as another part of input to CNN. Each 2D matrix of size N4×N5 may be associated with a respective TSCI-pair (respective pair of TSCI from the N1 TSCI). Each element may be phase-difference of one of N4 CIC of one of N5 CI of respective TSCI-pair in the time period.

Clause 20. The system/device/method/software of wireless sensing for in-vehicle child presence detection of clause 19, comprising: computing N6 2D matrices each of size N4×N5 as the second plurality of 2D input matrices to the CNN based on phase difference between corresponding pairs of CIC in pairs of TSCI in the time period, wherein each of the N6 2D matrices is associated with a respective one of N6 pairs of TSCI from among the N1 TSCI, wherein each of the N4×N5 elements of each 2D matrix is the phase difference of a pair of CIC from two different TSCI, which is the difference of phase of respective one of the N4 CIC of a respective one of the N5 CI of a respective pair of TSCI in the time period.

In some embodiments, the N6 pairs of TSCI may be selected from the N1 TSCI.

Clause 21. The system/device/method/software of wireless sensing for in-vehicle child presence detection of clause 20, comprising: selecting the N6 pairs of TSCI from the N1 TSCI.

In some embodiments, N6>=N1/2. All TSCI may be used/involved at least once in the N6 pairs.

Clause 22. The system/device/method/software of wireless sensing for in-vehicle child presence detection of clause 21, comprising: wherein N6 is greater than or equal to N1/2 such that all TSCI are used at least once among the N6 pairs.

In some embodiments, each pair may have two TSCI associated with same TX antenna of the Type1 device.

Clause 23. The system/device/method/software of wireless sensing for in-vehicle child presence detection of clause 22, comprising: wherein each of the N6 pairs comprises two TSCI associated with a same TX antenna of the Type1 device.

In some embodiments, each pair may have two TSCI associated with same RX antenna of the Type2 device.

Clause 24. The system/device/method/software of wireless sensing for in-vehicle child presence detection of clause 22, comprising: wherein each of the N6 pairs comprises two TSCI associated with a same RX antenna of the Type2 device.

In some embodiments, for initialization: The (N1+N6) 2D N4×N5 matrices may be fed as input to layer 1 of CNN. Recursion/iteration: Each layer of CNN may be associated with multiple respective 2D convolution filters. There may be a plurality of respective input 2D matrices. Iteratively/recursively, each associated filter is applied separately/independently/simultaneous/sequentially/contemporaneously to each/all of the plurality of input 2D matrices to generate corresponding output 2D matrices. Each/all output 2D matrix may be down-sampled at some respective down-sampling factor (e.g. 2:1, 3:1 or 4:1 down-sampling) using some down-sampling techniques (e.g. maxpooling). All the down-sampled output 2D matrices may be fed as a plurality of input 2D matrix (at any order) to next layer of CNN. Different layer may have different amount of 2D convolution filters and/or different down-sampling factor/methods. The amount of associated 2D convolution filter may be related to the down-sampling factor. For example, for N:1 down-sampling, there may be N*N=N^2 filters. For example, 2*2=4 filters for 2:1 down-sampling, 3*3=9 filters for 3:1 down-sampling, or 4*4=16 filters for 4:1 down-sampling.

Clause 25. The system/device/method/software of wireless sensing for in-vehicle child presence detection of clause 20, comprising: feeding the (N1+N6) 2D matrices each of size N4×N5 as a plurality of input 2D matrices to a first layer of the CNN; for each of N2 convolutional layers of the CNN associated with respective multiple 2D convolution filters: for each of respective multiple 2D convolutional filters: applying the respective associated 2D convolution filter to each of the plurality of input 2D matrices to generate a plurality of per-filter output 2D matrices, and down-sampling each of the plurality of per-filter output 2D matrices, and feeding the multiple plurality of down-sampled per-filter output 2D matrices associated with the multiple 2D convolutional filters as a plurality of input 2D matrices to the next convolutional layer of the CNN; In some embodiments, maxpooling may be used for down-sampling.

Clause 26. The system/device/method/software of wireless sensing for in-vehicle child presence detection of clause 25, further comprising: down-sampling each of the plurality of per-filter output 2D matrices based on maxpooling.

Clause 27. The system/device/method/software of wireless sensing for in-vehicle child presence detection of clause 26, further comprising: down-sampling each of the plurality of per-filter output 2D matrices based on a 2:1 down-sampling factor.

In some embodiments, all down-sampled per-filter output 2D matrices may be concatenated and flattened to form a 1D vector. The 1D vector may be fed as input to first layer of the N3-layer fully-connected network (FCN). The FCN may compute/generate some output probability score, each probability for a respective class of output.

Clause 28. The system/device/method/software of wireless sensing for in-vehicle child presence detection of clause 25, further comprising: flattening and concatenating the multiple plurality of down-sampled per-filter output 2D matrices of the last layer of the CNN to form a 1-dimensional output vector; feeding the 1D output vector as input to the first layer of FCN, wherein the FCN comprises N3 fully-connected layers; generating by the FCN a number of output probability score for each class of output.

In some embodiments, the output classes may comprise a "child present" child, an "adult present" class. Perhaps a "no-one present" class.

Clause 29. The system/device/method/software of wireless sensing for in-vehicle child presence detection of clause 28: wherein there is a child-present output probability score for a "child present" class and an adult-present output probability score for an "adult present" class.

In some embodiments, some conditions for detecting the presence of a child: (a) "child present" has higher probability score than "adult present", and (b) "child present" need to be large enough.

Clause 30. The system/device/method/software of wireless sensing for in-vehicle child presence detection of clause 29: detecting the presence of a child when the child-present output probability score is greater than the adult-present output probability score, and the child-present output probability score is greater than a eighth threshold.

In some embodiments, the output classes may comprise an additional class: "on one present" child.

Clause 31. The system/device/method/software of wireless sensing for in-vehicle child presence detection of clause 28: wherein there is a no-one-present output probability score for a "no one present" class.

In some embodiments, some conditions for detecting the presence of a child: (a) "child present" has higher probability score than "adult present" and "no one present", and (b) "child present" need to be large enough.

Clause 32. The system/device/method/software of wireless sensing for in-vehicle child presence detection of clause 31: detecting the presence of a child when the child-present output probability score is greater than both the adult-present output probability score and the no-one-present output probability score, and the child-present output probability score is greater than a ninth threshold.

In some embodiments, both the CNN and FCN are trained in a training phase using training TSCI obtained in certain training venue (one or more vehicles) with certain training antenna configuration and certain training antenna placement.

Clause 33. The system/device/method/software of wireless sensing for in-vehicle child presence detection of clause 28: training the CNN and FCN based on a set of training TSCI obtained in at least one vehicle with at least one antenna configuration and at least one antenna placement within the at least one vehicle in a training phase.

In some embodiments, perhaps the training TSCI is not general/rich enough. The set of training TSCI may be enriched/expanded/improved by generating additional/new training data using mixup data segmentation.

Clause 34. The system/device/method/software of wireless sensing for in-vehicle child presence detection of clause 33: enriching the set of training TSCI based on mixup data segmentation.

In some embodiments, after the initial training, the classifier (classification module) needs to classify in a new vehicle or need to classify in an original vehicle but with new antenna placement, which were not included in/covered by the training situations. The classifier may be retrained/modified/enhanced using few shot learning, which may use a small amount of additional training data of the new situation/venue (i.e. the new vehicle, or the new antenna placement in an original vehicle). As the additional training data is limited, they may not be sufficient to training the whole classification module (i.e. both CNN and FCN). In one example, only the FCN is re-trained while keeping the CNN unchanged. In another example, only the CNN is re-trained while keep the FCN unchanged. In a third example, only some layers of the FCN (and/or some layers of the CNN) are re-trained.

Clause 35. The system/device/method/software of wireless sensing for in-vehicle child presence detection of clause 33: adapting the classification module to a new antenna placement in the vehicle or a new vehicle using few shot learning by retraining the FCN based on a number of TSCI captured with the new antenna placement in the vehicle or in the new venue while keeping the CNN unchanged.

In some embodiments, motion/breathing/presence detection may be based on multiple TSCI, each corresponding for a respective TX antenna of Type1 device and a respective RX antenna of Type2 device. The N1 2D transform matrices here is different from the N1 2D matrices in clause 13. Here the 2D transform matrix contains 1D transform values while in clause 13, each 2D matrix contains CIC magnitude (with NO 1D transforms). Here the vertical dimension of the 2D transform matrix is transform domain index, while in clause 13, the vertical dimension is CI component index (or CIC index, NOT transform domain index). Motion is detected as long as motion is detected in any one of the N1 TSCI. Breathing is detected as long as breathing is detected in any one of the N1 TSCI. Rejection of breathing detection is performed one TSCI as a time. If breathing is detected in one particular TSCI, the breathing detection (based on the particular TSCI) may be rejected if the corresponding final CS (FCS) computed from/based on the particular TSCI is less than some threshold. Presence is detected if motion is detected in at least one TSCI. Presence is also detected if breathing is detected and not rejected in one (or more) TSCI.

Clause 36. The system/device/method/software of wireless sensing for in-vehicle child presence detection of clause 1: obtaining N1=N7*N8 TSCI based on the received wireless signal, wherein the Type1 device has N7 TX antennas and the Type2 device has N8 RX antennas, wherein each of the N1 TSCI is associated with a respective one of the N7 TX antennas and a respective one of the N8 RX antennas; computing N1 motion statistics based on N1 TSCI, each motion statistics computed based on N5 CI of respective one of the N1 TSCI in the time period; detecting the motion of the user in the time period based on any one of the N1 TSCI when the corresponding one of the N1 motion statistics exceeds the first threshold; for each of N9 sliding time windows in the time period, computing a respective 1D transform of CI of each of the N1 TSCI in the sliding time window associated with a respective time stamp; constructing N1 2D transform matrices associated with the N1 TSCI, each 2D transform matrix associated with respective TSCI being constructed by assembling and concatenating the respective N9 1D transform of the respective TSCI as columns of the 2D transform matrix in increasing order of the time stamp; detecting a respective number of horizontal streaks for each of the N1 2D transform matrices; detecting a breathing motion of the user in the time period based on any one of the N1 TSCI and the detected horizontal streaks of the corresponding one of the N1 2D transform matrices and an associated criterion; computing N1 oscillation CS, N1 DTW CS, and N1 peak CS based on the N1 TSCI, each CS computed based on respective TSCI; computing N1 combined CS, each based on respective oscillation CI, respective DTW CS and respective peak CS; computing N1 final CS based on the N1 combined CS and a number of temporally adjacent combined CS; for each of the N1 TSCI, rejecting any detection of the breathing motion of the user in the time period based on the TSCI and the horizontal streaks of the corresponding 2D transform matrix when the associated FCS is less than a tenth threshold; detecting the presence of the user in the time period when either (a) the motion of the user is detected based on at least one of the N1 TSCI, or (b) the breathing motion of the user is detected and not rejected based on at least one of the N1 TSCI; when the presence of the user is detected in the time period, detecting seat occupancy based on the N1 FCS in the time period.

In some embodiments, seat occupancy detection may be performed when user motion/breathing/presence is detected. Background setup/information of venue, seats, first row, second row, N7=2, N8=2, antenna placement (towards four corners of rectangular space) 37. The system/device/method/software of in-vehicle child presence detection based on wireless sensing of clause 36: wherein the vehicle comprises a rectangular-shaped space encompassing two rows of seats; wherein a first row or front row of the two rows comprises two seats, namely, a front-left seat and a front-right seat; wherein a second row or back row comprises at least two seats, namely, a back-left seat and a back-right seat; wherein the Type1 device comprises N7=2 TX antennas and the Type2 device comprises N8=2 RX antennas such that N1=N7*N8=4; wherein among the four antennas, one is located towards a front-left corner of the space, a second one towards a front-right corner of the space, a third one towards a back-left corner of the space and a fourth one towards a back-right corner of the space; wherein the front-left antenna and the front-right antenna belong to one of the Type1 device or the Type2 device, while the back-left antenna and the back-right antenna belong to the other one of the Type1 device or the Type2 device; wherein there are four wireless links: a left link between the front-left antenna and the back-left antenna, a right link between the front-right antenna and the back-right antenna, a diagonal link between the front-left antenna and the back-right antenna, and an anti-diagonal link between the front-right antenna and the back-left antenna.

Clause 38. The system/device/method/software of in-vehicle child presence detection based on wireless sensing of clause 37: when all of the N1 FCS are greater than a eleventh threshold, a center seat is determined to be occupied by the detected user; when at least one FCS is not greater than the eleventh threshold: identify two largest FCS among the N1 FCS, when the two largest FCS occur in the left link and the diagonal link, the occupied seat is determined to be the left-front seat, when the two largest FCS occur in the left link and the anti-diagonal link, the occupied seat is determined to be the left-back seat, when the two largest FCS occur in the right link and the anti-diagonal link, the occupied seat is determined to be the right-front seat, when the two largest FCS occur in the right link and the diagonal link, the occupied seat is determined to be the right-back seat, when the two largest FCS occur in the diagonal link and the anti-diagonal link, the occupied seat is determined to be the center seat, when the two largest FCS occur in the left link and the right link, it is determined that no user is present in the vehicle.

Clause 39. The system/device/method/software of wireless sensing for in-vehicle child presence detection of clause 1: where each CI comprises one of: channel state information (CSI), channel impulse response (CIR), or channel frequency response (CFR).

An indoor intrusion detection (IDS) system can play a critical role in security for both residential and commercial spaces. Existing IDS solutions either require dedicated and often expensive equipment deployment from professionals or suffer from annoyingly high false alarm rate (FAR) due to non-human motion (e.g. pet). In some embodiments, a robust through-the-wall indoor IDS system, called GuardFi, is disclosed to mitigate the interference from non-human subjects using ubiquitous wireless (e.g. WiFi) signals. In some embodiments, GuardFi has four key components: a robust signal preprocessing methods to extract environment-independent statistics, a ResNet model to extract features of indoor moving subjects, a Long Short-Term Memory (LSTM) based state machine to incorporate temporal data for accurate intrusion detection, and a few-shot learning model to boost system performance on unseen motion sources. GuardFi is independent of the device location, subject's orientation and the environmental changes, enabling swift, efficient, and stable deployment in real-world environments. Experiment results suggest that GuardFi can achieve a high intrusion detection accuracy with a low false alarm rate in unseen environments with model re-tuning, underscoring its robustness and potential for ubiquitous indoor security applications.

In GuardFi, intrusion detection is performed by first performing motion detection. Then, when object motion is detected, it performs human/non-human classification. When human is detected, intrusion/intruder is detected.

In some embodiments, 1D transform of CI is computed. In GuardFi, a wireless signal (e.g. WiFi signal) is transmitted from a Type1 heterogeneous wireless device (TX) to a Type2 heterogeneous wireless device (RX) through a wireless channel of a venue. A time series of channel information (e.g. CSI, CIR, CFR, RSSI) may be obtained/extracted from the received wireless signal by the Type2 device. A 1-dimensional (1D) transform (e.g. autocorrelation function (ACF), short time Fourier transform (STFT) or some frequency transform) of CI of the TSCI may be computed in a sliding time window. There may be many sliding time windows in a time period or one of multiple time fragments of the time period (e.g. 1/10/100/1000/10000 seconds), and many time periods along the time axis.

In some embodiments, the 1D transform is computed based on per-component 1D transform (e.g. a K-point transform). Each CI may have multiple components (e.g. multiple subcarriers in CFR, multiple taps in CIR). A per-component 1D transform (e.g. ACF, STFT) may be computed for each component of CI of TSCI in each sliding time window. The 1D transform may be computed as an aggregate of the per-component 1D transforms. The aggregate may comprise any of: sum, product, mean, weighted sum, weighted product, weighted average, arithmetic mean, geometric mean, harmonic mean, percentile, median (50-percentile), minimum (0-percentile), maximum (100-percentile), trimmed mean (mean of percentile from A1-percentile to A2-percentile), mode, etc.

In some embodiments, object motion is detected in a sliding time window. Motion detection may be performed for each sliding time window by computing a motion statistics (MS) based on CI of TSCI in the sliding time window and comparing the MS with a threshold. Object motion may be detected if MS is greater than the threshold and no object motion may be detected otherwise. The MS may be the 1D transform (e.g. ACF) evaluated at one sampling period, or tau=1/Fs. It may be close to zero in a stationary environment and positive in a dynamic environment with object motion.

In some embodiments, object motion is detected in a time period. Sometimes, object motion may be detected sporadically due to noise. To avoid false alarm, only when object motion is detected in sufficient number of sliding time windows in the time period (i.e. when a percentage of sliding time windows with object motion detected is greater than a threshold such as 30%/50%/70%/90%), object motion is detected or confirmed to be detected in the time period. There may be additional (temporally adjacent/neighboring) time periods in which object motion is detected.

In some embodiments, an alternative way is used to detect object motion in a time period. An extended time period may be found in which object motion may be detected. The extended time period may be partitioned into the time period and addition time periods.

In some embodiments, a 2D transform matrix is generated as input preparation. When object motion is detected in the time period, the 1D transform may be prepared to be input to an intrusion detection network, which comprises a motion recognition module followed by an intrusion detection module. All the 1D transform of CI in sliding time windows in the time period may be represented as vectors and assembled/concatenated to form a 2-dimensional (2D) matrix (called "transform matrix" or "spectral matrix"), each 1D transform (vector) being a column of the 2D matrix. The horizontal axis of the 2D transform matrix may be time axis and the vertical axis may be transform axis (e.g. frequency axis for 1D transform being STFT, or time-lag axis for 1D transform being ACF). Alternatively, a derivative (or differential) of the 1D transform (called "1D D-transform", or "1D A-transform") may be computed. All the 1D D-transform in the time period may be assembled/concatenated to form a 2-dimensional (2D) D-transform matrix (or 2D D-spectral matrix/image, or simply spectrum), each 1D D-transform being a column of the 2D D-transform matrix. The horizontal axis of the 2D D-transform matrix may be time axis and the vertical axis may be transform axis.

In some embodiments, a CNN is used as a motion recognition module (MRM). The 2D transform matrix and additional 2D transform matrices (or, alternatively, 2D D-transform matrix and respective 2D D-transform matrices) may be fed as input to a motion recognition module (MRM) to compute/derive/extract features from the 2D transform. The MRM may comprise any of: feed-forward neural network (FNN), convolutional neural network (CNN), recurrent neural network (RNN), transformers, or encoder/decoder. In particular, the MRM may be a CNN with multiple layers, each layer associated with multiple convolution filters. For example, it may be a ResNet18 is a CNN with 18 layers. The multiple convolution filters may be applied concurrently/sequentially/contemporaneously/independently (e.g. in any order) to each of the plurality of transform/d-transform matrices. The output of the MRM may be flattened/concatenated/re-arranged to form an output vector.

In some embodiments, a RNN is used as an intrusion detection module (IDM). The output vector of the MRM may be fed as input to an intrusion detection module (IDM) to compute intrusion detection result(s). The IDM may comprise any of: feed-forward neural network (FNN), convolutional neural network (CNN), recurrent neural network (RNN), transformer, or encoder/decoder. In particular, the IDM may be an RNN that processes sequential data (e.g. time series of 2D transform/d-transform matrix). For example, it may be a Long Short-Term Memory (LSTM) which is a type of RNN. In some embodiments, both the MRM and IDM may be trained in a training phase. The few shot learning may be applied to retrain the MRM and IDM.

Figure 15A:
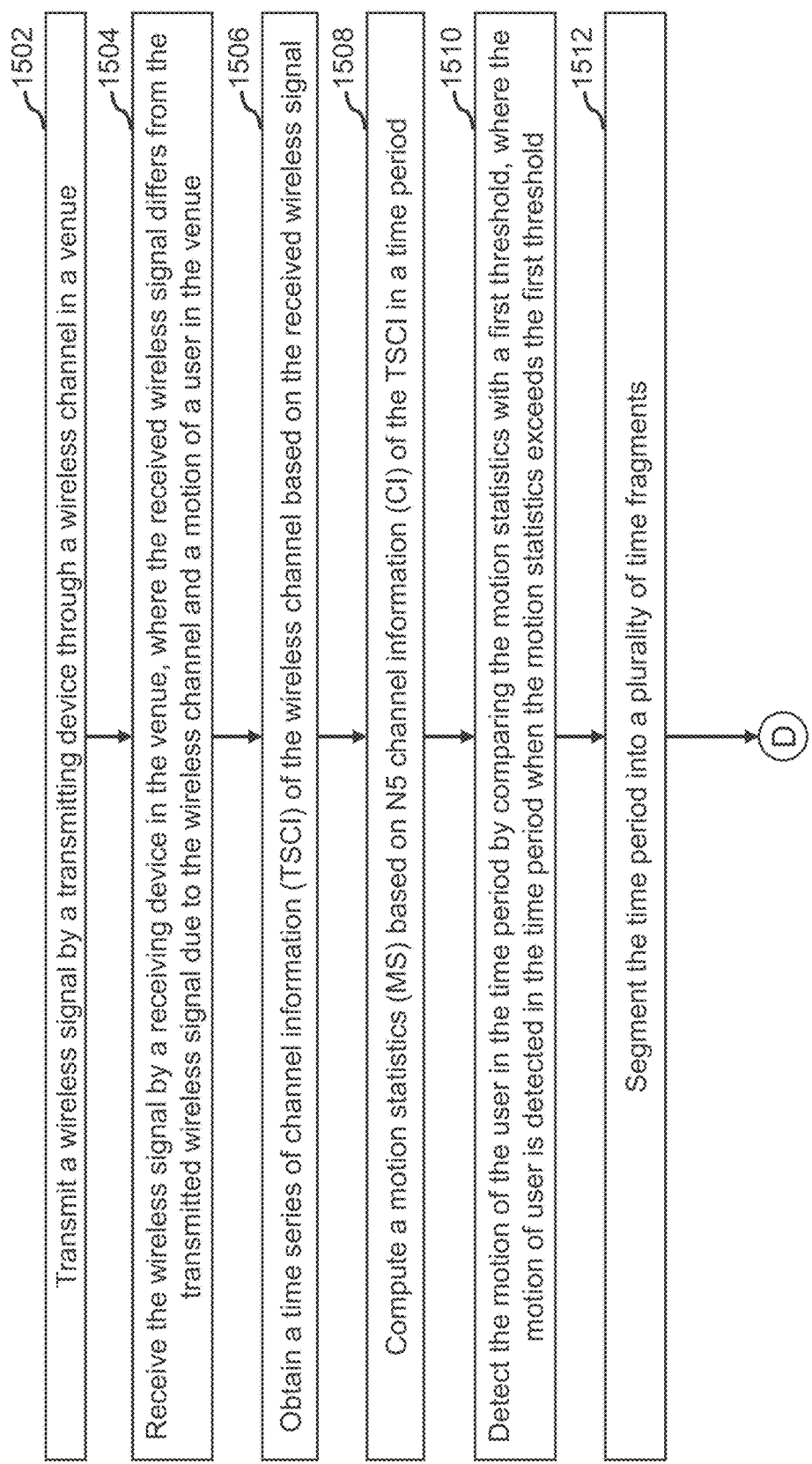
FIG. 15A and FIG. 15B illustrate a flow chart of an example method for wireless sensing for intruder detection with human-nonhuman detection, according to some embodiments of the present disclosure.
Figure 15B:
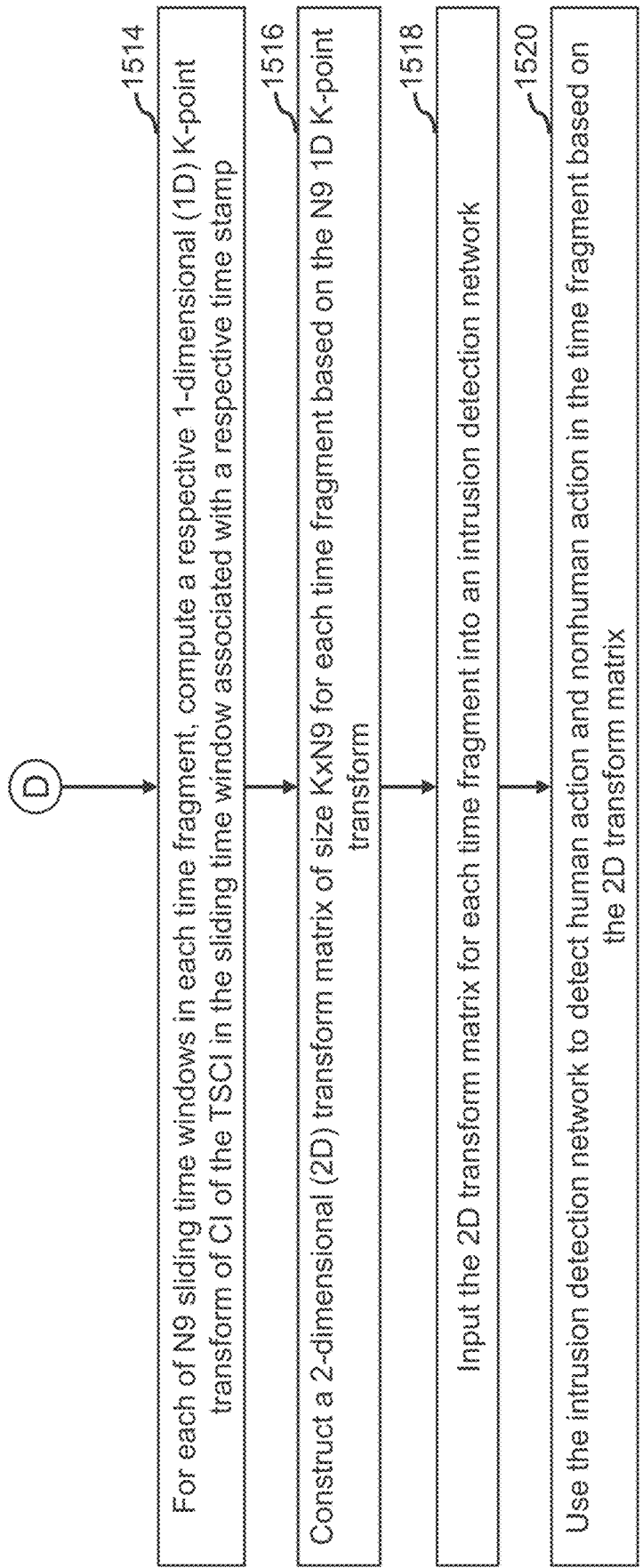

FIG. 15A and FIG. 15B illustrate a flow chart of an example method 1500 for wireless sensing for intruder detection with human-nonhuman detection, according to some embodiments of the present disclosure. In various embodiments, the method 1500 can be performed by the systems disclosed above. As shown in FIG. 15A, at operation 1502, a wireless signal is transmitted by a transmitting device through a wireless channel in a venue. At operation 1504, the wireless signal is received by a receiving device in the venue, where the received wireless signal differs from the transmitted wireless signal due to the wireless channel and a motion of a user in the venue. At operation 1506, a time series of channel information (TSCI) of the wireless channel is obtained based on the received wireless signal. At operation 1508, a motion statistics (MS) is computed based on N5 channel information (CI) of the TSCI in a time period. At operation 1510, the motion of the user is detected in the time period by comparing the motion statistics with a first threshold, where the motion of user is detected in the time period when the motion statistics exceeds the first threshold. At operation 1512, the time period is segmented into a plurality of time fragments.

As shown in FIG. 15B, at operation 1514, for each of N9 sliding time windows in each time fragment, a respective 1-dimensional (1D) K-point transform of CI of the TSCI is computed in the sliding time window associated with a respective time stamp. At operation 1516, a 2-dimensional (2D) transform matrix of size K×N9 is constructed for each time fragment based on the N9 1D K-point transform. At operation 1518, the 2D transform matrix for each time fragment is input into an intrusion detection network. At operation 1520, the intrusion detection network is used to detect human action and nonhuman action in the time fragment based on the 2D transform matrix.

In some embodiments, the intrusion detection network comprises a neural network. In some embodiments, the neural network comprises a convolution neural network (CNN) followed by a recurrent neural network (RNN). In some embodiments, the CNN is a resNet18 which is a CNN with 18 layers. In some embodiments, the RNN is a long short-term memory (LSTM).

Figure 16:
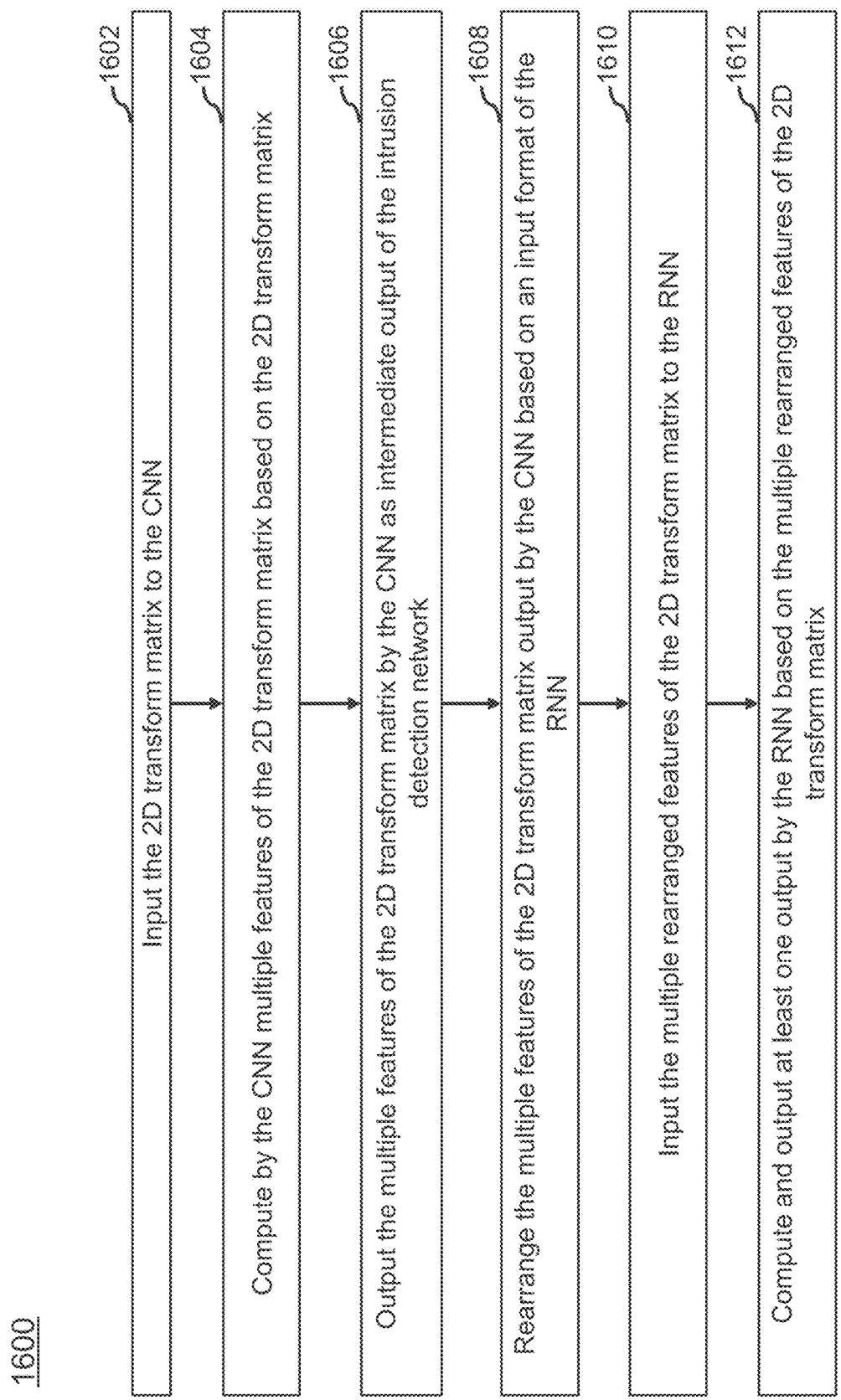
FIG. 16 illustrates a flow chart of an example method for running a neural network, according to some embodiments of the present disclosure.

FIG. 16 illustrates a flow chart of an example method 1600 for running a neural network, according to some embodiments of the present disclosure. In various embodiments, the method 1600 can be performed by the systems disclosed above. At operation 1602, the 2D transform matrix is input to the CNN. At operation 1604, multiple features of the 2D transform matrix is computed by the CNN based on the 2D transform matrix. At operation 1606, the multiple features of the 2D transform matrix is output by the CNN as intermediate output of the intrusion detection network. At operation 1608, the multiple features of the 2D transform matrix output by the CNN is rearranged based on an input format of the RNN. At operation 1610, the multiple rearranged features of the 2D transform matrix is input to the RNN. At operation 1612, at least one output is computed and output by the RNN based on the multiple rearranged features of the 2D transform matrix. In some embodiments, the method 1600 may be performed as part of the operation 1518 in the method 1500.

Figure 17:
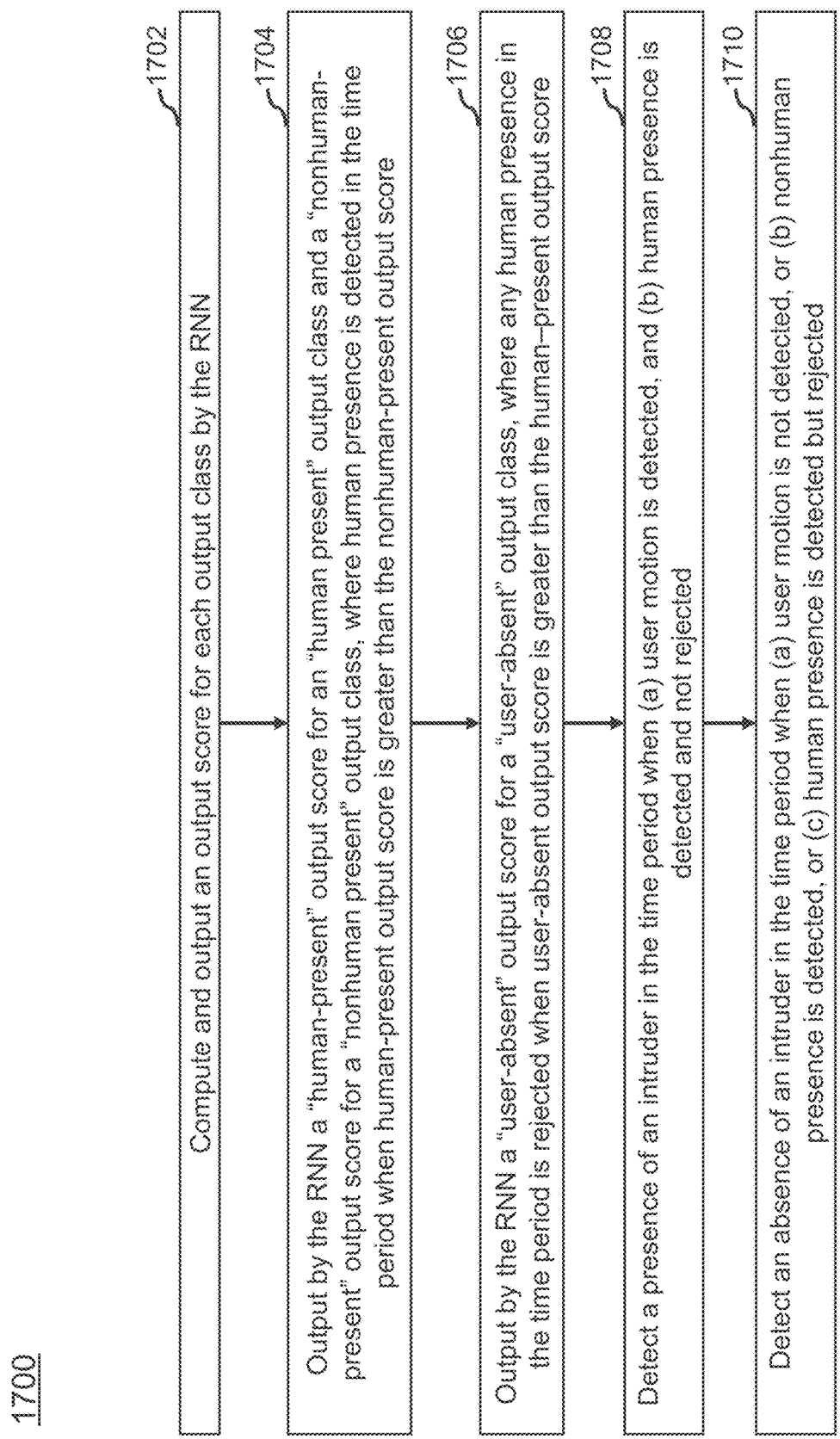
FIG. 17 illustrates a flow chart of an example method for detecting human action and nonhuman action, according to some embodiments of the present disclosure.

FIG. 17 illustrates a flow chart of an example method 1700 for detecting human action and nonhuman action, according to some embodiments of the present disclosure. In various embodiments, the method 1700 can be performed by the systems disclosed above. At operation 1702, an output score is computed and output for each output class by the RNN. At operation 1704, a "human-present" output score is output by the RNN for an "human present" output class and a "nonhuman-present" output score is output by the RNN for a "nonhuman present" output class, where human presence is detected in the time period when human-present output score is greater than the nonhuman-present output score. At operation 1706, a "user-absent" output score is output by the RNN for a "user-absent" output class, where any human presence in the time period is rejected when user-absent output score is greater than the human-present output score. At operation 1708, a presence of an intruder is detected in the time period when (a) user motion is detected, and (b) human presence is detected and not rejected. At operation 1710, an absence of an intruder is detected in the time period when (a) user motion is not detected, (b) nonhuman presence is detected, or (c) human presence is detected but rejected. In some embodiments, the method 1700 may be performed as part of the operation 1520 in the method 1500.

The following numbered clauses provide examples for wireless sensing for intruder detection with human-nonhuman detection.

Clause A1. A method/device/system/software of wireless sensing for intruder detection with human-nonhuman detection, comprising: transmitting a wireless signal by a Type1 heterogeneous wireless device through a wireless channel in a venue; receiving the wireless signal by a Type2 heterogeneous wireless device in the venue, wherein the received wireless signal differs from the transmitted wireless signal due to the wireless channel and a motion of an object in the venue; obtaining a time series of channel information (TSCI) of the wireless channel by the Type2 device based on the received wireless signal; computing a motion statistics (MS) based on N5 CI of the TSCI in a time period; detecting the motion of the object in the time period by comparing the motion statistics with a first threshold, wherein the motion of object is detected in the time period when the motion statistics exceeds the first threshold; segmenting the time period into a plurality of time fragments; for each of N9 sliding time windows in each time fragment, computing a respective 1-dimensional (1D) K-point transform of channel information (CI) of the TSCI in the sliding time window associated with a respective time stamp; constructing a 2-dimensional (2D) transform matrix of size K×N9 for each time fragment based on the N9 1D K-point transform; inputting the 2D transform matrix for each time fragment into an intrusion detection network; using the intrusion detection network to detect human action and nonhuman action in the time fragment based on the 2D transform matrix.

Clause A2. The method/device/system/software of wireless sensing for intruder detection with human-nonhuman detection of clause A1: constructing the 2-dimensional (2D) transform matrix of size K×N9 for each time fragment by assembling and concatenating the N9 1D transform as columns of the 2D transform matrix in increasing order of the time stamp.

Clause A3. The method/device/system/software of wireless sensing for intruder detection with human-nonhuman detection of clause A1: computing N9 1D a-transform based on the N9 1D transform, each 1D a-transform being a differential of a respective 1D transform in transform domain; constructing the 2-dimensional (2D) transform matrix of size K×N9 for each time fragment by assembling and concatenating the N9 1D a-transform as columns of the 2D transform matrix in increasing order of the time stamp.

Clause A4. The method/device/system/software of wireless sensing for intruder detection with human-nonhuman detection of clause A1: wherein the intrusion detection network comprises a neural network.

Clause A5. The method/device/system/software of wireless sensing for intruder detection with human-nonhuman detection of clause A4: wherein the neural network comprises a convolution neural network (CNN) followed by a recurrent neural network (RNN).

Clause A6. The method/device/system/software of wireless sensing for intruder detection with human-nonhuman detection of clause A5: wherein the CNN is a resNet18 which is a CNN with 18 layers; wherein the RNN is a long short-term memory (LSTM).

Clause A7. The method/device/system/software of wireless sensing for intruder detection with human-nonhuman detection of clause A5, further comprising: inputting the 2D transform matrix to the CNN; computing by the CNN multiple features of the 2D transform matrix based on the 2D transform matrix; outputting the multiple features of the 2D transform matrix by the CNN as intermediate output of the intrusion detection network.

Clause A8. The method/device/system/software of wireless sensing for intruder detection with human-nonhuman detection of clause A7, further comprising: rearranging the multiple features of the 2D transform matrix outputted by the CNN based on an input format of the RNN; inputting the multiple rearranged features of the 2D transform matrix to the RNN; and computing and outputting at least one output by the RNN based on the multiple rearranged features of the 2D transform matrix.

Clause A9. The method/device/system/software of wireless sensing for intruder detection with human-nonhuman detection of clause A8, further comprising: computing and outputting an output score for each output class by the RNN.

Clause A10. The method/device/system/software of wireless sensing for intruder detection with human-nonhuman detection of clause A9, further comprising: outputting by the RNN a "human-present" output score for an "human present" output class and a "nonhuman-present" output score for a "nonhuman present" output class, wherein human presence is detected in the time period when human-present output score is greater than the nonhuman-present output score.

Clause A11. The method/device/system/software of wireless sensing for intruder detection with human-nonhuman detection of clause A10, further comprising: detecting a presence of an intruder in the time period when (a) object motion is detected, and (b) human presence is detected (and not rejected).

Clause A12. The method/device/system/software of wireless sensing for intruder detection with human-nonhuman detection of clause A10, further comprising: detecting an absence of an intruder in the time period when (a) object motion is not detected, or (b) nonhuman presence is detected (or (c) human presence is detected but rejected).

Clause A13. The method/device/system/software of wireless sensing for intruder detection with human-nonhuman detection of clause A10, further comprising: outputting by the RNN a "object-absent" output score for a "object-absent" output class, wherein any human presence in the time period is rejected when object-absent output score is greater than the human-present output score.

Clause A14. The method/device/system/software of wireless sensing for intruder detection with human-nonhuman detection of clause A1: wherein the plurality of time fragments are non-overlapping such that there is no overlapping between any two time fragments.

Clause A15. The method/device/system/software of wireless sensing for intruder detection with human-nonhuman detection of clause A1, further comprise: obtaining N1 TSCI of the wireless channel by the Type2 device based on the received wireless signal, each TSCI associated with a respective antenna of the Type1 device and a respective antenna of the Type2 device; computing N1 motion statistics (MS) based on CI of the N1 TSCI in the time period, each MS computed based on N5 CI of respective TSCI in the time period; computing an aggregate MS as an aggregate of the N1 motion statistics, wherein any aggregate comprise at least one of: sum, weighted sum, product, weighted product, mean, weighted mean, arithmetic mean, geometric mean, harmonic mean, percentile, minimum (0-percentile), maximum (100-percentile), median (50-percentile), A1-percentile, trimmed mean (mean of percentile from A1-percentile to A2-percentile), mode, or another aggregate of at least two of the above; detecting the motion of the object in the time period by comparing the N1 motion statistics with a second threshold, wherein the motion of object is detected in the time period when the aggregate MS exceeds the first threshold; for each of the N1 TSCI and for each of N9 sliding time windows in each time fragment of the time period, computing a respective ID K-point transform of channel information (CI) of the respective TSCI in the respective sliding time window associated with a respective time stamp; constructing N1 2D transform matrices each of size K×N9 for each time fragment, each 2D transform matrix constructed based on respective N9 ID K-point transform of respective TSCI; inputting the N1 2D transform matrices for each time fragment into the intrusion detection network; using the intrusion detection network to detect human action and nonhuman action in the time period based on all the 2D transform matrices.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A method for in-vehicle child presence detection, comprising:
    transmitting a wireless signal by a transmitting device through a wireless channel in a vehicle;
    receiving the wireless signal by a receiving device in the vehicle, wherein the received wireless signal differs from the transmitted wireless signal due to the wireless channel and a motion of a user in the vehicle;
    obtaining a time series of channel information (TSCI) of the wireless channel based on the received wireless signal;
    computing a motion statistics (MS) based on N5 channel information (CI) of the TSCI in a time period;
    detecting the motion of the user in the time period by comparing the motion statistics with a first threshold, wherein the motion of the user is detected when the motion statistics exceed the first threshold;
    for each of N9 sliding time windows in the time period, computing a respective 1-dimensional (1D) transform of CI of the TSCI in the sliding time window associated with a respective time stamp;
    constructing a 2-dimensional (2D) transform matrix by assembling and concatenating the N9 1D transforms as columns of the 2D transform matrix in an increasing order of the associated time stamps;
    detecting a number of horizontal streaks of the 2D transform matrix;
    detecting a breathing motion of the user in the time period based on the number of detected horizontal streaks of the 2D transform matrix and an associated criterion;
    computing an oscillation confidence score (CS) by:
        computing an oscillation rate (OR) in a transform domain by counting zero-crossings of the 2D transform matrix, and
        using a first mapping function to map the OR to the oscillation CS;
    computing a dynamic time warping (DTW) CS by:
        computing a DTW cost by applying DTW to the 2D transform matrix, and
        using a second mapping function to map the DTW cost to the DTW CS;
    computing a peak CS by:
        computing a streak count of the number of detected horizontal streaks of the 2D transform matrix, and
        using a third mapping function to map the streak count to the peak CS;
    computing a combined CS (CCS) as a first aggregate of the oscillation CS, the DTW CS and the peak CS;
    computing a final confidence score (FCS) as a moving second aggregate of the CCS and a number of temporally adjacent CCS associated with adjacent time periods of the time period;
    rejecting any detection of the breathing motion in the time period when the FCS is less than a second threshold;
    detecting a presence of the user in the time period when: (a) the motion of the user is detected or (b) the breathing motion of the user is detected and not rejected; and
    when the presence of the user is detected, determining whether the user is a child or an adult based on the TSCI and a classifier, wherein the classifier comprises: a convolutional neural network (CNN) followed by a fully-connected network (FCN) with input data including (1) a first plurality of 2D input matrices constructed from magnitudes of the TSCI alone without phases and (2) a second plurality of 2D input matrices constructed from phases of the TSCI alone without magnitudes.

2. The method of claim 1, wherein:
the 1D transform comprises one of: autocorrelation function (ACF), short-time Fourier transform (STFT), fast Fourier transform (FFT), or frequency transform;
any CI has N4 CI components (CIC);

computing the respective 1D transform comprises:
for each respective CIC of the N4 CIC, computing a respective per-component 1D transform of the respective CIC of CI of the TSCI in the respective sliding time window, and
computing the respective 1D transform as a third aggregate of the N4 per-component 1D transforms; and
each aggregate comprises at least one of: a sum, product, mean, arithmetic mean, geometric mean, harmonic mean, weighted sum, weighted average, percentile, median (50-percentile), minimum (0-percentile), maximum (100-percentile), trimmed mean (mean from A1-percentile to A2-percentile), trimmed arithmetic mean, trimmed geometric mean, trimmed harmonic mean, or mode.

3. The method of claim 1, wherein detecting the number of horizontal streaks of the 2D transform matrix comprises:
finding a respective number of local maxima in each of the columns of the 2D transform matrix; and
conditionally connecting the local maxima horizontally to form horizontal or near-horizontal streaks, wherein a first local maximum of a first column and a second local maximum of a second column adjacent to the first column are connected to form a horizontal or near-horizontal streak when:
an absolute difference between a first transform index of the first local maximum and a second transform index of the second local maximum is less than a third threshold, and
both values of the first local maximum of the 1D transform in the first column and the second local maximum of the 1D transform in the second column are greater than a fourth threshold.

4. The method of claim 1, wherein detecting the breathing motion of the user in the time period comprises:
computing a streak length associated with each horizontal streak of the 2D transform matrix by counting an amount of values in the horizontal streak; and
removing a horizontal streak if its associated streak length is less than a seventh threshold;
for each respective horizontal streak of a number of remaining horizontal streaks of the 2D transform matrix:
computing a representative magnitude, the representative magnitude being a fourth aggregate of magnitudes of transform values along the respective horizontal streak,
identifying a representative transform index associated with the representative magnitude, the representative transform index being a fifth aggregate of transform indices of transform values along the respective horizontal streak;
computing a minimum transform index among the number of representative transform indices;
comparing the minimum representative transform index with an acceptable range, wherein the breathing motion of the user is detected when the minimum representative transform index is within the acceptable range and when the representative magnitude associated with the minimum representative transform index is greater than a fifth threshold;
computing a greatest common factor (GCF) of the number of representative transform indices;
comparing the GCF to the acceptable range, wherein the breathing motion of the user is detected when the GCF is within the acceptable range and when each representative magnitude is greater than a sixth threshold, wherein the sixth threshold is larger than the fifth threshold.

5. The method of claim 1, wherein computing the oscillation rate in the transform domain comprises:
subtracting from each 1D transform, which is a respective column of the 2D transform matrix, a respective mean of the 1D transform to generate a respective mean-subtracted 1D transform, wherein the mean of the 1D transform is a moving weighted average of the 1D transform in the transform domain;
computing N9 per-column zero-crossing counts based on the 2D transform matrix, each per-column zero-crossing count being an amount of zero-crossings of a respective mean-subtracted 1D transform; and
computing the oscillation rate in the transform domain as a sixth aggregate of the N9 per-column zero-crossing counts, wherein the sixth aggregate comprises at least one of: an average, a weighted average, a percentile, a median (50-percentile), a minimum (0-percentile), a maximum (100-percentile), a lower quartile (25-percentile), an upper quartile (75-percentile), a trimmed mean, an A1-to-A2 trimmed mean which is an average of all percentile from A1-percentile to A2-percentile, a 0-to-A2 trimmed mean, a A1-to-100 trimmed mean, a 30-to-70 trimmed mean, a 20-to-45 trimmed mean, a 60-to-90 trimmed mean, a 25-to-50 trimmed mean, a 50-to-75 trimmed mean, a 0-to-25 trimmed mean, a 75-to-100 trimmed mean, an arithmetic mean, a geometric mean, or a harmonic mean.

6. The method of claim 1, wherein computing the DTW cost comprises:
comparing each of the N9 columns of the 2D transform matrix, which are the N9 1D transform, with a reference vector, which is a reference 1D transform obtained by applying 1D transform to training CI of a training TSCI in a training phase;
computing N9 per-column DTW costs associated with the N9 columns of the 2D transform matrix, each per-column DTW cost computed by applying DTW between a respective column of the 2D transform matrix and the reference vector; and
computing the DTW cost as a seventh aggregate of the N9 per-column DTW costs, wherein the seventh aggregate comprises at least one of: an average, a weighted average, a percentile, a median (50-percentile), a minimum (0-percentile), a maximum (100-percentile), a lower quartile (25-percentile), an upper quartile (75-percentile), a trimmed mean, an A1-to-A2 trimmed mean which is an average of all percentile from A1-percentile to A2-percentile, a 0-to-A2 trimmed mean, a A1-to-100 trimmed mean, a 30-to-70 trimmed mean, a 20-to-45 trimmed mean, a 60-to-90 trimmed mean, a 25-to-50 trimmed mean, a 50-to-75 trimmed mean, a 0-to-25 trimmed mean, a 75-to-100 trimmed mean, an arithmetic mean, a geometric mean, or a harmonic mean.

7. The method of claim 1, wherein:
the number of temporally adjacent CCS used to compute the FCS comprises: one, two or three immediate past CCS; and
all of the oscillation CS, the DTW CS, the peak CS, the CCS and the FCS take values from a same range of real numbers from 0 to 1.

8. The method of claim 1, further comprising:
obtaining N1 TSCI based on the received wireless signal, wherein:
the transmitting device has N7 transmit antennas,
the receiving device has N8 receive antennas, $$N1=N7*N8,$$

each of the N1 TSCI is associated with a respective one of the N7 transmit antennas and a respective one of the N8 receive antennas,
each CI of any TSCI comprises N4 CI components (CIC);
constructing N1 2D matrices, each having N4×N5 elements, as the first plurality of 2D input matrices to the CNN in the time period, wherein:
each of the N1 2D matrices is associated with a respective one of the N1 TSCI,
each of the N4×N5 elements of each of the N1 2D matrices is a magnitude of a respective one of the N4 CIC of a respective one of the N5 CI of a respective TSCI in the time period; and
computing N6 2D matrices, each having N4×N5 elements, as the second plurality of 2D input matrices to the CNN based on phase differences between corresponding pairs of CIC in pairs of TSCI in the time period, wherein:
each of the N6 2D matrices is associated with a respective one of N6 pairs of TSCI selected from the N1 TSCI,
each of the N4×N5 elements of each of the N6 2D matrices is the phase difference of a pair of CIC from two different TSCI, which is a difference of phases of a respective one of the N4 CIC of a respective one of the N5 CI of a respective pair of TSCI in the time period.

9. The method of claim 8, further comprising:
selecting the N6 pairs of TSCI from the N1 TSCI, wherein:
N6 is greater than or equal to N1/2 such that all TSCI are used at least once among the N6 pairs, and
each of the N6 pairs comprises two TSCI associated with: a same transmit antenna of the transmitting device, or a same receive antenna of the receiving device.

10. The method of claim 8, further comprising:
feeding the (N1+N6) 2D matrices, each having N4×N5 elements, as a plurality of input 2D matrices to a first layer of the CNN; and
for each of N2 convolutional layers of the CNN associated with multiple respective 2D convolution filters:
for each of the multiple respective 2D convolution filters:
applying the respective 2D convolution filter to each of the plurality of input 2D matrices to generate a set of per-filter output 2D matrices, and
down-sampling each of the set of per-filter output 2D matrices, based on max-pooling and a 2:1 down-sampling factor, and
feeding the multiple sets of down-sampled per-filter output 2D matrices associated with the multiple respective 2D convolutional filters as a plurality of input 2D matrices to a next convolutional layer of the CNN.

11. The method of claim 10, further comprising:
flattening and concatenating the multiple sets of down-sampled per-filter output 2D matrices of a last layer of the CNN to form a 1D output vector;
feeding the 1D output vector as input to a first layer of the FCN, wherein the FCN comprises N3 fully-connected layers; and
generating a number of output probability scores by the FCN, one for each class of output.

12. The method of claim 11, wherein:
the number of output probability scores comprise: a child-present output probability score for a "child present" class, and an adult-present output probability score for an "adult present" class; and
detecting the presence of a child being the user in the vehicle when: the child-present output probability score is greater than the adult-present output probability score and greater than an eighth threshold.

13. The method of claim 11, further comprising:
training the CNN and the FCN based on a set of training TSCI obtained in at least one vehicle with at least one antenna configuration and at least one antenna placement within the at least one vehicle in a training phase;
enriching the set of training TSCI based on mix-up data segmentation; and
adapting the classifier to a new antenna placement in the vehicle or in a new vehicle using few shot learning by retraining the FCN based on a number of TSCI captured with the new antenna placement in the vehicle or in the new venue while keeping the CNN unchanged.

14. The method of claim 1, further comprising:
obtaining N1 TSCI based on the received wireless signal, wherein:
the transmitting device has N7 transmit antennas,
the receiving device has N8 receive antennas, $$N1=N7*N8,$$

each of the N1 TSCI is associated with a respective one of the N7 transmit antennas and a respective one of the N8 receive antennas;
computing N1 MS based on the N1 TSCI, each MS computed based on N5 CI of a respective one of the N1 TSCI in the time period;
detecting the motion of the user in the time period based on any one of the N1 TSCI when the corresponding one of the N1 MS exceeds the first threshold;
for each of the N9 sliding time windows in the time period, computing a respective 1D transform of CI of each of the N1 TSCI in the sliding time window associated with a respective time stamp;
constructing N1 2D transform matrices associated with the N1 TSCI, each 2D transform matrix associated with a respective TSCI being constructed by assembling and concatenating the respective N9 1D transform of the respective TSCI as columns of the 2D transform matrix in an increasing order of the associated time stamps;
detecting a respective number of horizontal streaks for each of the N1 2D transform matrices;
detecting a breathing motion of the user in the time period based on any one of the N1 TSCI and the detected horizontal streaks of the corresponding one of the N1 2D transform matrices and an associated criterion;
computing N1 oscillation CS, N1 DTW CS, and N1 peak CS based on the N1 TSCI, each CS computed based on a respective TSCI;
computing N1 CCS, each based on a respective oscillation CI, a respective DTW CS and a respective peak CS;
computing N1 FCS based on the N1 CCS and a number of temporally adjacent CCS;

for each of the N1 TSCI, rejecting any detection of the breathing motion of the user in the time period based on the TSCI and the horizontal streaks of the corresponding 2D transform matrix when the associated FCS is less than a tenth threshold;

detecting the presence of the user in the time period when: (a) the motion of the user is detected based on at least one of the N1 TSCI, or (b) the breathing motion of the user is detected and not rejected based on at least one of the N1 TSCI; and when the presence of the user is detected in the time period, detecting seat occupancy of the vehicle based on the N1 FCS in the time period.

15. The method of claim 14, wherein:

the vehicle comprises a rectangular-shaped space encompassing two rows of seats;

a first row or front row of the two rows comprises two seats: a front-left seat and a front-right seat;

a second row or back row of the two rows comprises at least two seats: a back-left seat and a back-right seat;

N7=2, such that the transmitting device comprises two transmit antennas;

N8=2, such that the receiving device comprises two receive antennas and N1=N7*N8=4;

the two transmit antennas and the two receive antennas comprise:
  a front-left antenna located towards a front-left corner of the rectangular-shaped space,
  a front-right antenna located towards a front-right corner of the rectangular-shaped space,
  a back-left antenna located towards a back-left corner of the rectangular-shaped space, and
  a back-right antenna located towards a back-right corner of the rectangular-shaped space;

the front-left antenna and the front-right antenna belong to a same one of the transmitting device or the receiving device, the back-left antenna and the back-right antenna belong to the other one of the transmitting device or the receiving device;

the two transmit antennas and the two receive antennas form four wireless links comprising:
  a left link between the front-left antenna and the back-left antenna,
  a right link between the front-right antenna and the back-right antenna,
  a diagonal link between the front-left antenna and the back-right antenna, and
  an anti-diagonal link between the front-right antenna and the back-left antenna;

when all of the N1 FCS are greater than an eleventh threshold, a center seat of the vehicle is determined to be occupied by the detected user; and when at least one FCS is not greater than the eleventh threshold:
  identify two largest FCS among the N1 FCS,
  when the two largest FCS occur in the left link and the diagonal link, the left-front seat is determined to be occupied by the detected user,
  when the two largest FCS occur in the left link and the anti-diagonal link, the left-back seat is determined to be occupied by the detected user,
  when the two largest FCS occur in the right link and the anti-diagonal link, the right-front seat is determined to be occupied by the detected user,
  when the two largest FCS occur in the right link and the diagonal link, the right-back seat is determined to be occupied by the detected user,
  when the two largest FCS occur in the diagonal link and the anti-diagonal link, the center seat is determined to be occupied by the detected user, and
  when the two largest FCS occur in the left link and the right link, it is determined that no user is present in the vehicle.

16. A system for in-vehicle child presence detection, comprising:

a transmitting device configured to transmit a wireless signal through a wireless channel in a vehicle;

a receiving device configured to receive the wireless signal, wherein the received wireless signal differs from the transmitted wireless signal due to the wireless channel and a motion of a user in the vehicle; and a processor configured to:
  obtain a time series of channel information (TSCI) of the wireless channel based on the received wireless signal;
  compute a motion statistics (MS) based on N5 channel information (CI) of the TSCI in a time period;
  detect the motion of the user in the time period by comparing the motion statistics with a first threshold, wherein the motion of the user is detected when the motion statistics exceed the first threshold;
  for each of N9 sliding time windows in the time period, compute a respective 1-dimensional (1D) transform of CI of the TSCI in the sliding time window associated with a respective time stamp;
  construct a 2-dimensional (2D) transform matrix by assembling and concatenating the N9 1D transforms as columns of the 2D transform matrix in an increasing order of the associated time stamps;
  detect a number of horizontal streaks of the 2D transform matrix;
  detect a breathing motion of the user in the time period based on the number of detected horizontal streaks of the 2D transform matrix and an associated criterion;
  compute an oscillation confidence score (CS) by:
    computing an oscillation rate (OR) in a transform domain by counting zero-crossings of the 2D transform matrix, and
    using a first mapping function to map the OR to the oscillation CS;
  computing a dynamic time warping (DTW) CS by:
    computing a DTW cost by applying DTW to the 2D transform matrix, and
    using a second mapping function to map the DTW cost to the DTW CS;
  computing a peak CS by:
    computing a streak count of the number of detected horizontal streaks of the 2D transform matrix, and
    using a third mapping function to map the streak count to the peak CS;
  compute a combined CS (CCS) as a first aggregate of the oscillation CS, the DTW CS and the peak CS;
  compute a final confidence score (FCS) as a moving second aggregate of the CCS and a number of temporally adjacent CCS associated with adjacent time periods of the time period;
  reject any detection of the breathing motion in the time period when the FCS is less than a second threshold;

detect a presence of the user in the time period when: (a) the motion of the user is detected or (b) the breathing motion of the user is detected and not rejected; and when the presence of the user is detected, determine whether the user is a child or an adult based on the TSCI and a classifier, wherein the classifier comprises: a convolutional neural network (CNN) followed by a fully-connected network (FCN) with input data including (1) a first plurality of 2D input matrices constructed from magnitudes of the TSCI alone without phases and (2) a second plurality of 2D input matrices constructed from phases of the TSCI alone without magnitudes.

17. The system of claim 16, wherein the oscillation rate in the transform domain is computed based on:

subtracting from each 1D transform, which is a respective column of the 2D transform matrix, a respective mean of the 1D transform to generate a respective mean-subtracted 1D transform, wherein the mean of the 1D transform is a moving weighted average of the 1D transform in the transform domain;

computing N9 per-column zero-crossing counts based on the 2D transform matrix, each per-column zero-crossing count being an amount of zero-crossings of a respective mean-subtracted 1D transform; and computing the oscillation rate in the transform domain as a sixth aggregate of the N9 per-column zero-crossing counts, wherein any aggregate comprises at least one of: an average, a weighted average, a percentile, a median (50-percentile), a minimum (0-percentile), a maximum (100-percentile), a lower quartile (25-percentile), an upper quartile (75-percentile), a trimmed mean, an A1-to-A2 trimmed mean which is an average of all percentile from A1-percentile to A2-percentile, a 0-to-A2 trimmed mean, a A1-to-100 trimmed mean, a 30-to-70 trimmed mean, a 20-to-45 trimmed mean, a 60-to-90 trimmed mean, a 25-to-50 trimmed mean, a 50-to-75 trimmed mean, a 0-to-25 trimmed mean, a 75-to-100 trimmed mean, an arithmetic mean, a geometric mean, or a harmonic mean.

18. The system of claim 16, wherein the DTW cost is computed based on:

comparing each of the N9 columns of the 2D transform matrix, which are the N9 1D transform, with a reference vector, which is a reference 1D transform obtained by applying 1D transform to training CI of a training TSCI in a training phase;

computing N9 per-column DTW costs associated with the N9 columns of the 2D transform matrix, each per-column DTW cost computed by applying DTW between a respective column of the 2D transform matrix and the reference vector; and computing the DTW cost as a seventh aggregate of the N9 per-column DTW costs, wherein the seventh aggregate comprises at least one of: an average, a weighted average, a percentile, a median (50-percentile), a minimum (0-percentile), a maximum (100-percentile), a lower quartile (25-percentile), an upper quartile (75-percentile), a trimmed mean, an A1-to-A2 trimmed mean which is an average of all percentile from A1-percentile to A2-percentile, a 0-to-A2 trimmed mean, a A1-to-100 trimmed mean, a 30-to-70 trimmed mean, a 20-to-45 trimmed mean, a 60-to-90 trimmed mean, a 25-to-50 trimmed mean, a 50-to-75 trimmed mean, a 0-to-25 trimmed mean, a 75-to-100 trimmed mean, an arithmetic mean, a geometric mean, or a harmonic mean, wherein:

the number of temporally adjacent CCS used to compute the FCS comprises: one, two or three immediate past CCS, and all of the oscillation CS, the DTW CS, the peak CS, the CCS and the FCS take values from a same range of real numbers from 0 to 1.

19. The system of claim 16, wherein the processor is further configured to:

obtain N1 TSCI based on the received wireless signal, wherein:

the transmitting device has N7 transmit antennas, the receiving device has N8 receive antennas, $$N1=N7*N8,$$

each of the N1 TSCI is associated with a respective one of the N7 transmit antennas and a respective one of the N8 receive antennas;

compute N1 MS based on the N1 TSCI, each MS computed based on N5 CI of a respective one of the N1 TSCI in the time period;

detect the motion of the user in the time period based on any one of the N1 TSCI when the corresponding one of the N1 MS exceeds the first threshold;

for each of the N9 sliding time windows in the time period, compute a respective 1D transform of CI of each of the N1 TSCI in the sliding time window associated with a respective time stamp;

construct N1 2D transform matrices associated with the N1 TSCI, each 2D transform matrix associated with a respective TSCI being constructed by assembling and concatenating the respective N9 1D transform of the respective TSCI as columns of the 2D transform matrix in an increasing order of the associated time stamps;

detect a respective number of horizontal streaks for each of the N1 2D transform matrices;

detect a breathing motion of the user in the time period based on any one of the N1 TSCI and the detected horizontal streaks of the corresponding one of the N1 2D transform matrices and an associated criterion;

compute N1 oscillation CS, N1 DTW CS, and N1 peak CS based on the N1 TSCI, each CS computed based on a respective TSCI;

compute N1 CCS, each based on a respective oscillation CI, a respective DTW CS and a respective peak CS;

compute N1 FCS based on the N1 CCS and a number of temporally adjacent CCS;

for each of the N1 TSCI, reject any detection of the breathing motion of the user in the time period based on the TSCI and the horizontal streaks of the corresponding 2D transform matrix when the associated FCS is less than a tenth threshold;

detect the presence of the user in the time period when: (a) the motion of the user is detected based on at least one of the N1 TSCI, or (b) the breathing motion of the user is detected and not rejected based on at least one of the N1 TSCI; and when the presence of the user is detected in the time period, detect seat occupancy of the vehicle based on the N1 FCS in the time period.

20. The system of claim 16, wherein the processor is further configured to:

obtain N1 TSCI based on the received wireless signal, wherein:

the transmitting device has N7 transmit antennas,
the receiving device has N8 receive antennas,

N1=N7*N8, each of the N1 TSCI is associated with a respective one of the N7 transmit antennas and a respective one of the N8 receive antennas,
each CI of any TSCI comprises N4 CI components (CIC);
construct N1 2D matrices, each having N4×N5 elements, as the first plurality of 2D input matrices to the CNN in the time period, wherein:
  each of the N1 2D matrices is associated with a respective one of the N1 TSCI,
  each of the N4×N5 elements of each of the N1 2D matrices is a magnitude of a respective one of the N4 CIC of a respective one of the N5 CI of a respective TSCI in the time period; and
compute N6 2D matrices, each having N4×N5 elements, as the second plurality of 2D input matrices to the CNN based on phase differences between corresponding pairs of CIC in pairs of TSCI in the time period, wherein:
  each of the N6 2D matrices is associated with a respective one of N6 pairs of TSCI selected from the N1 TSCI,
  each of the N4×N5 elements of each of the N6 2D matrices is the phase difference of a pair of CIC from two different TSCI, which is a difference of phases of a respective one of the N4 CIC of a respective one of the N5 CI of a respective pair of TSCI in the time period.

21. The system of claim 20, wherein the processor is further configured to:
feed the (N1+N6) 2D matrices, each having N4×N5 elements, as a plurality of input 2D matrices to a first layer of the CNN;
for each of N2 convolutional layers of the CNN associated with multiple respective 2D convolution filters:
  for each of the multiple respective 2D convolution filters:
    apply the respective 2D convolution filter to each of the plurality of input 2D matrices to generate a set of per-filter output 2D matrices, and
    down-sample each of the set of per-filter output 2D matrices, based on max-pooling and a 2:1 down-sampling factor, and
  feed the multiple sets of down-sampled per-filter output 2D matrices associated with the multiple respective 2D convolutional filters as a plurality of input 2D matrices to a next convolutional layer of the CNN;
flatten and concatenate the multiple sets of down-sampled per-filter output 2D matrices of a last layer of the CNN to form a 1D output vector;
feed the 1D output vector as input to a first layer of the FCN, wherein the FCN comprises N3 fully-connected layers; and
generate a number of output probability scores by the FCN, one for each class of output, wherein:
  the number of output probability scores comprise: a child-present output probability score for a "child present" class, and an adult-present output probability score for an "adult present" class, and
  the presence of a child being the user is detected in the vehicle when: the child-present output probability score is greater than the adult-present output probability score and greater than an eighth threshold.

22. A device for in-vehicle child presence detection, comprising:
a receiver configured to receive a wireless signal transmitted by a transmitter through a wireless channel in a vehicle, wherein the received wireless signal differs from the transmitted wireless signal due to the wireless channel and a motion of a user in the vehicle; and
a processor configured to:
  obtain a time series of channel information (TSCI) of the wireless channel based on the received wireless signal;
  compute a motion statistics (MS) based on N5 channel information (CI) of the TSCI in a time period;
  detect the motion of the user in the time period by comparing the motion statistics with a first threshold, wherein the motion of the user is detected when the motion statistics exceed the first threshold;
  for each of N9 sliding time windows in the time period, compute a respective 1-dimensional (1D) transform of CI of the TSCI in the sliding time window associated with a respective time stamp;
  construct a 2-dimensional (2D) transform matrix by assembling and concatenating the N9 1D transforms as columns of the 2D transform matrix in an increasing order of the associated time stamps;
  detect a number of horizontal streaks of the 2D transform matrix;
  detect a breathing motion of the user in the time period based on the number of detected horizontal streaks of the 2D transform matrix and an associated criterion;
  compute an oscillation confidence score (CS) by:
    computing an oscillation rate (OR) in a transform domain by counting zero-crossings of the 2D transform matrix, and
    using a first mapping function to map the OR to the oscillation CS;
  computing a dynamic time warping (DTW) CS by:
    computing a DTW cost by applying DTW to the 2D transform matrix, and
    using a second mapping function to map the DTW cost to the DTW CS;
  computing a peak CS by:
    computing a streak count of the number of detected horizontal streaks of the 2D transform matrix, and
    using a third mapping function to map the streak count to the peak CS;
  compute a combined CS (CCS) as a first aggregate of the oscillation CS, the DTW CS and the peak CS;
  compute a final confidence score (FCS) as a moving second aggregate of the CCS and a number of temporally adjacent CCS associated with adjacent time periods of the time period;
  reject any detection of the breathing motion in the time period when the FCS is less than a second threshold;
  detect a presence of the user in the time period when: (a) the motion of the user is detected or (b) the breathing motion of the user is detected and not rejected; and
  when the presence of the user is detected, determine whether the user is a child or an adult based on the TSCI and a classifier, wherein the classifier comprises: a convolutional neural network (CNN) followed by a fully-connected network (FCN) with input data including (1) a first plurality of 2D input matrices constructed from magnitudes of the TSCI alone without phases and (2) a second plurality of 2D input matrices constructed from phases of the TSCI alone without magnitudes.

23. The device of claim 22, wherein the oscillation rate in the transform domain is computed based on:
   subtracting from each 1D transform, which is a respective column of the 2D transform matrix, a respective mean of the 1D transform to generate a respective mean-subtracted 1D transform, wherein the mean of the 1D transform is a moving weighted average of the 1D transform in the transform domain;
   computing N9 per-column zero-crossing counts based on the 2D transform matrix, each per-column zero-crossing count being an amount of zero-crossings of a respective mean-subtracted 1D transform; and
   computing the oscillation rate in the transform domain as a sixth aggregate of the N9 per-column zero-crossing counts, wherein any aggregate comprises at least one of: an average, a weighted average, a percentile, a median (50-percentile), a minimum (0-percentile), a maximum (100-percentile), a lower quartile (25-percentile), an upper quartile (75-percentile), a trimmed mean, an A1-to-A2 trimmed mean which is an average of all percentile from A1-percentile to A2-percentile, a 0-to-A2 trimmed mean, a A1-to-100 trimmed mean, a 30-to-70 trimmed mean, a 20-to-45 trimmed mean, a 60-to-90 trimmed mean, a 25-to-50 trimmed mean, a 50-to-75 trimmed mean, a 0-to-25 trimmed mean, a 75-to-100 trimmed mean, an arithmetic mean, a geometric mean, or a harmonic mean.

24. The device of claim 22, wherein the DTW cost is computed based on:
   comparing each of the N9 columns of the 2D transform matrix, which are the N9 1D transform, with a reference vector, which is a reference 1D transform obtained by applying 1D transform to training CI of a training TSCI in a training phase;
   computing N9 per-column DTW costs associated with the N9 columns of the 2D transform matrix, each per-column DTW cost computed by applying DTW between a respective column of the 2D transform matrix and the reference vector; and
   computing the DTW cost as a seventh aggregate of the N9 per-column DTW costs, wherein the seventh aggregate comprises at least one of: an average, a weighted average, a percentile, a median (50-percentile), a minimum (0-percentile), a maximum (100-percentile), a lower quartile (25-percentile), an upper quartile (75-percentile), a trimmed mean, an A1-to-A2 trimmed mean which is an average of all percentile from A1-percentile to A2-percentile, a 0-to-A2 trimmed mean, a A1-to-100 trimmed mean, a 30-to-70 trimmed mean, a 20-to-45 trimmed mean, a 60-to-90 trimmed mean, a 25-to-50 trimmed mean, a 50-to-75 trimmed mean, a 0-to-25 trimmed mean, a 75-to-100 trimmed mean, an arithmetic mean, a geometric mean, or a harmonic mean, wherein:
     the number of temporally adjacent CCS used to compute the FCS comprises: one, two or three immediate past CCS, and
     all of the oscillation CS, the DTW CS, the peak CS, the CCS and the FCS take values from a same range of real numbers from 0 to 1.

25. The device of claim 22, wherein the processor is further configured to:
   obtain N1 TSCI based on the received wireless signal, wherein:
     the transmitter has N7 transmit antennas,
     the receiver has N8 receive antennas, $N1 = N7 * N8$, each of the N1 TSCI is associated with a respective one of the N7 transmit antennas and a respective one of the N8 receive antennas;
   compute N1 MS based on the N1 TSCI, each MS computed based on N5 CI of a respective one of the N1 TSCI in the time period;
   detect the motion of the user in the time period based on any one of the N1 TSCI when the corresponding one of the N1 MS exceeds the first threshold;
   for each of the N9 sliding time windows in the time period, compute a respective 1D transform of CI of each of the N1 TSCI in the sliding time window associated with a respective time stamp;
   construct N1 2D transform matrices associated with the N1 TSCI, each 2D transform matrix associated with a respective TSCI being constructed by assembling and concatenating the respective N9 1D transform of the respective TSCI as columns of the 2D transform matrix in an increasing order of the associated time stamps;
   detect a respective number of horizontal streaks for each of the N1 2D transform matrices;
   detect a breathing motion of the user in the time period based on any one of the N1 TSCI and the detected horizontal streaks of the corresponding one of the N1 2D transform matrices and an associated criterion;
   compute N1 oscillation CS, N1 DTW CS, and N1 peak CS based on the N1 TSCI, each CS computed based on a respective TSCI;
   compute N1 CCS, each based on a respective oscillation CI, a respective DTW CS and a respective peak CS;
   compute N1 FCS based on the N1 CCS and a number of temporally adjacent CCS;
   for each of the N1 TSCI, reject any detection of the breathing motion of the user in the time period based on the TSCI and the horizontal streaks of the corresponding 2D transform matrix when the associated FCS is less than a tenth threshold;
   detect the presence of the user in the time period when: (a) the motion of the user is detected based on at least one of the N1 TSCI, or (b) the breathing motion of the user is detected and not rejected based on at least one of the N1 TSCI; and
   when the presence of the user is detected in the time period, detect seat occupancy of the vehicle based on the N1 FCS in the time period.

26. The device of claim 22, wherein the processor is further configured to:
   obtain N1 TSCI based on the received wireless signal, wherein:
     the transmitter has N7 transmit antennas,
     the receiver has N8 receive antennas, $N1 = N7 * N8$, each of the N1 TSCI is associated with a respective one of the N7 transmit antennas and a respective one of the N8 receive antennas,
     each CI of any TSCI comprises N4 CI components (CIC);
   construct N1 2D matrices, each having N4×N5 elements, as the first plurality of 2D input matrices to the CNN in the time period, wherein:
     each of the N1 2D matrices is associated with a respective one of the N1 TSCI, each of the N4×N5 elements of each of the N1 2D matrices is a magnitude of a respective one of the N4 CIC of a respective one of the N5 CI of a respective TSCI in the time period; and compute N6 2D matrices, each having N4×N5 elements, as the second plurality of 2D input matrices to the CNN based on phase differences between corresponding pairs of CIC in pairs of TSCI in the time period, wherein:

each of the N6 2D matrices is associated with a respective one of N6 pairs of TSCI selected from the N1 TSCI, each of the N4×N5 elements of each of the N6 2D matrices is the phase difference of a pair of CIC from two different TSCI, which is a difference of phases of a respective one of the N4 CIC of a respective one of the N5 CI of a respective pair of TSCI in the time period.

27. The device of claim 26, wherein the processor is further configured to:

feed the (N1+N6) 2D matrices, each having N4×N5 elements, as a plurality of input 2D matrices to a first layer of the CNN;

for each of N2 convolutional layers of the CNN associated with multiple respective 2D convolution filters:
for each of the multiple respective 2D convolution filters:
apply the respective 2D convolution filter to each of the plurality of input 2D matrices to generate a set of per-filter output 2D matrices, and
down-sample each of the set of per-filter output 2D matrices, based on max-pooling and a 2:1 down-sampling factor, and
feed the multiple sets of down-sampled per-filter output 2D matrices associated with the multiple respective 2D convolutional filters as a plurality of input 2D matrices to a next convolutional layer of the CNN;

flatten and concatenate the multiple sets of down-sampled per-filter output 2D matrices of a last layer of the CNN to form a 1D output vector;

feed the 1D output vector as input to a first layer of the FCN, wherein the FCN comprises N3 fully-connected layers; and generate a number of output probability scores by the FCN, one for each class of output, wherein:
the number of output probability scores comprise: a child-present output probability score for a "child present" class, and an adult-present output probability score for an "adult present" class, and
the presence of a child being the user is detected in the vehicle when: the child-present output probability score is greater than the adult-present output probability score and greater than an eighth threshold.

28. A vehicle, comprising:
a transmitting device configured to transmit a wireless signal through a wireless channel in the vehicle;
a receiving device configured to receive the wireless signal, wherein the received wireless signal differs from the transmitted wireless signal due to the wireless channel and a motion of a user in the vehicle; and
a processor configured to:
obtain a time series of channel information (TSCI) of the wireless channel based on the received wireless signal;
compute a motion statistics (MS) based on N5 channel information (CI) of the TSCI in a time period;
detect the motion of the user in the time period by comparing the motion statistics with a first threshold, wherein the motion of the user is detected when the motion statistics exceed the first threshold;
for each of N9 sliding time windows in the time period, compute a respective 1-dimensional (1D) transform of CI of the TSCI in the sliding time window associated with a respective time stamp;
construct a 2-dimensional (2D) transform matrix by assembling and concatenating the N9 1D transforms as columns of the 2D transform matrix in an increasing order of the associated time stamps;
detect a number of horizontal streaks of the 2D transform matrix;
detect a breathing motion of the user in the time period based on the number of detected horizontal streaks of the 2D transform matrix and an associated criterion;
compute an oscillation confidence score (CS) by:
computing an oscillation rate (OR) in a transform domain by counting zero-crossings of the 2D transform matrix, and
using a first mapping function to map the OR to the oscillation CS;
computing a dynamic time warping (DTW) CS by:
computing a DTW cost by applying DTW to the 2D transform matrix, and
using a second mapping function to map the DTW cost to the DTW CS;
computing a peak CS by:
computing a streak count of the number of detected horizontal streaks of the 2D transform matrix, and
using a third mapping function to map the streak count to the peak CS;
compute a combined CS (CCS) as a first aggregate of the oscillation CS, the DTW CS and the peak CS;
compute a final confidence score (FCS) as a moving second aggregate of the CCS and a number of temporally adjacent CCS associated with adjacent time periods of the time period;
reject any detection of the breathing motion in the time period when the FCS is less than a second threshold;
detect a presence of the user in the time period when: (a) the motion of the user is detected or (b) the breathing motion of the user is detected and not rejected; and
when the presence of the user is detected, determine whether the user is a child or an adult based on the TSCI and a classifier, wherein the classifier comprises: a convolutional neural network (CNN) followed by a fully-connected network (FCN) with input data including (1) a first plurality of 2D input matrices constructed from magnitudes of the TSCI alone without phases and (2) a second plurality of 2D input matrices constructed from phases of the TSCI alone without magnitudes.

29. The vehicle of claim 28, wherein the oscillation rate in the transform domain is computed based on:
subtracting from each 1D transform, which is a respective column of the 2D transform matrix, a respective mean of the 1D transform to generate a respective mean-subtracted 1D transform, wherein the mean of the 1D transform is a moving weighted average of the 1D transform in the transform domain;
computing N9 per-column zero-crossing counts based on the 2D transform matrix, each per-column zero-crossing count being an amount of zero-crossings of a respective mean-subtracted 1D transform; and computing the oscillation rate in the transform domain as a sixth aggregate of the N9 per-column zero-crossing counts, wherein any aggregate comprises at least one of: an average, a weighted average, a percentile, a median (50-percentile), a minimum (0-percentile), a maximum (100-percentile), a lower quartile (25-percentile), an upper quartile (75-percentile), a trimmed mean, an A1-to-A2 trimmed mean which is an average of all percentile from A1-percentile to A2-percentile, a 0-to-A2 trimmed mean, a A1-to-100 trimmed mean, a 30-to-70 trimmed mean, a 20-to-45 trimmed mean, a 60-to-90 trimmed mean, a 25-to-50 trimmed mean, a 50-to-75 trimmed mean, a 0-to-25 trimmed mean, a 75-to-100 trimmed mean, an arithmetic mean, a geometric mean, or a harmonic mean.

30. The vehicle of claim 28, wherein the DTW cost is computed based on:
- comparing each of the N9 columns of the 2D transform matrix, which are the N9 1D transform, with a reference vector, which is a reference 1D transform obtained by applying 1D transform to training CI of a training TSCI in a training phase;
- computing N9 per-column DTW costs associated with the N9 columns of the 2D transform matrix, each per-column DTW cost computed by applying DTW between a respective column of the 2D transform matrix and the reference vector; and
- computing the DTW cost as a seventh aggregate of the N9 per-column DTW costs, wherein the seventh aggregate comprises at least one of: an average, a weighted average, a percentile, a median (50-percentile), a minimum (0-percentile), a maximum (100-percentile), a lower quartile (25-percentile), an upper quartile (75-percentile), a trimmed mean, an A1-to-A2 trimmed mean which is an average of all percentile from A1-percentile to A2-percentile, a 0-to-A2 trimmed mean, a A1-to-100 trimmed mean, a 30-to-70 trimmed mean, a 20-to-45 trimmed mean, a 60-to-90 trimmed mean, a 25-to-50 trimmed mean, a 50-to-75 trimmed mean, a 0-to-25 trimmed mean, a 75-to-100 trimmed mean, an arithmetic mean, a geometric mean, or a harmonic mean, wherein:
- the number of temporally adjacent CCS used to compute the FCS comprises: one, two or three immediate past CCS, and
- all of the oscillation CS, the DTW CS, the peak CS, the CCS and the FCS take values from a same range of real numbers from 0 to 1.

\* \* \* \* \*